US007555516B2

(12) United States Patent
Lamport

(10) Patent No.: US 7,555,516 B2
(45) Date of Patent: Jun. 30, 2009

(54) FAST PAXOS RECOVERY

(75) Inventor: Leslie B. Lamport, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 10/996,350

(22) Filed: Nov. 23, 2004

(65) Prior Publication Data

US 2006/0168011 A1   Jul. 27, 2006

(51) Int. Cl.
*G06F 15/16* (2006.01)
*G06F 15/173* (2006.01)

(52) U.S. Cl. .................. 709/201; 709/203; 709/206; 709/218; 709/224

(58) Field of Classification Search .............. 709/224, 709/226, 201, 203, 206, 218; 714/4, 10
See application file for complete search history.

(56) References Cited

U.S. PATENT DOCUMENTS

| | | | | |
|---|---|---|---|---|
| 5,261,085 | A * | 11/1993 | Lamport | 714/4 |
| 6,105,122 | A * | 8/2000 | Muller et al. | 709/224 |
| 6,594,698 | B1 * | 7/2003 | Chow et al. | 709/226 |
| 6,671,821 | B1 * | 12/2003 | Castro et al. | 714/4 |
| 6,704,887 | B2 * | 3/2004 | Kwiat et al. | 714/10 |
| 6,957,331 | B2 * | 10/2005 | Kursawe et al. | 714/4 |

OTHER PUBLICATIONS

Keidar, Idit, et al.; On the Cost of Fault-Tolerant Consensus When There Are No Faults—A Tutorial; SIGACT News 32(2), Distributed Computing column, pp. 45-63, Jun. 2001.

Dwork, Cynthia, et al.; Consensus in the Presence Of Partial Synchrony; *Journal of the ACM*, 35(2):288-323, Apr. 1988.
Lampson, Butler W.; How to Build a Highly Available System Using Consensus; http://www.research.microsoft.com.
Lamport, Leslie; The Implementation of Reliable Distributed Multiprocess Systems; *Computer Networks*, 2:95-114, 1978.
Lamport, Leslie, et al.; The Byzantine Generals Problem; ACM Transactions on Programming Languages and Systems, vol. 4, No. 3, Jul. 1982, pp. 382-401.
Lamport, Leslie, Time, Clocks, and the Ordering of Events in a Distributed System, *Communication of the ACM*, 21(7):558-565, Jul. 1978.
Lamport, Leslie, The Part-Time Parliament, *ACM Transactions on Computer Systems* 16, 2, pp. 133-169, (May 1998). Also appeared as SRC Research Report 49.

(Continued)

*Primary Examiner*—Quang N. Nguyen
(74) *Attorney, Agent, or Firm*—Woodcock Washburn LLP

(57) ABSTRACT

A distributed computing system can achieve consensus while introducing fewer message delays by using an algorithm that allows the constituent devices to vote on functions received directly from one or more clients. If a conflict occurs, a leader device from among the devices can be selected such that the leader device already knows of the other devices' previous votes, and can determine an appropriate function to propose, using an immediately subsequent proposal number, without performing the first phase of the Paxos algorithm. Alternatively, each device can independently determine, by using the same repeatable mechanism used by a leader device, what function the leader device would propose, and can then vote for that function using the immediately subsequent proposal number. If the devices' votes again result in a conflict, the Paxos algorithm can be used, or additional iterations can be performed prior to resorting to the Paxos algorithm.

33 Claims, 41 Drawing Sheets

OTHER PUBLICATIONS

Lamport, Leslie, Paxos Made Simple, *ACM SIGACT News* (Distributed Computing Column), 32,4 (Whole No. 121) pp. 18-25, Dec. 2001.

Lampson, Butler W., *The ABCD's of Paxos*, Presented at Principles of Distributed Computing, 2001, as one of the papers celebrating Leslie Lamport's 60th Birthday, retrieved from http://research.microsoft.com/lampson/65-ABCDPaxos/Acrobat.pdf.

Castro, Miguel, et al., Practical Byzantine Fault Tolerance, appears in *Proceedings of the Third-Symposium on Operating Design and Implementation*, New Orleans, USA, Feb. 1999, pp. 1-14.

Castro, Miguel, et al., *Proactive Recovery in a Byzantine-Fault-Tolerant System*, appears in the Proceedings of the Fourth Symposium on Operating Systems Design and Implementation (OSDI '00), San Diego, USA, pp. 1-15, Oct. 2000.

Huang, Yennun, et al., *Software Rejuvenation: Analysis, Module and Applications*, Proc. International Symposium on Fault Tolerant Computing, pp. 381-390, 1995.

Bracha, Gabriel, An Asynchronous ë(h -1)/3û-Resilient Consensus Protocol this paper was presented at the *ACM Symposium on Principles of Distributed Computing*, pp. 154-162, 1984.

Keidar, Idit, et al., Moshe: A Group Membership Service for WANs to appear in *ACM Transactions on Computer Systems (TOCS)*, pp. 1-47; Aug. 2002.

Khazan, Roger, I., *A One-Round Algorithm for Virtually Synchronous Group Communication in Wide Area Networks*, PH.D. dissertation, Department of Electrical Engineering and Computer Science. MIT., May 22, 2002. Thesis Supervisors: Prof. Nancy A. Lynch and Dr. Idit Keidar. Retrieved from http://theory.1cs.mit.edu/~roger/Research/Papers /khazan-phd.pdf.

Anceaume et al., Converging Toward Decision Conditions, *6th International Conference on Principles of Distributed Systems*, France, pp. 53-63; (Dec. 11-13, 2002).

Mostefaoui et al., *IRISA Research Report No. 1355* (Oct. 2000).

Brasileiro et al., *IRISA Research Report No. 1321* (Apr. 2000).

Schneider, F.; Implementing Fault-tolerant Services Using the State Machine Approach: A Tutorial; *Computing Surveys*, 22(3):299-319, Sep. 1990.

Deswarte, Y. et al; Intrusion Tolerance in Distributed Computing Systems; *Proceedings of the 1991 IEEE Symposium on Research in Security and Privacy*; pp. 110-121, May 1991.

Canetti, R. et al.; Fast Asynchronous Byzantine Agreement with Optimal Resilience; *Proc. 25th Annual ACM Symposium on Theory of Computing (STOC)*, pp. 42-51, 1993.

Reiter, M; How to Securely Replicate Services; *ACM Transactions on Programming Languages and Systems*, vol. 16, No. 3, pp. 986-1009, May 1994.

Reiter, M. K.; Secure Agreement Protocols; Reliable and Atomic Group Multicast in Rampart; *Proceedings of the 2nd ACM Conference on Computer and Communications Security*, pp. 68-80, Fairfax, Virginia, Nov. 1994.

Gong, L. et al.; Byzantine Agreement With Authentication: Observations and Applications in Tolerating Hybrid and Link Faults; *Dependable Computing for Critical Applications—5*, pp. 79-90, IFIP WG 10.4, preliminary proceedings, 1995.

Reiter, M. K.; The Rampart Toolkit for Building High-integrity services; *Theory and Practice in Distributed Systems, International Workshop, Selected Papers, Lecture Notes in Computer Science*, vol. 938, K. P. Birman, F. Mattern, and A. Schiper, Eds., Springer-Verlag, Berlin, 99-110, 1995.

Reiter, M. K.; Distributing Trust With the Rampart Toolkit; *Communications of the ACM*; 39, 4 pp. 71-74, Apr. 1996.

Malkhi, D. et al.; A High-Throughput Secure Reliable Multicast Protocol; *Proceedings of the 9th Computer Security Foundations Workshop*, Kenmore, Ireland, pp. 9-17, Jun. 1996.

Malkhi, D. et al.; A High-Throughput Secure Reliable Multicast Protocol; *Journal of Computer Security*. Also in *Proceedings of the 9th IEEE Computer Security Foundations Workshop*, pp. 9-17, Jun. 1996.

Malkhi, D. et al.; Byzantine Quorum Systems; *Proceedings of the 29th ACM Symposium on Theory of Computing*, May 1997.

Malkhi, D. et al.; The Load and Availability of Byzantine Quorum Systems; *Proceedings of 16th ACM Symposium on Principles of Distributed Computing (PODC)*, pp. 249-257, Aug. 1997.

Kihlstrom, K. P. et al.; Solving Consensus in a Byzantine Environment Using an Unreliable Fault Detector; *Proceedings of the International Conference on Principles of Distributed Systems (OPODIS'97)*, Hermes, Chantilly, France, 61-76, 1997.

Kihlstrom, K. P. et al.; The SecureRing Protocols for Securing Group Communication; *Proceedings of the 31st Hawaii International Conference on System Sciences*, vol. 3, pp. 317-326, Jan. 1998.

Malkhi, D. et al.; Secure and Scalable Replication in Phalanx; *Proceedings of the 17th IEEE Symposium on Reliable Distributed Systems*; p. 51-58, West Lafayette, Indiana, USA, Oct. 1998.

Malkhi, D. et al.; Byzantine Quorum Systems; *Distributed Computing*; vol. 11, No. 4, p. 203-213, 1998.

Goldberg, A. et al.; Towards an Archival Intermemory; *International Forum on Research and Technology Advances in Digital Libraries*; IEEE, pp. 147-156, 1998.

Hartman, J.H. et al.; The Swarm Scalable Storage System; *19th ICDCS*, pp. 74-81, 1999.

Guerraoui, Rachid et al.; *Reducing the Cost for Non-Blocking in Atomic Commitment*; Département d'Informatique, Ecole Polytechnique Federale de Lausanne, pp. 1-11, May 1996.

Hayashibara, Noahiro et al.; *Performance Comparison Between the Paxos and Chandra-Toueg Consensus Algorithms*; Département d'Informatique, Ecole Polytechnique Federale de Lausanne; Technical Report IC-2002-61, pp. 1-11, Aug. 2002.

Awerbuch, Baruch et al.; *Maintaining Database Consistency in Peer to Peer Networks*; Department of Computer Science, John Hopkins University; Technical Report CNDS-2002-1, pp. 1-14, Feb. 6, 2002.

Birrell, Andrew D. et al.; *The Echo Distributed File System*; Digital Equipment Corp. Systems Research Center; Technical Report 111, pp. 1-22, Sep. 10, 1993.

Liskov, Barbara et al.; *Replication in the Harp File System*; Proceedings of the 13th Symposium on Operating System Principles, 13 pp., Oct. 1991.

Hisgen, Andy et al.; *New-Value Logging in the Echo Replicated File System*; Digital Equipment Corp. Systems Research Center, Research Report 104, pp. 1-39, Jun. 1993.

Long, Darrell D.E. et al.; *Voting with Regenerable Volatile Witnesses*; University of California Computer and Information Sciences; Technical Report, pp. 1-20, Apr. 1990.

Swart, Garret et al.; *Availability in the Echo File System*; Digital Equipment Corp. Systems Research Center, Research Report 112, pp. 1-43 , Sep. 1993.

Adya, A., et al.; FARSITE: Federated, Available, and Reliable Storage for an Incompletely Trusted Environment.; *In Proc. 5th OSDI*, Boston, MA, pp. 1-14, Dec. 2002.

Castro, M., *Practical Byzantine Fault Tolerance*; Ph.D. Thesis Technical Report MIT-LCS-TR-817, MIT, Jan. 2001.

Chockler, G. V., et al., Group Communication Specifications: A Comprehensive Study; *ACM Computing Surveys*, pp. 33(4):427-469, Dec. 2001.

Deprisco, R., et al., Revisiting the Paxos Algorithm; *In Proc. 11th Int'l Workshop on Distributed Algorithms*, pp. 111-125, Sep. 1997.

Lamport, L., Using Time Instead of Timeout for Fault Tolerance in Distributed Systems; *ACM Transactions on Programming Languages and Systems (TOPLAS)*, pp. 6(2):264-280, Apr. 1984.

Lamport, L., et al., Cheap Paxos; *In Proc. International Conference on Dependable Systems and Networks (DSN)*, Florence, Italy, 2004.

Lynch, N., et al., RAMBO: A Reconfigurable Atomic Memory Service for Dynamic Networks; *In Proc. 16th International Symposium on Distributed Computing*, Toulouse, France, pp. 173-190, Oct. 2002.

Narasimhan, P., et al., *Replica Consistency of CORBA Objects in Partitionable Distributed Systems*, 1997.

Oki, B.M., *Viewstamped Replication for Highly Available Distributed Systems*; Ph.D. Thesis Technical Report MIT/LCS/TR-423, MIT, Aug. 1988.

Oki, B.M., et al., Viewstamped Replication: A New Primary Copy Method to Support Highly-Available Distributed Systems; *In Proc. 7th Symposium on Principles of Distributed Computing*, Aug. 1988, pp. 8-17.

Rodrigues, R., et al., Base: Using Abstractions to Improve Fault Tolerance; *In Proc. 18th ACM Symposium on Operating System Principles*, Bantt, Canada, pp. 15-28, Oct. 2001.

Schneider, F.B., Synchronization in Distributed Programs; ACM Transactions on Programming Languages and Systems (TOPLAS; pp. 4(2):125-148.), Apr. 1982.

Yu, H., et al., Consistent and Automatic Replica Regeneration; *In Proc. 1st NSDI*, San Francisco, CA, pp. 323-236, 2004.

Pedone, F., et al., Handling Message Semantics with Generic Broadcast Protocols, *Distributed Computing 15*, pp. 97-107, 2002.

Cukier, M., et al., AQuA: An Adaptive Architecture that Provides Dependable Distributed Objects, *In Proc. 17th Symposium on Reliable Distributed Systems*, pp. 245-253, West Lafayette, IN, Oct. 1998.

Cukier, M., et al., AQuA: An Adaptive Architecture that Provides Dependable Distributed Objects, *IEEE Transactions on Computers*, vol. 52, No. 1, pp. 31-50, Jan. 2003.

Charron-Bost, Bernadette, et al., Uniform Consensus is Harder than Consensus (extended abstract), *Technical Report DSC/2000/028*, Switzerland, May 2000.

DePrisco, Robert, et al., Revisiting the Paxos Algorithm, *Theroretical Computer Science*, 243:35-91, 2000.

Fischer, Michael J., et al., Impossibility of Distributed Consensus with One Faulty Process, *Journal of the ACM*, 32(2):374-382, Apr. 1985.

Lamport, Leslie, Lower Bounds for Asynchronous Consensus, in *Future Distributed Computing*, vol. 2584 *of Lecture Notes in Computer Science*, pp. 22-23, Spring, 2003.

* cited by examiner

FAST PAXOS RECOVERY

FIELD OF THE INVENTION

This invention relates generally to distributed computing and, more particularly, relates to fault tolerant distributed computing that can achieve consensus in fewer message delays even in the event of conflicting requests.

BACKGROUND

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modem personal computing devices is a distributed computing system, in which the computing devices act in coordination with one another to provide more reliable access to data and computational resources.

In addition to providing a useful mechanism for using excess computing capacity, distributed systems can also be composed of dedicated inexpensive computing devices in order to achieve the performance and storage capabilities of a larger, more-expensive computing device. A further advantage of distributed systems is the ability to continue to operate in the face of physical difficulties that would cripple a single, larger computing device. Such difficulties could include: sustained power outages, inclement weather, flooding, terrorist activity, and the like.

To compensate for the increased risk that individual member computing devices may become disconnected from the network, turned off, suffer a system malfunction, or otherwise become unusable, redundancy can be used to allow the distributed computing system to remain operational. Thus, the information stored on any one personal computing device can be redundantly stored on at least one additional personal computing device, allowing the information to remain accessible, even if one of the personal computing devices fails.

A distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system.

However, distributed computing systems can be difficult to maintain due to the complexity of properly synchronizing the individual devices that comprise the system. Because timekeeping across individual processes can be difficult at best, a state machine approach is often used to coordinate activity among the individual devices. A state machine can be described by a set of states, a set of commands, a set of responses, and client commands that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose a given client command for execution by every device in the system. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given client command be executed by the devices, using the proposal number suggested in the earlier message. Each device can, at that stage, determine whether to vote for the action or reject it. A device should only reject an action if it has responded to another leader's suggestion of a higher proposal number. If a sufficient number of devices, known as a quorum, vote for the proposal, the proposed action is said to have been agreed upon, and each device performs the action and can transmit the results. In such a manner, each of the devices can perform actions in the same order, maintaining the same state among all of the devices.

Generally, the Paxos algorithm can be thought of in two phases, with an initial phase that allows a leader to learn of prior proposals that were voted on by the devices, as described above, and a second phase in which the leader can propose client commands for execution. Once the leader has learned of prior proposals, it need not repeat the first phase. Instead, the leader can continually repeat the second phase, proposing a series of client commands that can be executed by the distributed computing system in multiple steps. In such a manner, while each client command performed by the distributed computing system for each step can be thought of as one instance of the Paxos algorithm, the leader need not wait for the devices to vote on a proposed client command for a given step before proposing another client command for the next step.

A variant of the Paxos algorithm, known as the fast Paxos algorithm, streamlines the repetition of the second phase by removing the leader and essentially treating requests received directly from clients as requests that were sent by a leader. Each device votes on a requested function, and if a quorum of devices has voted for a function, that function can be executed and the request can be responded to. Because a leader no longer exists to order the clients' requests, the fast Paxos algorithm can function properly if each of the devices receive the same requests in the same order. However, if some devices do not receive the requests in the same order as other devices, a quorum may not select a function and a conflict can occur. In such a case, the Paxos algorithm can be restarted, and the leader can learn of the previous votes and submit one or more of the conflicted functions for a vote in an ordered manner. Additionally, because the Paxos algorithm relies on a leader to select proper functions to be voted upon, and the fast Paxos algorithm can operate without a leader, a quorum of devices for purposes of the fast Paxos algorithm can be defined as a larger grouping of devices to provide mechanisms by which a selected function can be determined if some devices fail.

The Paxos algorithm can provide a response to a client's request in as few as four message delays. Specifically, the transmission of the request to a leader results in one message delay; the transmission of the proposal from the leader to the devices results in a second message delay; the transmission of the votes from the devices to the leader results in a third message delay; and the transmission of the response from the leader to the client results in a fourth message delay. By removing the leader, the fast Paxos algorithm can provide a response to a client's request in as few as three messages delays. Specifically, the transmission of a client's request to the devices results in one message delay; the transmission of the devices' votes to a learner, or to each other, results in a second message delay; and the transmission of a response from the learner, or from the devices, to the client results in a third message delay. Because a distributed computing system may be composed of computing devices that are physically not close to one another, message propagation delays, even in an efficient network environment can dwarf other processing. Consequently, the message delays introduced by any consensus algorithm can act as a limiting factor on the efficiency and speed of that algorithm.

Therefore, what is needed is a distributed computing system that can use a consensus algorithm with fewer message delays, such as fast Paxos, but that can still recover from a conflict in an efficient manner.

BRIEF SUMMARY OF THE INVENTION

Therefore, in one embodiment of the present invention, a system can implement a modified fast Paxos algorithm that, in the event of a conflict, resorts to a Paxos algorithm in which a leader device already knows of a safe proposal, and proposes it without performing the first phase of the Paxos algorithm.

In another embodiment, a system can implement another modified fast Paxos algorithm that, in the event of a conflict, causes each device to determine which function a leader device would propose, vote for that function using an immediately subsequent proposal number, and transmit that vote information to the other devices.

In a further embodiment, a modified fast Paxos algorithm can determine in advance whether, for a particular proposal number, to use a leader-based recovery mechanism or a leaderless recovery mechanism, if there is a conflict while using that proposal number.

In a still further embodiment, a predetermined repeatable mechanism can be used by a leader device to determine which of two or more conflicting requests will be the first to be submitted for a vote.

Although the description herein focuses primarily on the operation of computing devices in a distributed computing system, it will be appreciated that the description is equally applicable to processes running on a single computing device, such as on separate processors or in separate memory spaces. Thus, additional embodiments include the operation of the modified Paxos algorithm in multiple processor environments, whether the multiple processors are physically located in one or more computing devices, and in multiple virtual machine environment, whether the multiple virtual machines are being executed by one or more computing devices. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
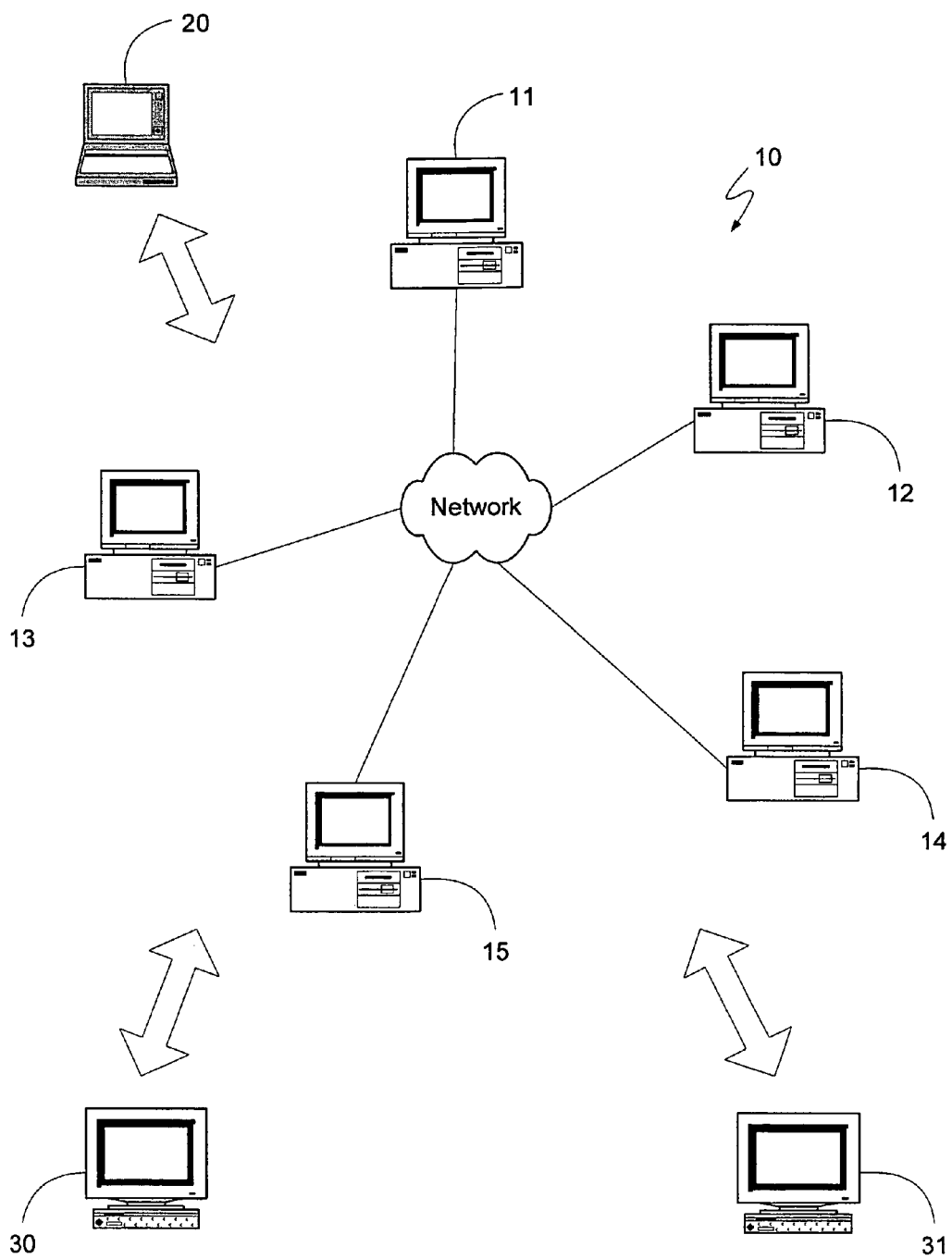
FIG. 1 is a block diagram generally illustrating an exemplary distributed computing system with which an embodiment of the present invention can be implemented.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common use for distributed computing systems is that of a network server that can act as a central storage repository for various forms of information. Such a distributed system seeks to replicate the central store on all of its constituent devices so that every client seeking to communicate with the central storage can find a convenient and efficient device with which to communicate. Furthermore, because of the distributed nature of the system, local events such as power outages, floods, political unrest, and the like may only affect a few computing devices, allowing the overall system to continue to operate properly and provide clients access to information and other services.

Such a distributed computing system can be thought of as a state machine, with the future state of the machine defined by the current state and the action to be taken. Each constituent device of the distributed computing system can then independently execute the state machine of the overall system. The state-machine approach can be implemented asynchronously; so that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of the functions that were executed. In such a manner, every device can be assured to have the same state.

A distributed computing system acting as a server can be especially useful for serving a large amount of information to a diverse set of clients, such as a central database for a multinational corporation, or a popular World Wide Web site. In such situations, a large number of clients can request information from the distributed computing system acting as a server. By implementing the server functionality across multiple devices, more clients can be serviced in parallel, thereby increasing the throughput of the overall system, and the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the proposal having the largest proposal number for which that device has already voted or an indication that the device has not voted for any previous proposals. Once the leader receives the responses from the other devices, it can determine which function to propose and request a vote for a proposed function. Each device will vote for the proposal unless it has, at some time after the initial transmission of the proposal and prior to the requested vote, responded to a suggestion for a higher proposal number. If a quorum of devices votes for the proposal, then the proposal is accepted, and the leader can transmit a message to all of the devices requesting that they execute the agreed upon function.

Another mechanism by which the constituent computing devices of a distributed computing system can agree upon the next function to execute is known as the fast Paxos algorithm. The fast Paxos algorithm, as will be described further below, enables a device to vote for proposals it receives directly from clients, removing the need for a leader device in normal operation. Once a sufficient number of devices have voted for the proposal, the proposal is accepted and the results can be transmitted to the requesting client. By receiving requests directly from clients, the fast Paxos algorithm can, in normal operation, introduce one less message delay between the receipt of a client's request and the transmission of a response. However, because no leader device orders the requests, the constituent devices may not receive the same requests in the same order. This can especially be true if two requests were transmitted at approximately the same time. In such a case, some devices may select one function for the next system step, while other devices select the other function for the next system step. In the event that such a conflict occurs, the Paxos algorithm can be used to restore consensus but can result in further message delays.

However, one modified fast Paxos algorithm can select, from among the devices that were implementing the fast Paxos algorithm at the time of the conflict, a leader device to restore consensus. In such a case, the leader device can already know all of the other devices' votes. Consequently, the leader device can determine appropriate functions to propose for a vote for the system steps in which the conflict occurred without performing a first phase of the Paxos algorithm. Once the leader device performs a second phase of the Paxos algorithm for the system steps during which the conflict occurred, the conflict can be resolved, and the system can resume using the modified fast Paxos algorithm.

Alternatively, a second modified fast Paxos algorithm can have each device implementing the fast Paxos algorithm at the time the conflict occurred determine which function a leader device would propose for a vote using the same decision mechanisms as a leader device would use. Each device can then vote for that function using a next subsequent proposal number that signifies the use of a fast Paxos algorithm, and transmit this new vote information to the other devices. If a consensus is reached, then the system can resume using the second modified fast Paxos algorithm. However, if a conflict again occurs, the system can resort to the Paxos algorithm and resolve the conflict in a more traditional manner.

Distributed Computing Environment

Turning to the drawings, wherein like reference numerals refer to like elements, the invention is illustrated as being implemented by a distributed computing system, such as the exemplary distributed computing system 10 shown in FIG. 1. For ease of presentation only, the present invention will be described with reference to distributed computing systems such as system 10, which comprises computing devices 11 through 15, interconnected as shown in FIG. 1. As will be understood by those skilled in the art, the present invention is applicable to all distributed computing environments and is not intended to be limited in any way by the exemplary distributed computing system of FIG. 1, which has been simplified for presentation purposes.

FIG. 1 also illustrates a single client computing device 20, though the present invention is intended to operate in environments having any number of client computing devices. Client computing device 20 is illustrated as having a generic communicational connection to the distributed computing system 10. As will be known by those skilled in the art, such a communicational connection can use any communication medium and protocol, and can allow the client computing device 20 to communicate with one or more of the computing devices in the distributed computing system 10.

Additionally, FIG. 1 illustrates computing devices 30 and 31 that are not shown as part of the distributed computing system 10, but which also maintain a generic communicational connection to system 10. As above, the communicational connection can use any communication medium and protocol, and can allow the computing devices 30 and 31 to communicate with one or more of the computing devices in the distributed computing system 10. As will be described in further detail below, computing devices 30 and 31 can learn of the results of executions performed by the system 10 without being part of the system 10. Alternatively, computing devices 30 and 31 can learn of functions selected by the system 10 and can execute the function themselves, thereby independently maintaining the same state as the devices in the system 10.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
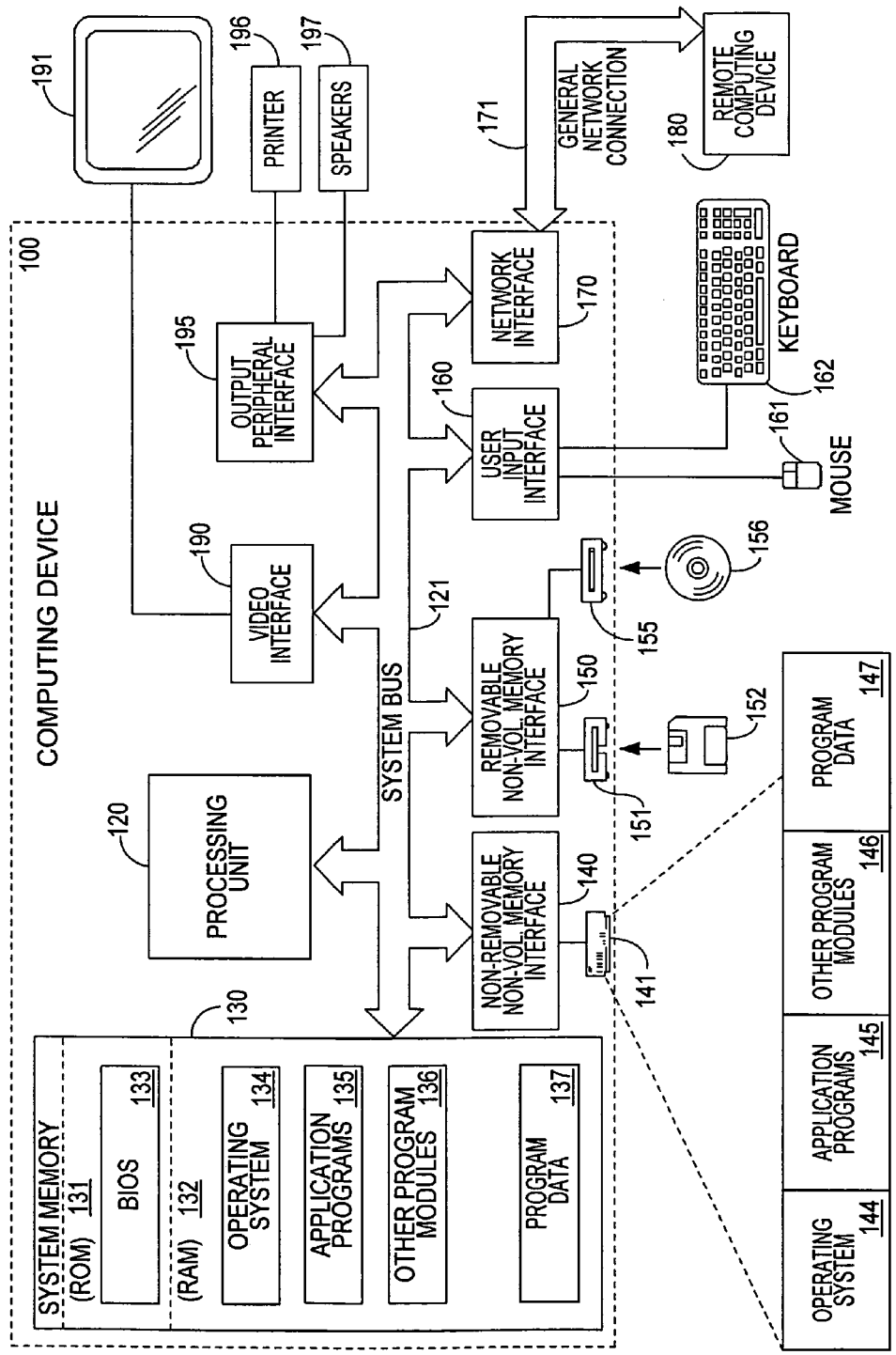
FIG. 2 is a block diagram generally illustrating an exemplary computing device with which an embodiment of the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not intended to exactly represent any of the computing devices 11-15, 20, or 30-31 illustrated in FIG. 1. The exemplary computing device 100 can implement one or more of these computing devices, such as through memory partitions, virtual machines, multiple processors, or similar programming techniques allowing one physical computing structure to perform the actions described below as attributed to multiple computing devices. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment, such as that shown in FIG. 1, using logical connections to one or more remote computers. FIG. 2 illustrates a general network connection 171 to a remote computing device 180. The general network connection 171, and the network connections illustrated in FIG. 1, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, a distributed computing system implementing one of the modified fast Paxos algorithms, which will be described in further detail below, can, by utilizing information that was already transmitted, resolve a conflict among the devices while introducing fewer message delays. In one modified fast Paxos algorithm, a conflict among the devices can result in the use of the Paxos algorithm, which will also be described in further detail below, where the leader device selected for implementing the Paxos algorithm is a device that was also implementing the modified fast Paxos algorithm. Consequently, such a device can already know the information that would normally have been collected during a first phase of the Paxos algorithm, and can therefore determine an appropriate function to propose for a second phase of the Paxos algorithm without actually performing the first phase of the Paxos algorithm. Once the leader device has succeeded in achieving consensus on the one or more system steps for which a conflict had occurred, the system can resume using the modified fast Paxos algorithm. Because many systems have the capability to run multiple instances of consensus algorithms in parallel, the system can, while the leader device resolves the conflict, continue to use the modified fast Paxos algorithm to select functions for system steps greater that those for which the conflict occurred. In such a case, once the conflict has been resolved, the Paxos algorithm can simply stop while the modified fast Paxos algorithm continues selecting functions for subsequent system steps.

Alternatively, as will also be described in detail below, a second modified fast Paxos algorithm can use the information present at each device that was implementing the fast Paxos algorithm when the conflict occurred to attempt to determine which function would be selected by a leader device, if one was being used. So long as a predetermined, repeatable mechanism is used by the leader to select which of the conflicting functions should be proposed for a particular system step, such a mechanism can also be used by each of the devices independently to achieve the same result. Consequently, even without selecting a leader device and implementing the Paxos algorithm, each device can independently select the same function and can then submit a vote for that function using an immediately subsequent proposal number. If, for any reason, a sufficient number of devices do not select the same function, a second conflict can occur. To prevent repeated instances of the same conflict, the second modified fast Paxos algorithm can resort to using the Paxos algorithm if the same conflict occurs more than a specified number of times. As indicated above, because systems can implement multiple instances of a consensus algorithm simultaneously, a distributed computing system can continue to use the second modified fast Paxos algorithm to select functions for system steps subsequent to those for which a conflict occurred while simultaneously attempting to resolve the conflict. In such a case, if the conflict resolution was successful without requiring the use of the Paxos algorithm, the system can simply end this instance of the second modified fast Paxos algorithm and focus additional resources on the other instances which are selecting functions for subsequent system steps.

As will be described further below, the selection of a particular modified fast Paxos algorithm to be used with a particular proposal number can affect the assignment of an immediately subsequent proposal number. For example, if a modified fast Paxos algorithm is selected that relies on leader-based recovery mechanism to recover from conflicts, then the next subsequent proposal number, used for the recovery, can correspond to a standard Paxos algorithm. On the other hand, if a modified fast Paxos algorithm is selected that relies on a leaderless recovery mechanism to recover from conflicts, then the next subsequent proposal number, used for the recovery, can correspond to a fast Paxos algorithm. Further detailed description of the algorithms contemplated by an embodiment of the present invention proceeds first with a description of state machines, followed by descriptions of embodiments of the Paxos and fast Paxos algorithms. Subsequently, detailed descriptions of modifications of the fast Paxos algorithm, contemplated by embodiments of the present invention, will be provided.

State Machines

In a distributed environment, such as distributed system 10 illustrated in FIG. 1, coordination among devices can be a difficult task. One mechanism for avoiding difficulties inherent in relying on time as a coordinating factor is to model the distributed computing system in terms of a state machine where the performance of a function moves the state machine from one state to another. Thus, a state machine can be described with reference to a set of states, a set of commands, a set of responses, and functions that link each response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the functions from the ordered list that the device has not yet performed. Such a state machine approach was initially proposed in the article "Time, Clocks, and the Ordering of Events in a Distributed System," by Leslie Lamport published in The Communications of the ACM, Volume 21, Number 7, July 1978, the contents of which are hereby incorporated by reference in their entirety to further explain or describe any teaching or suggestion contained within the present specification that is consistent with their disclosures.

Paxos Algorithm

By using a state machine approach, the synchronization of the constituent devices 11 through 15 of the distributed computing system 10, shown in FIG. 1, can be achieved by agreeing on the functions to be performed and the order in which to perform them. One method for agreeing upon a function to be performed is known as the Paxos algorithm. The Paxos algorithm allows the system 10 to operate properly even in the face of failures, where devices can stop operating without advanced warning. The Paxos algorithm requires that at least a quorum of devices agree to a function before the system as a whole performs that function. With the Paxos algorithm, a quorum can be a simple majority, or it can include more devices than that, depending upon the particular requirements of the system. However defined, a quorum can be sufficiently large such that any two quorums have at least one device in common.

To maintain consistency, the Paxos algorithm can require that the system 10 limit the performance of functions to a single function per step. Therefore, only a single function can be selected for a given step. Since any two quorums have at least one properly functioning device in common, the selection of no more than one step could be ensured by requiring that every device vote only for one proposal. However, if a number of devices simultaneously acted as leaders, such a requirement would cause a stalemate because it would be possible that none of the proposals was agreed to by a quorum, and yet none of the devices could vote for a proposal for a different function so that a quorum could eventually be reached.

The Paxos algorithm solves this problem through a multi-phase process by which devices are allowed to change their votes, but leaders are constrained in the functions they propose. Using the Paxos algorithm, a leader can propose any function the leader chooses, unless the leader learns of a previously proposed function. If the leader has learned of at least one previously proposed function, that at least one device in the quorum has already voted for, the leader can propose the most recent of the previously proposed functions the leader has learned of. Each device need only track the most recent proposal that device voted for. If the device receives a proposal for which it has promised to vote, and it has not promised to vote for another proposal in the meantime, the device can cast a vote for the proposal. A device can only promise to vote for a proposal if the proposal has a larger proposal number than any other proposal the device has previously promised to vote for. The use of proposal numbers allows the system to achieve correct operation without the need to resort to complicated and expensive synchronization of clocks between the constituent devices. The most recent proposal will generally have the largest proposal number. If it does not, it can be ignored, as explained further below. When promising to vote for a proposal, the device can also transmit to the leader the highest proposal number, that is less than the current proposal number, for which the device has previously promised to vote. In such a manner the leader can always learn of previous proposals.

Figure 3A:
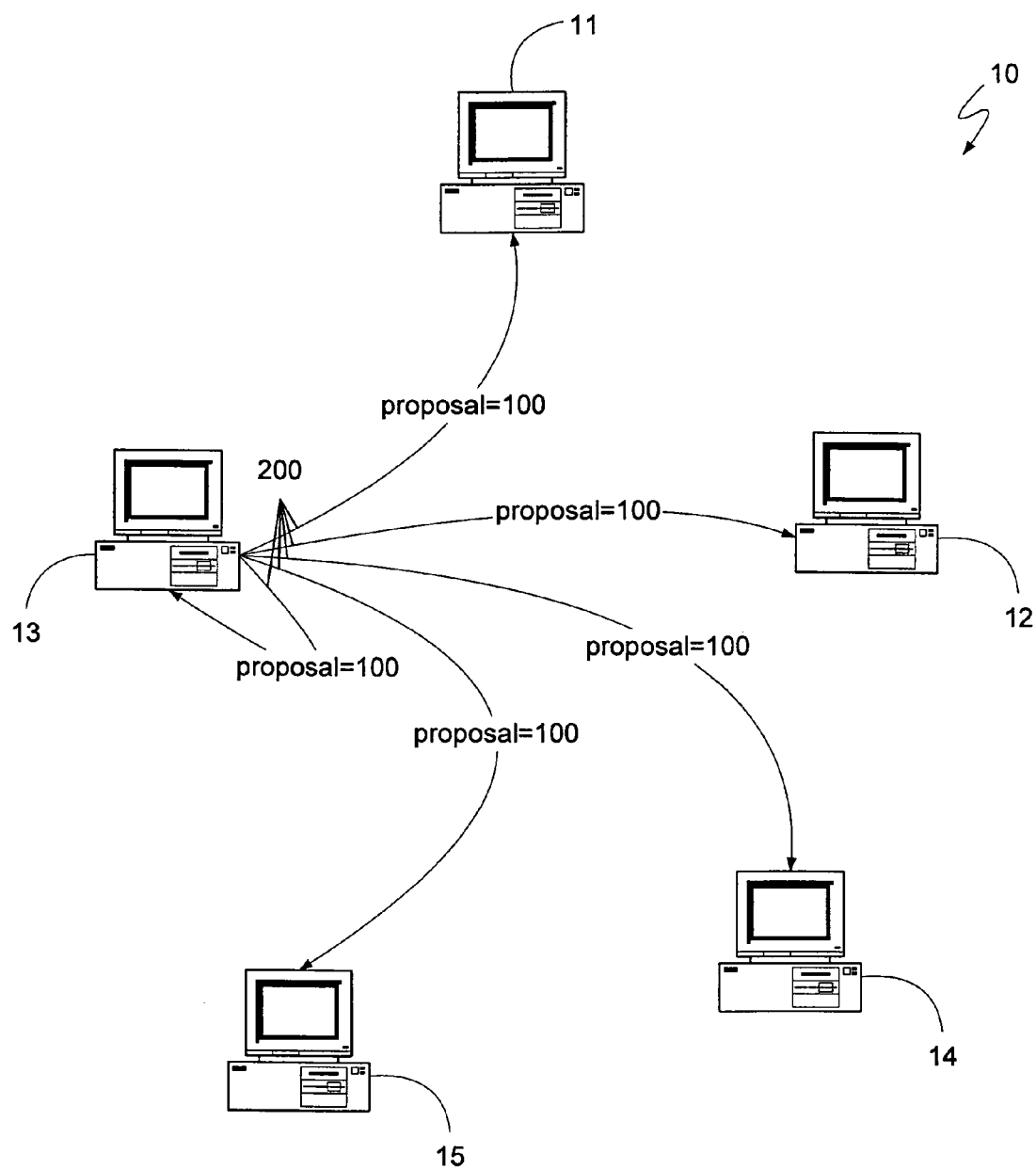
FIGS. 3a-e generally illustrate the operation of a consensus algorithm contemplated by an embodiment of the present invention.

Turning to FIG. 3*a*, the Paxos algorithm is explained in greater detail using the exemplary distributed computing system 10, comprising the five devices 11 through 15, shown. In such an environment, a quorum can be defined as any group of three or more devices because such a definition will ensure that every quorum has at least one device in common. As shown in FIG. 3*a*, device 13 can assume a leadership position and transmit message 200 to devices 11-12 and 14-15, suggesting a proposal number to be used for proposing a function to the devices 11-15. Because device 13 can act as both a device and a leader, it sends itself message 200, though such a transmission could be handled internally to the device and need not be physically transmitted. Device 13 can select an arbitrarily large proposal number in an effort to ensure that there are no previous proposals with larger proposal numbers. Furthermore, because device 13 itself may have voted on previous proposals, it can select a proposal number that is larger than any proposal device 13 is aware of.

Because proposals can be ordered based on their proposal numbers, it can be advantageous to prevent two or more devices from using the same proposal number for different proposals. Therefore, proposal numbers can be selected by devices using mechanisms based on unique device properties, such as a Media Access Control (MAC) address of the device sending the proposal. Alternatively, proposal numbers can be partitioned among the devices, requiring each device to select proposal numbers only from among its partition. One method for partitioning the proposal numbers would be to grant to the "$i^{th}$" device proposal numbers congruent to "i" modulo the number of devices in the system.

Because, as will be shown, the Paxos algorithm can operate even if a number of devices attempt to act as leaders, the mechanism by which a device assumes a leadership position is not important. Nevertheless, a mechanism that minimizes the chances that different devices can simultaneously believe they are the leader can increase the efficiency of the system. For example, mechanisms based on unique device properties, such as a MAC address, can reduce the chance of having more than one simultaneous leader. One such mechanism could simply select a properly functioning device with the smallest MAC address to be the next leader. In addition, a leader selection mechanism could prevent a device from attempting to become a leader if the device has already received a message from another device acting as a leader within a predetermined amount of time, to prevent a constant changing of the leadership device. Becuase constant leadership change can introduce inefficiencies into the operation of the system, the above described mechanisms can provide more efficient operation.

Figure 3B:
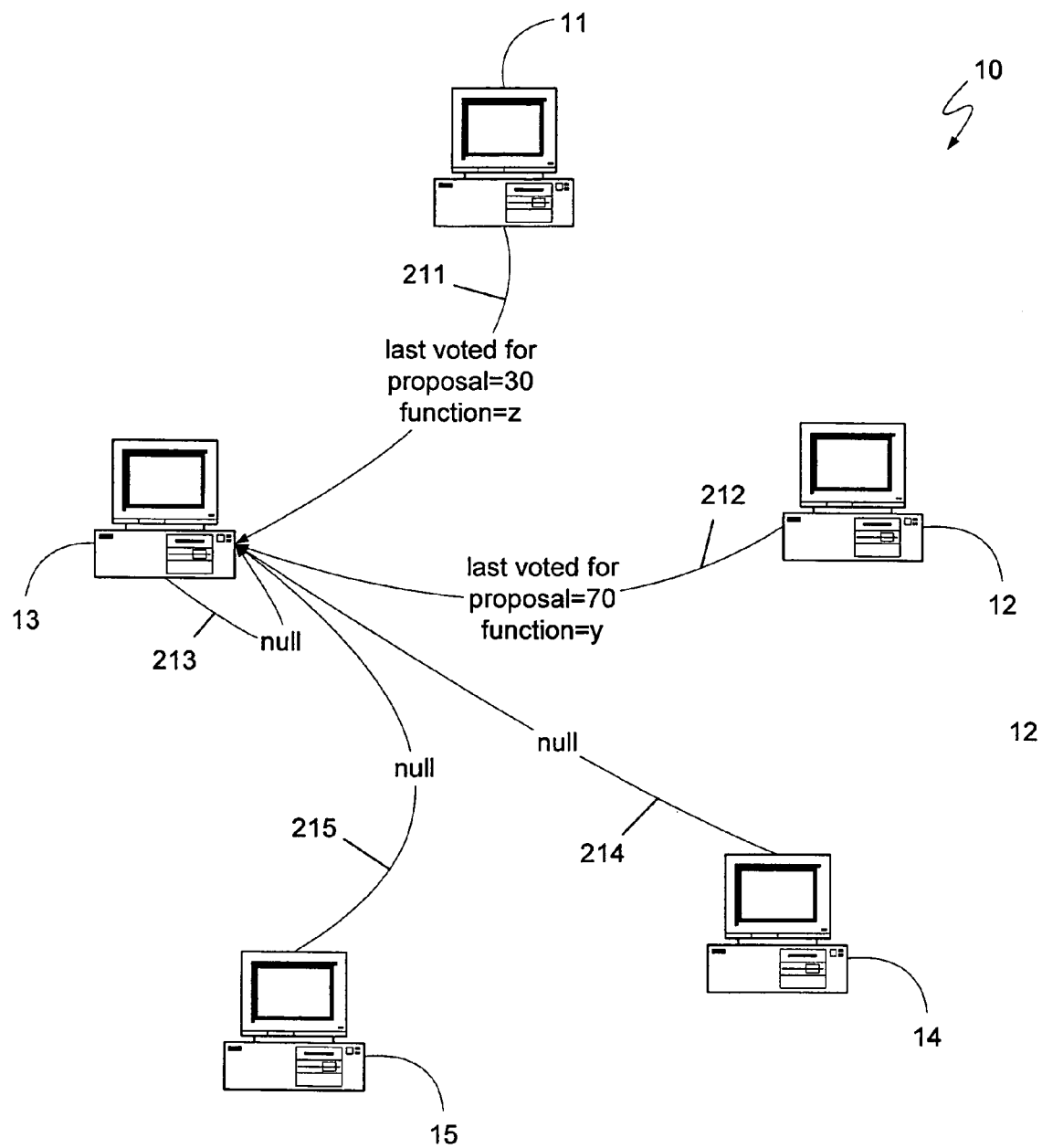

Turning to FIG. 3b, upon receipt of a message, such as message 200, suggesting a new proposal number, each of the devices 11-15 can respond with messages 211-215 indicating the largest proposal number, that is still less than the proposal number suggested by message 200, and the function proposed by that largest proposal number for which that device has cast a vote. If the device has cast a vote for a proposal number that is greater than the proposal number used by the leader, the device can ignore the message from the leader, or, as will be explained below, the device can respond with the last vote information despite the larger proposal number. In the exemplary condition shown in FIG. 3b, device 12 has previously voted for proposal number 70, which had proposed that the system 10 execute a function identified by the variable "y". Thus, in response to message 200, device 12 can send message 212 indicating that it last voted for proposal number 70, which proposed the execution of the function "y". Similarly, device 11 previously voted for proposal number 30, which had proposed that the system 10 execute a function identified by the variable "z". Message 211 can, therefore, convey this last vote information of device 11 back to device 13. Devices 13-15 may not have received any proposals and have, therefore, not previously cast a vote for any proposal. They can, therefore, return a null response as indicated by messages 213-215. Again, as above, messages sent from device 13 to itself can be handled internally by device 13, but are illustrated for explanatory purposes.

Figure 3C:
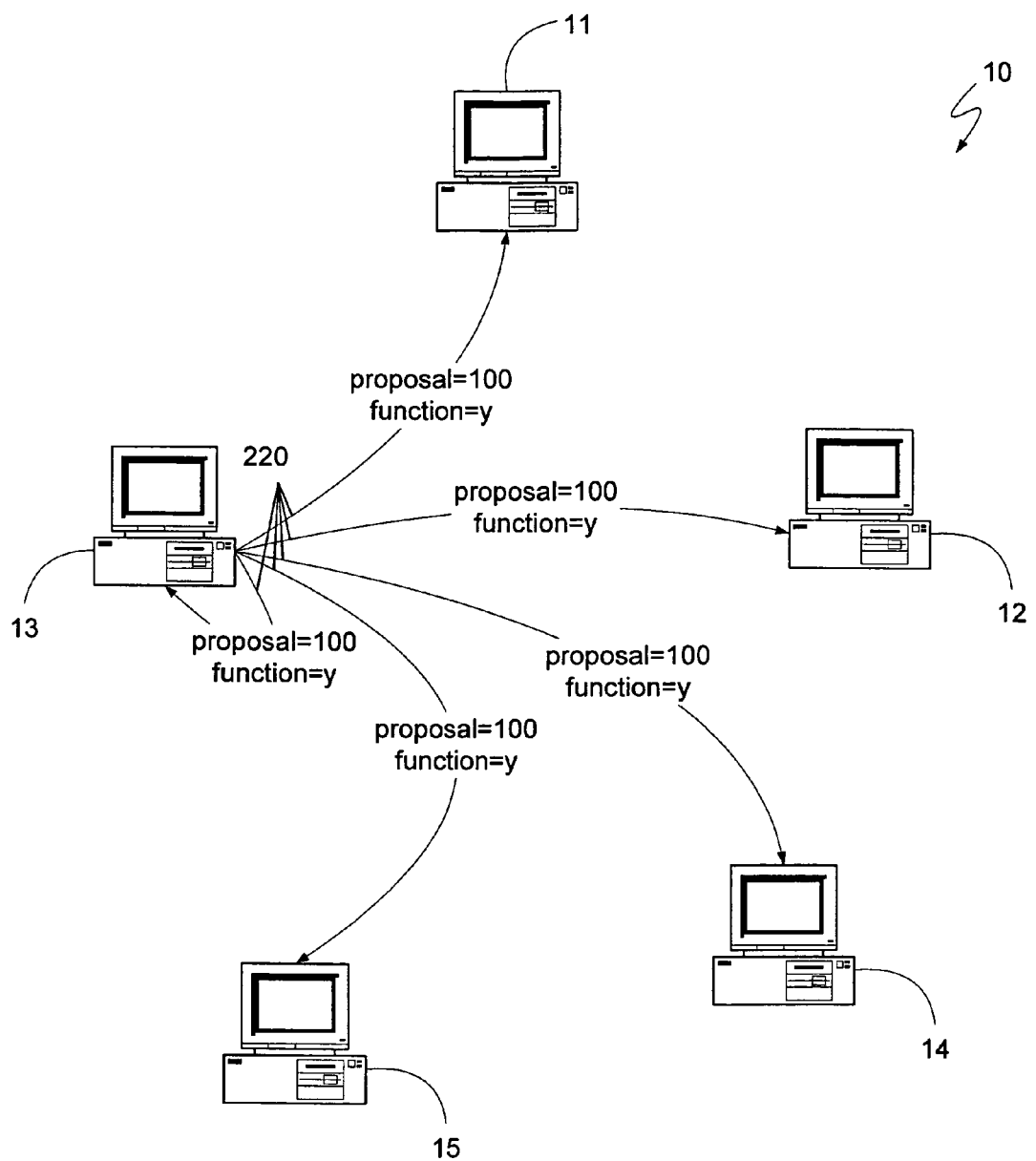

Turning to FIG. 3c, after the leader 13 receives messages 211-215, the leader can determine an appropriate function to propose such that the function proposed is equivalent to the function with the largest proposal number that was voted on by any member of the quorum. If none of the quorum members had voted on any previous proposal, then the leader is free to select whichever function the leader wishes to propose. Therefore, given the messages 211-215 illustrated in FIG. 3b, device 13 can select to solicit votes for the execution of function "y" as that function was voted for by device 12 as part of proposal number 70, which is the proposal with the largest proposal number of which the leader 13 has learned. However, because the system 10 illustrated in FIGS. 3a through 3e contains five devices, a quorum can be as few as three devices. Thus, it is sufficient for the leader 13 to select any three or more devices to act as a quorum. Consequently, a quorum selected by the leader 13 may not include the device 12. In such a case, the leader 13 need not propose the function "y" because device 12 is not a member of the selected quorum. Instead, the leader 13 can propose a function that was proposed with the largest proposal number that the devices in the leader selected quorum previously voted for. If none of the devices had previously voted for any proposals, the leader can propose any function it chooses.

Because the message 200, suggesting a proposal number, acts as a mechanism by which the leader 13 can determine an appropriate proposal number to select, and enables the leader to learn of all lower numbered proposals that were previously proposed, it can be necessary for the leader 13 to send multiple messages, such as message 200, increasingly suggesting larger proposal numbers if the earlier messages have too low a proposal number. Rather than requiring the leader to send a multitude of messages, each device can respond with the largest numbered proposal for which it has voted irrespective of whether the proposal number suggested by the leader is larger or smaller than the previously voted for proposal. In such a manner, the leader 13 can more efficiently learn of previous votes and can more accurately select a proposal number with which to propose a function.

Returning to FIG. 3c, the leader 13 is shown selecting a quorum consisting of all of the devices of the system 10, and transmitting a message 220 seeking a vote on the execution of function "y" by the system 10. Upon receipt of message 220, each device can determine whether to vote for function "y". A device can vote for a function so long as the device has not responded to a suggestion of a new proposal having a larger proposal number than the proposal for which the vote is currently being requested. Thus, for the example illustrated in FIG. 3c, if any of the devices 11-15 had received and responded to another suggestion for a new proposal, having a proposal number greater than 100, prior to receiving message 220 from the leader 13, then that device may not vote for the function for which a vote was solicited by message 220.

Figure 3D:
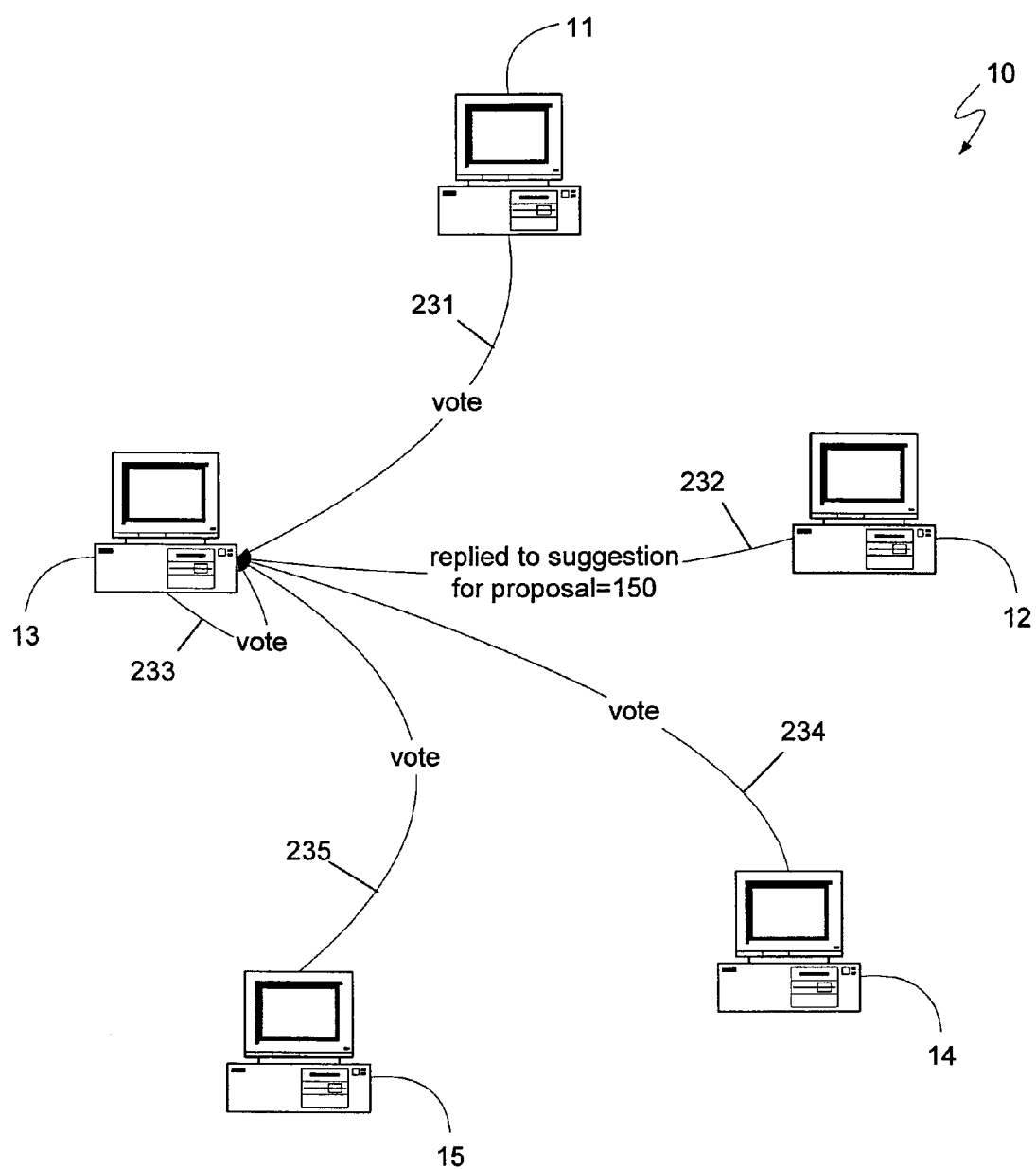

Turning to FIG. 3d, each of the devices 11-15 can independently determine that they have replied to no other suggestions for new proposals with proposal numbers greater than 100. Therefore, because the last suggestion for a new proposal to which they responded is not for a proposal with a larger number than the current proposal, devices 11 and 13-15 can vote for the proposal and indicate their votes in messages 231 and 233-235, respectively. As before, message 233 is shown for illustration purposes, and can be handled internally to device 13. Device 12, however, may have, sometime prior to the transmission of message 220, received and responded to a suggestion for a new proposal with a proposal number greater than 100. Therefore, upon receipt of message 220, device 12 can determine that it had already responded to a suggestion for a new proposal with a number greater than 100 and could not, therefore, vote for proposal 100. As a result, as shown in FIG. 3d, device 12 responds with message 232 informing the leader 13 that it has responded to suggestion for a proposal with a proposal number of 150. If leader 13 determines that it needs the vote of device 12, it can send another message, similar to message 220, except with a proposal number greater than 150. Alternatively, device 12 need not respond to message 220, and device 13 can, if it needs device 12's vote, attempt another vote with a proposal with an arbitrarily large proposal number. As can be seen, if device 12 does not indicate the larger proposal number to leader 13, the leader may have to guess and could waste resources guessing, through multiple messages, an appropriately large proposal number.

Figure 3E:
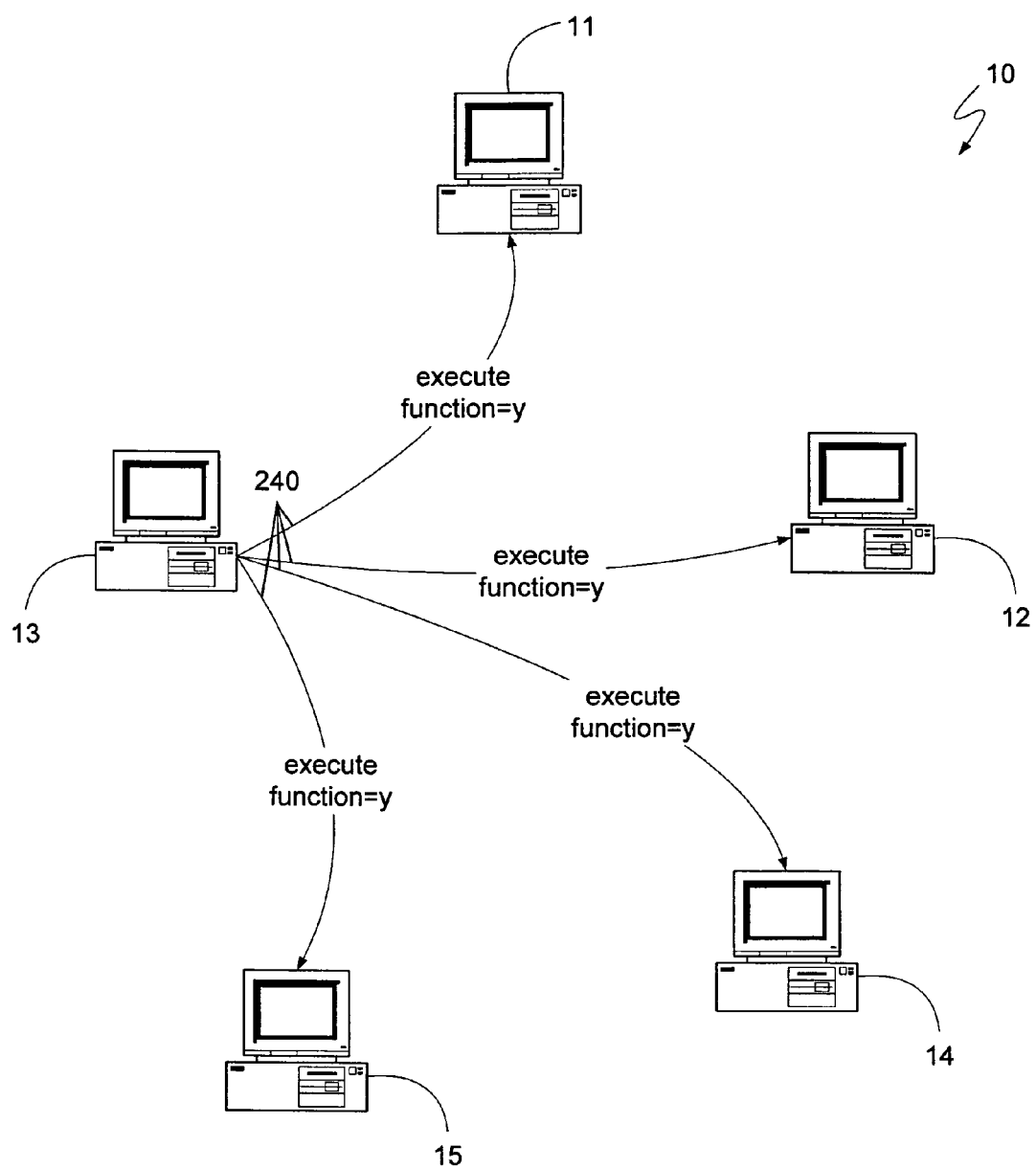

However, because devices 11 and 13-15 are more than sufficient to constitute a quorum, the leader 13 can determine that the proposal has been accepted, even without the vote of device 12, and can request, with message 240 as shown in FIG. 3e, that each of the devices 11-12 and 14-15 execute function "y". Device 13 can execute the function "y" upon determining that it was accepted, without waiting for the transmission of message 240. Consequently, device 13 need not, even internally, send message 240.

While devices 11 and 13-15 do constitute a quorum, it is not the same quorum to which leader 13 submitted the proposal to a vote, which included device 12. However, as described above, a leader need only receive votes from a quorum, and not necessary the same quorum to which the request was sent, to determine that the proposal has been accepted. The Paxos algorithm described above ensures that only a single function is selected and executed by the system 10 for any given step in its operation. For example, if another device that was previously non-operational, became operational and re-joined the system 10, it might try to propose a function different from "y" for the same step for which the system had selected and executed "y". If such a device sent a proposal with a proposal number less than 100, it could be ignored by devices 1 and 13-15, since they had already voted on proposal number 100 as shown in FIG. 3*d*. On the other hand, if the device sent a proposal with a proposal number greater than 100, such as proposal number 130, devices 11 and 13-15 would return a message indicating that they had voted for function "y" in proposal number 100. Device 12, because it may not have voted, as illustrated in FIG. 3*d*, might respond with message 212, indicating that it had voted for function "z" in proposal number 30.

The new device could then select the largest proposal among a quorum, which, by definition would include at least some of the devices 11-15, and submit the function proposed in that proposal for voting. Thus, for whatever proposal number above 100 that it chose, the new device would submit function "y" for a vote. Each device could then vote on that proposal following the algorithm set forth above. Either proposal 130 would be selected, which would not change the prior decision to execute the function "y" for the particular step, or it would fail because too many devices had, in the meantime, promised to vote for another proposal. However, as can be seen, once a proposal is passed, all other proposals will propose the same function, and, by definition, all of the devices can only vote for that same function. In such a manner the Paxos algorithm ensures that every device the system 10 executes the same function for a given step.

The application of the Paxos algorithm, described above, can enable a distributed computing system to select a function to execute for a given step. By repeating the operations described above, a distributed computing system can agree upon a series of functions to be performed as a series of steps, and can thereby form a continuously operating system. In such a manner the distributed computing system can receive requests from one or more clients, can execute those requests, and can return the results to the clients.

Figure 4A:
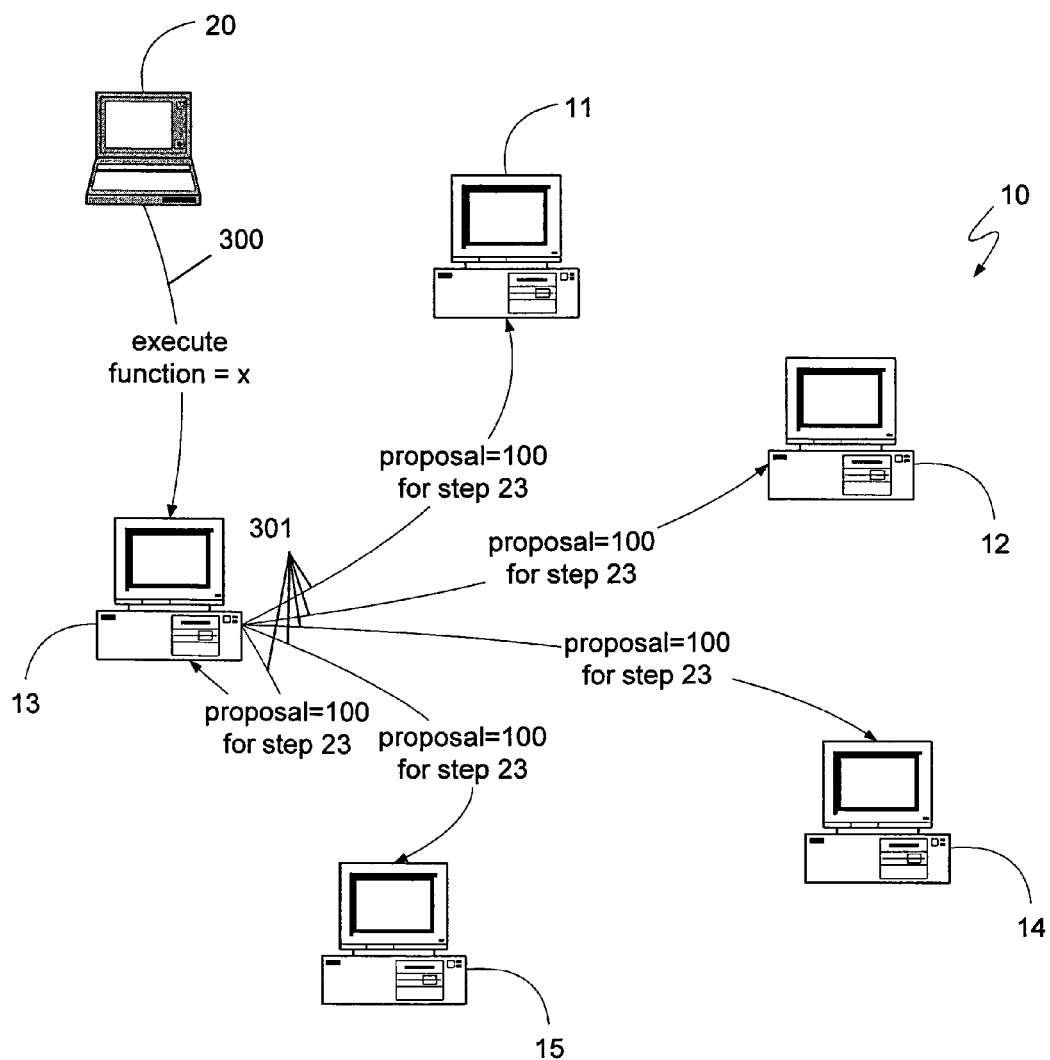
FIG. 4a-g generally illustrate one aspect of the operation of a multi-phase consensus algorithm contemplated by an embodiment of the present invention.
Figure 4A:
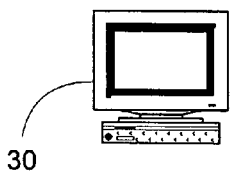
Figure 4A:
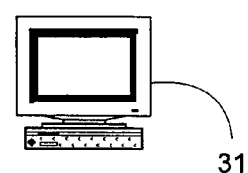

Turning to FIG. 4*a*, the system 10 can have already been operational for a number of steps. For example, in the exemplary system 10 illustrated in FIG. 4*a*, the most recently selected step can be step 24, and step 25 can be the current step. However, the device that was previously acting as a leader may have failed, or simply not received any client requests. Client 20 can send a request to execute a function, represented by the variable "x" in FIG. 4*a*, to device 13 using message 300, as shown. Device 13 can, according to any number of mechanisms, such as those described above, determine that it should attempt to become a leader. As such, device 13 can send message 301 suggesting the use of proposal number 100 for the next proposal, and including the step for which the proposal is being made. In the exemplary distributed computing system 10 of FIG. 4*a*, device 13 is not aware that steps 23 and 24 have already been decided upon by the other devices 11-12 and 14-15. Thus, message 301 indicates that it is suggesting a proposal numbered 100 for step 23.

To expedite the operation of the algorithm in a system executing multiple steps, a message, such as message 301, can be understood to suggest a proposal numbered 100 for all steps greater than or equal to step 23. In such a manner, the leader 13 need not continually transmit messages, such as message 301, until it learns of every step that has already been decided. Instead, the leader 13 can learn of the already selected steps through only a single message round trip, as will be shown.

Figure 4B:
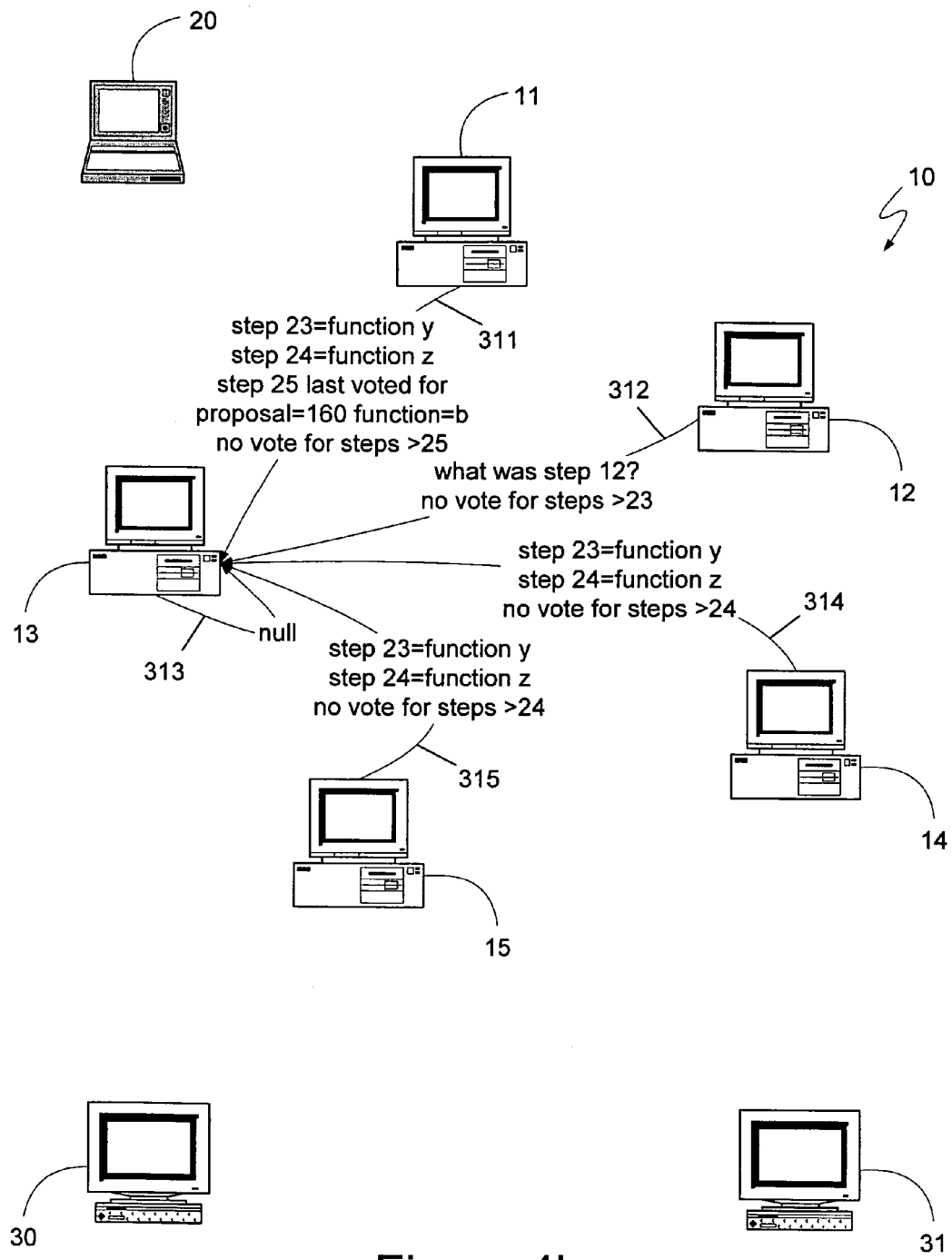

Turning to FIG. 4*b*, response messages 311-315 from the devices 11-15 of distributed computing system 10 are shown. Devices 11, 14, and 15, for example, have recorded that function "y" was selected for step 23 and function "z" was selected for step 24. Thus, upon receipt of message 301, devices 11, 14, and 15 can respond with messages 311, 314, and 315 indicating the functions they have stored as being selected for all steps greater than or equal to 23; in this case steps 23 and 24. In addition, devices 11, 14, and 15 can provide an indication of the proposals with the largest proposal numbers for which they have voted for steps greater than or equal to 25. Thus, in the example illustrated in FIG. 4*b*, message 311, can also indicate that device 11 did not vote for any proposals for steps greater than 25, and that it voted for proposal number 160, proposing function "b" for step 25. Messages 314 and 315, on the other hand, can indicate that devices 14 and 15 have not voted for any proposals for any step greater than step 24. To decrease the number of messages being transmitting within the system 10, devices need only respond with their highest proposal number votes if they do not know of a function that has been selected for the given step. Thus, because device 11 was aware that functions were selected for steps 23 and 24, but not step 25, it responded with the functions selected for steps 23 and 24 and the highest numbered proposal for which it voted for step 25.

As before, device 13 can act as both a leader and a voting device. As such, device 13 can send itself messages, such as message 301, and it can respond to itself with messages such as message 313. Such messages are shown in the figures for illustrative purposes only, as they would likely be transmitted internally to device 13. Furthermore, because device 13 can check what is the step with the largest step number for which it knows the function selected, and it can check what the largest proposal number is for the proposals for all steps above that which device 13 voted for, message 313 should rarely contain any information other than a null indicator.

The current state of a state machine may depend, not only on the functions that were selected, but on the order in which those functions are executed. Therefore, if a device does not know which function was selected for a given step, there may be situations in which that device should not execute any functions beyond that step or it will execute functions out of order and its state will be different from that of the distributed computing system. For example, some functions, such as functions that specify a new state unconditionally, are independent of the current state of the device. Such functions can be executed even if functions for steps having lower step numbers than the current step have not yet been executed. Similarly, functions for which the output can be computed without knowing all of the previous steps, such as writing to a database, can also be partially executed out of order to generate the output to be sent to the client. In general, however, a function should not be executed until all previous functions have been executed. Therefore, a device can always attempt to learn which functions were selected for a step that the device missed. When device 13 sends message 301, as shown in FIG. 4*a*, it is an implicit statement that device 13 believes that step 23 is the next step and that it has knowledge of the agreed upon functions through step 22. A device that is missing a function for a step below step 23, therefore, knows that device 13 has knowledge of all of the functions through step 22, and it can request that function from device 13.

Returning to FIG. 4*b*, device 12 does not know what function was selected for step 12. As a result, device 12 may have been unable to execute any functions since step 11, even though it may know the functions selected for steps 13-23. Thus, in message 312, device 12 can request the function for step 12 from the leader 13. In addition, device 12 can indicate that it has not voted on any proposals for steps numbered higher than step 23.

If a device has missed too many steps, it can be more efficient to simply inform the device of the current state rather than transmitting all of the functions for all of the steps it has missed. One mechanism for ensuring that a device does not miss too many steps is to enable each device, or a collection of devices, to periodically take a snapshot of the various parts of the state, or the whole state. The state of another device could, therefore, be updated by sending it the appropriate snapshot together with the functions that were selected since the latest snapshot. Additionally, by using checksums of individual parts of the state, the state of another device could be updated by just sending that other device the parts of the state that differ from its current copy. As will be clear to one skilled in the art, by hierarchically decomposing the state and using checksums of the decomposition at each level, the part of the state that changed can be determined efficiently with arbitrary precision.

As a result of receiving messages 311 through 313, the leader 13 can learn of the selected functions for steps 23 and 24, of which it did not previously know, attempt to determine the appropriate function to propose for step 25, and can attempt to update other devices that also have not already learned of the selected functions for all of the steps through step 25. Originally, the leader 13 suggested a proposal number of 100 in message 301, but device 11 responded with message 311 indicating that it had already voted for a proposal with a larger proposal number than 100 for step 25. Consequently, leader 13 can select a proposal number greater than the largest proposal number of which the leader is aware of and transmit another suggestion message such as message 320 shown in FIG. 4*c*. Alternatively, device 11 could have simply ignored the suggestion for proposal number 100 in message 301 because the proposal number was less than the proposal number of the proposal for which device 11 had already voted for. In such a case, the leader would have retried by increasing the proposal number in an attempt to account for devices that ignored the initial suggestion. As can be seen, if devices ignore suggestions for proposals with proposal numbers that are less than the proposal numbers of the proposals for which the devices had already voted, the leader may be forced to perform multiple retries, each time increasing the suggested proposal number. Such multiple messages can be inefficient. It may, therefore, be preferable for devices to respond to all suggestions for a new proposal number, even if the proposal number is less than the proposal numbers of the proposals for which the devices had already voted, because the leader can then determine, with greater precision, an appropriate proposal number to suggest, and can avoid multiple messages.

Figure 4C:
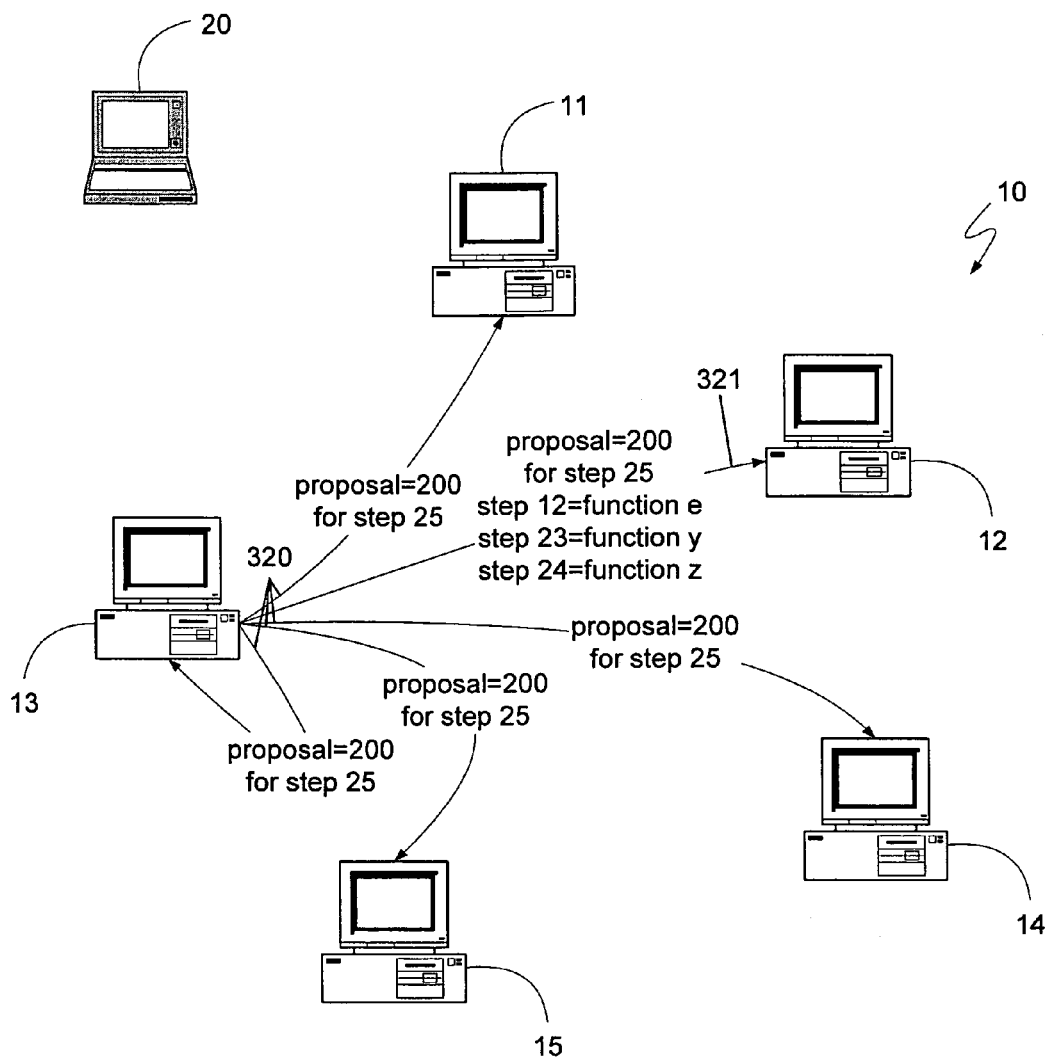

Turning to FIG. 4*c*, the leader 13 can suggest a larger proposal number, such as proposal number 200 as shown in message 320, in an attempt to suggest a proposal number that is larger than the number of any proposal which leader 13 has learned that a device has previously voted for. In addition, the leader 13 can also provide information regarding previously selected functions to any device that has not already aware of those selected up until step 25. Therefore, as shown, the leader 13 can also send a message 321, indicating to device 12 that a function represented by the variable "e" was selected for step 12, and that a function represented by the variable "z" was selected for step 24.

Figure 4D:
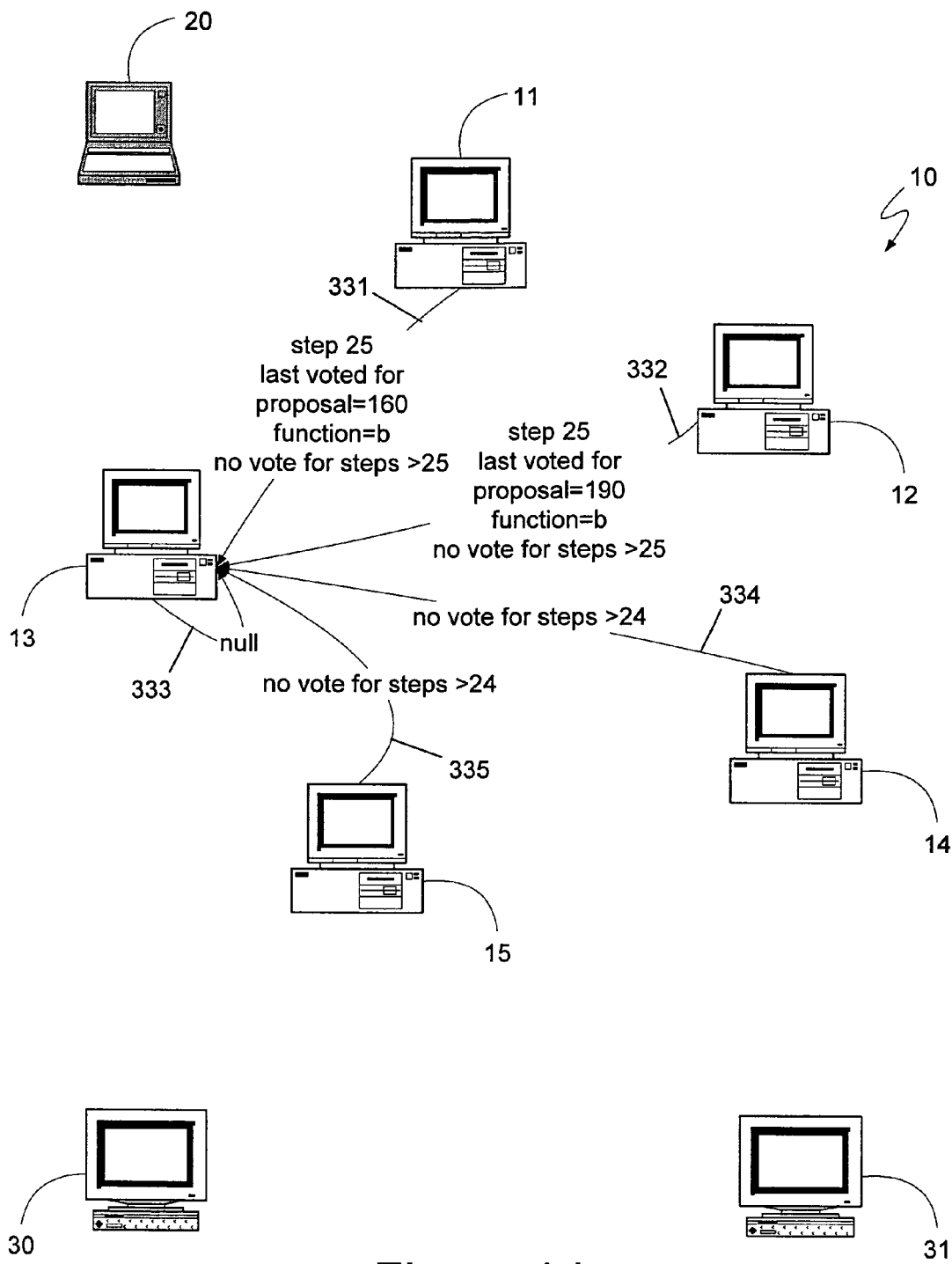

In FIG. 4*d*, then, the devices 11-15 can respond, in a manner similar to that shown above in FIG. 4*b*, with the exception that devices 11-15 need not inform device 13 of selected functions for steps 23 and 24, as device 13 has already learned of these steps and has sent proposal messages 320 and 321 referencing step 25. Furthermore, messages 331-335 can contain additional information, such as additional proposals for which the devices may have voted for. For example, device 12 may have, sometime between the transmission of message 312 and message 332, voted for a proposal with a proposal number 190. Consequently, message 312 can indicate that device 12 may not have previously cast a vote for any proposal for step 25, but message 332 can indicate that device 12 has voted for proposal 190 for step 25, though it has still not voted for any proposal for steps greater than 25. However, because each of the proposal numbers are less than the suggested proposal number the leader 13 sent in message 320, the leader can proceed to propose a function with the proposal number 200 specified in message 320.

Figure 4E:
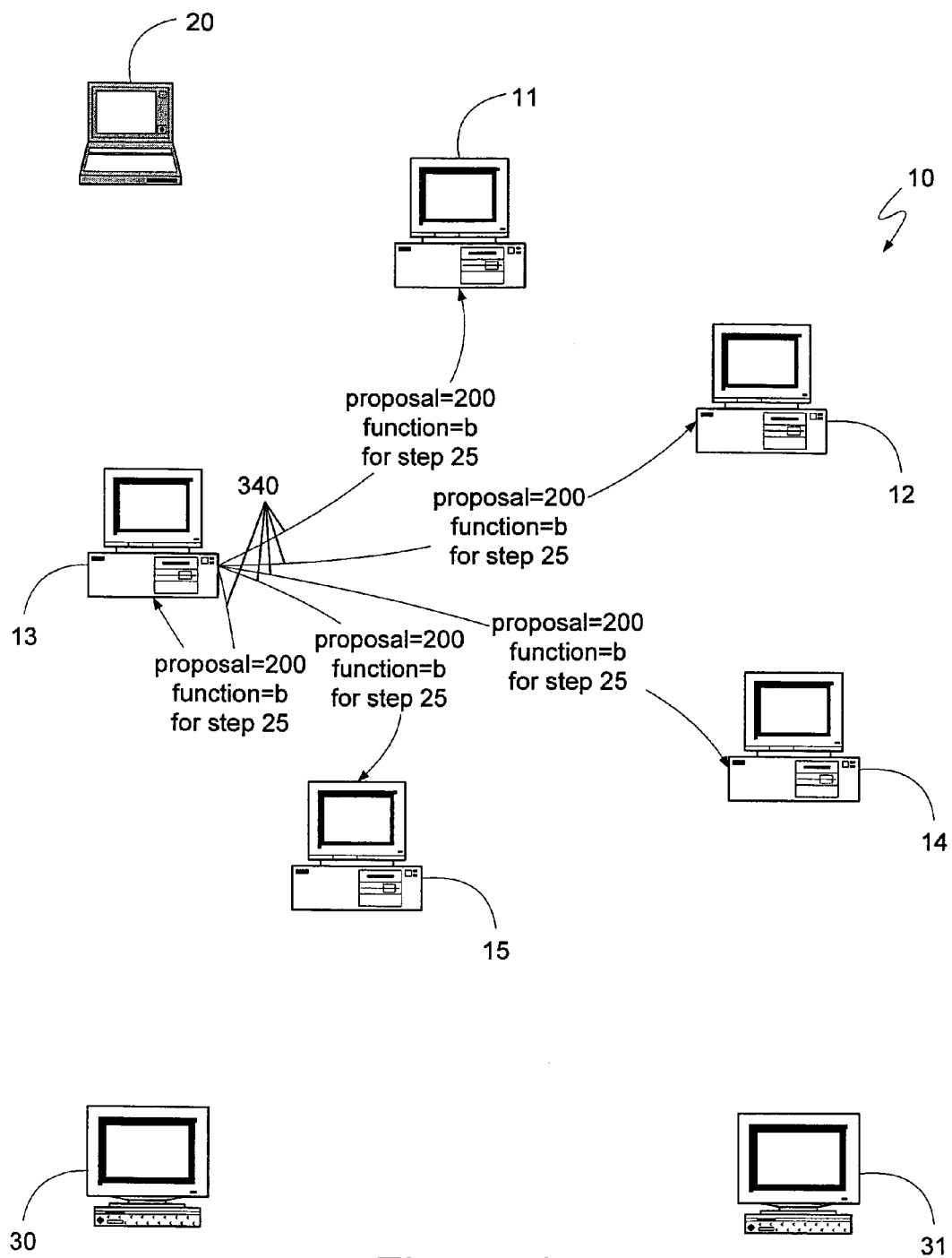

Turning to FIG. 4*e*, the leader 13 now has sufficient information with which to select a proposal to submit as proposal number 200, as illustrated by message 340, which requests that devices 11-15 vote on proposal 200, proposing that the system execute function "b" for step 25. As before, because devices 11 and 12, both members of the quorum, have previously voted for a proposal proposing the execution of function "b", and no other member of the quorum has voted for any larger numbered proposals, the leader 13 can propose function "b" for proposal number 200, despite the fact that the client 20 requested the execution of function "x" in message 300. In such a manner, the Paxos algorithm insures that previous functions that were proposed but not completed, such as because of a failure of one or more devices or their communications, can be executed in the proper order.

Figure 4F:
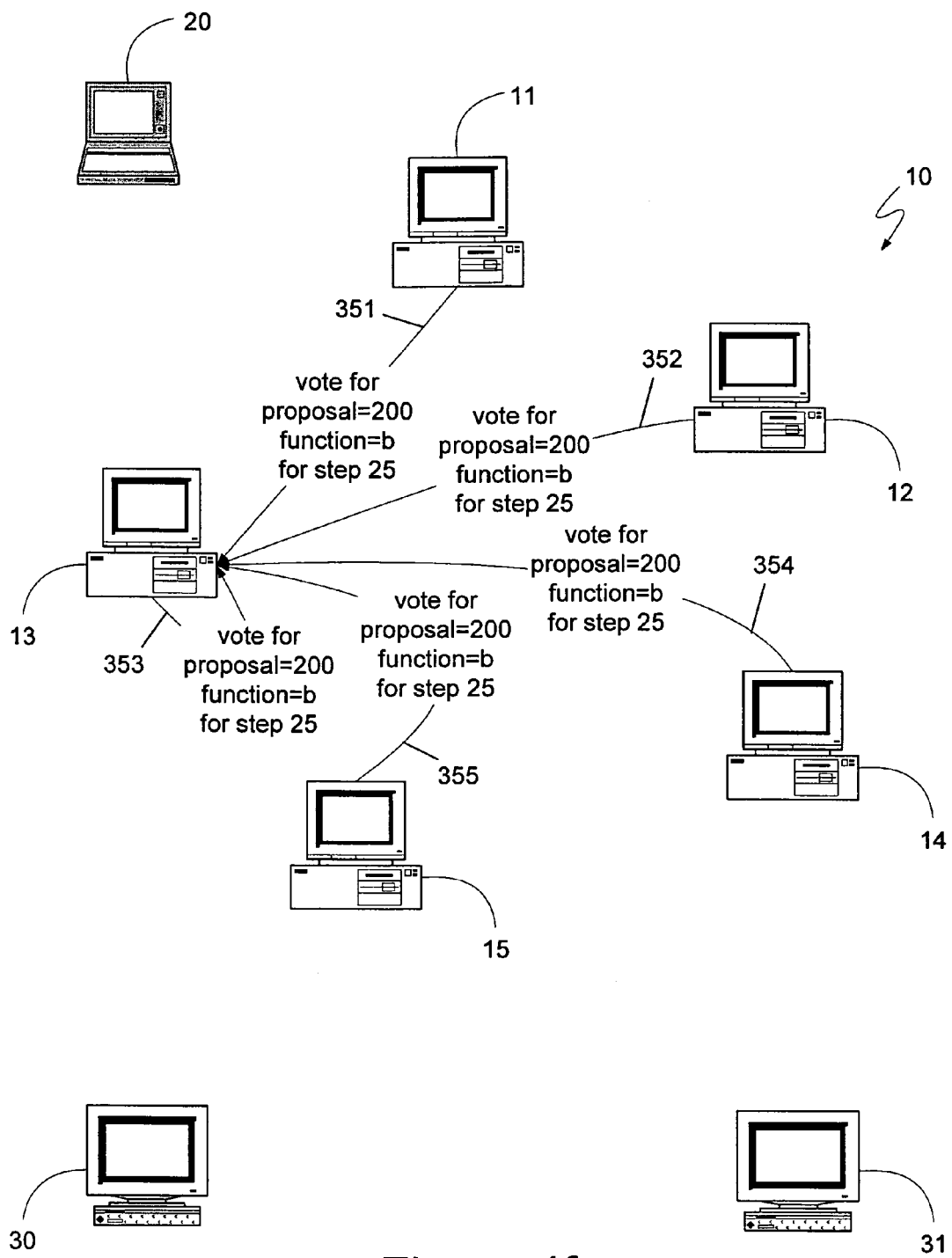
Figure 4G:
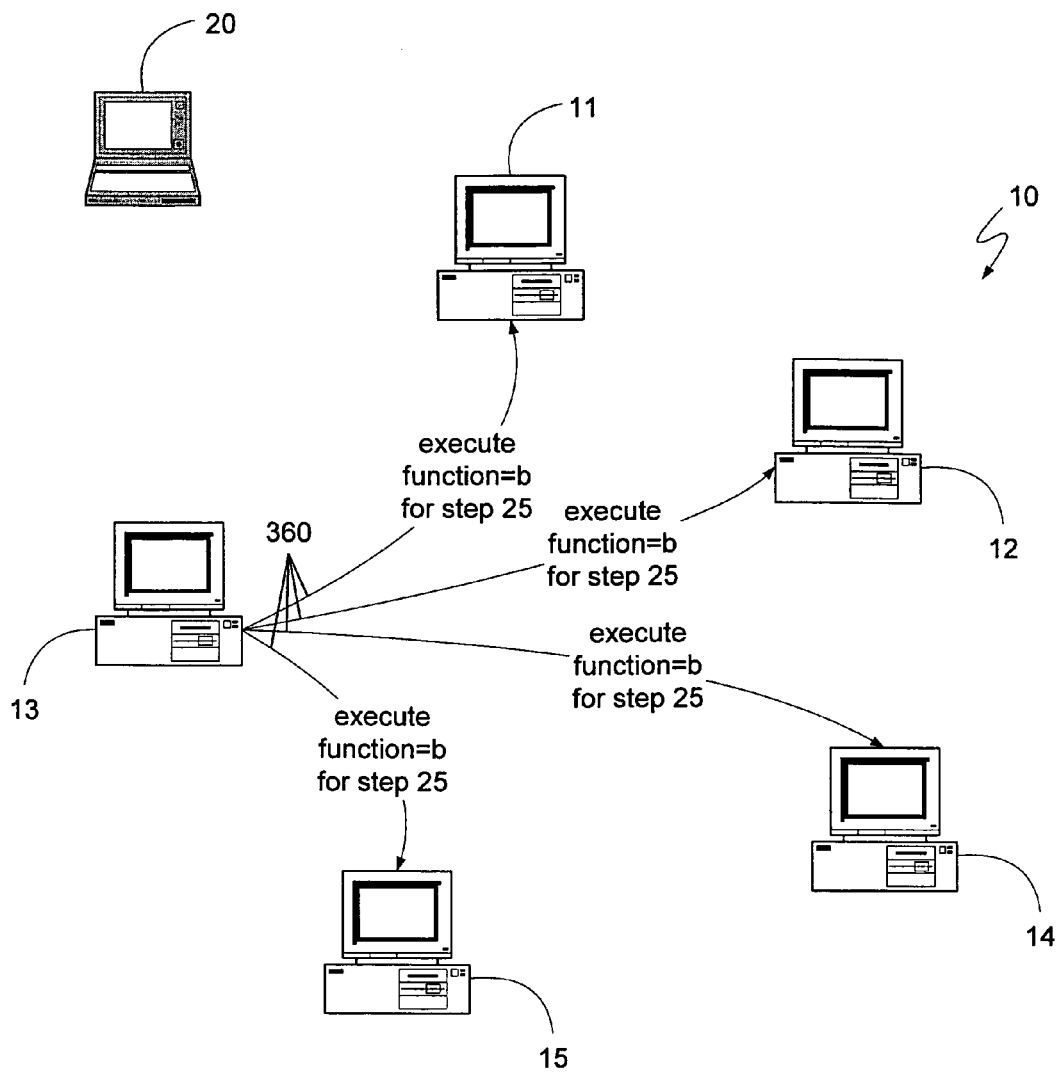
Figure 4G:
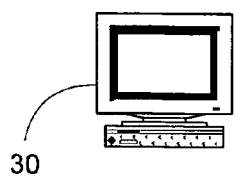
Figure 4G:
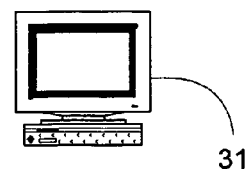

FIG. 4*f* illustrates devices 11-15 voting, for step 25, for proposal 200 proposing function "b" with messages 351-355, respectively. As before, a device can vote for a proposal so long as it has not promised to vote for a different proposal with a larger proposal number between the receipt of messages 320 and message 340. Once the leader 13 receives messages 351-355, it can transmit a message 360, as shown in FIG. 4*g*, informing the devices 11-12 and 14-15 that the function "b" was selected for step 25. The leader 13 can also store this information itself, since it now knows that the function was selected by a quorum.

However, the function requested by the client 20 in message 300 has not yet been selected by the system 10 at the point in time illustrated in FIG. 4*g*. To have the system 10 selected the client's request, the leader 13 can perform an abbreviated version of the complete Paxos algorithm illustrated by FIGS. 3*a-e* and 4*a-g* above.

Conceptually, the Paxos algorithm described above can be divided into two general phases. The first phase comprises the leader learning of previous proposals that were voted for by the devices in the quorum. The first phase can contain one iteration of a proposal number suggestion by the leader and responses by other members of the quorum, as illustrated by FIGS. 3*a* and 3*b*, or multiple iterations of proposal number suggestions and responses, as illustrated by FIGS. 4*a-d*. The second phase comprises the leader submitting a proposed function for a vote, receiving the votes, and, if the proposal was voted on by a sufficient number of devices, instructing the devices to execute the agreed to function. Examples of the second phase are illustrated by FIGS. 3c-e and 4e-g.

Once the leader learns of other proposals, and finds a proposal number that is safe for all of the current and future steps, it does not need to solicit further information unless it fails, or another device attempts to become a leader. Therefore, the first phase of the Paxos algorithm may be performed less frequently, while the second phase may be performed repeatedly, with ever increasing step numbers, allowing a distributed computing system to agree upon a series of functions and maintain an active running state.

Figure 5A:
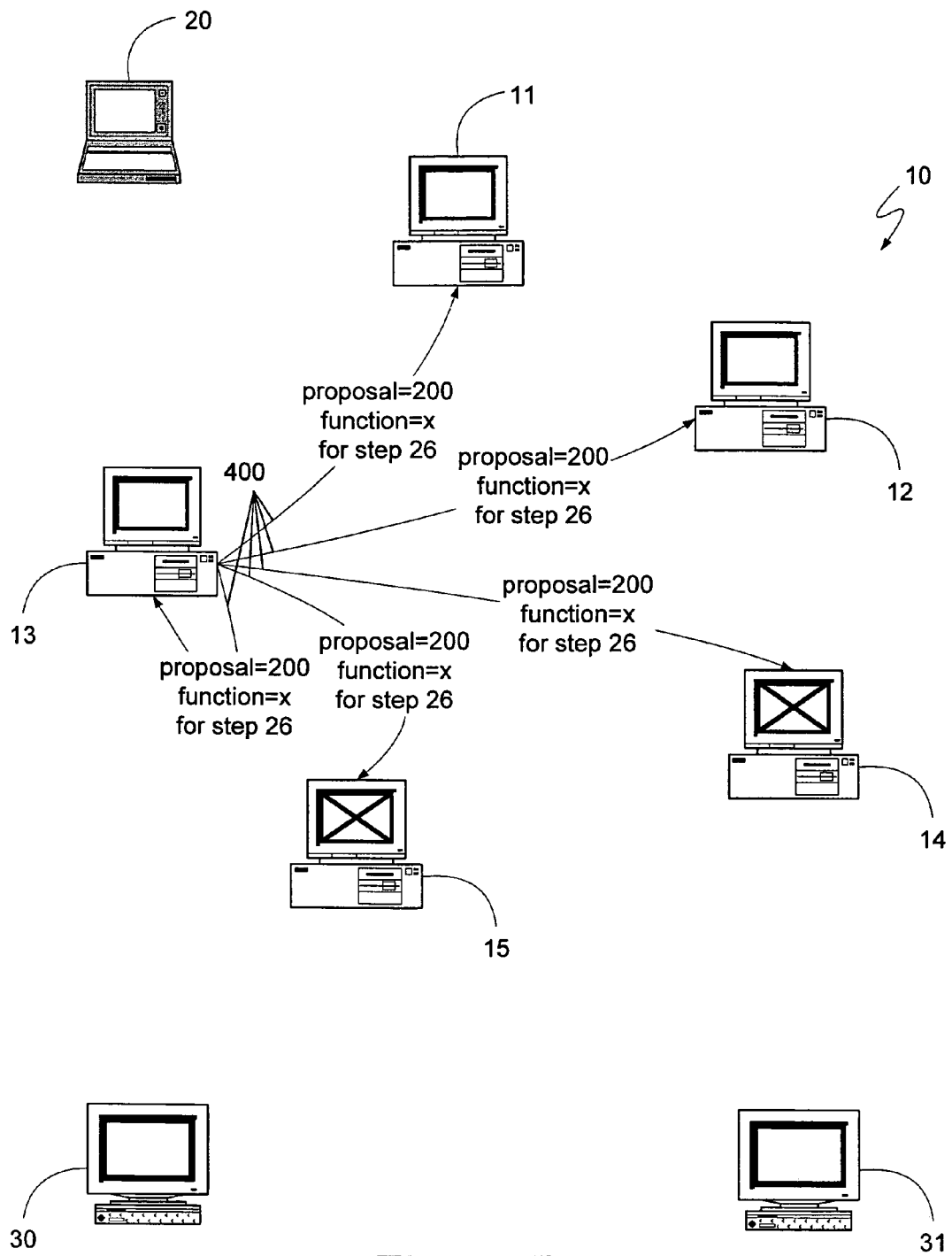
FIGS. 5a-c generally illustrate another aspect of the operation of multi-phase consensus algorithm contemplated by an embodiment of the present invention.
Figure 5B:
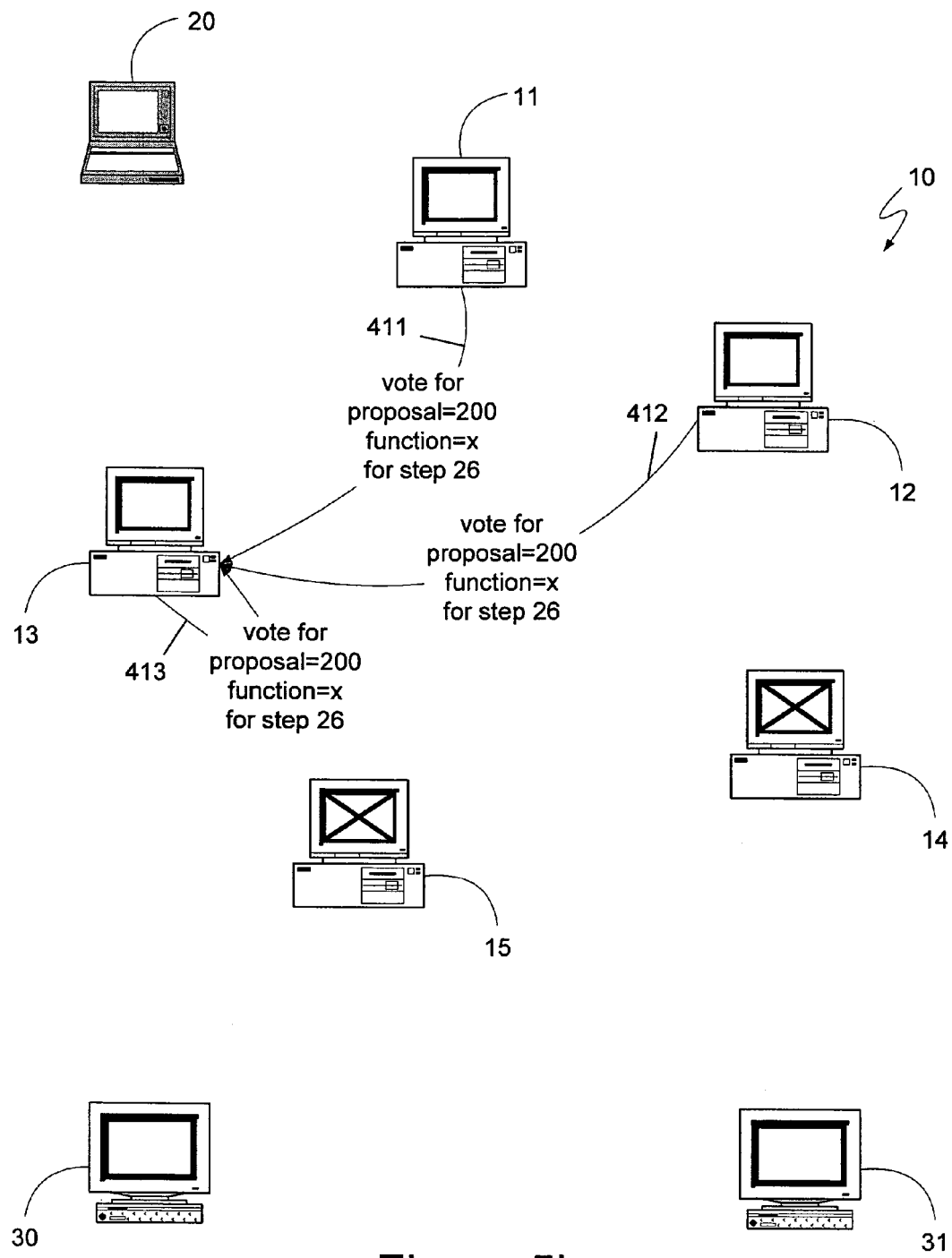

Turning to FIG. 5a, the exemplary distributed computing system 10 from FIGS. 4a-g is shown with the leader 13 proposing a function to be selected for a system step 26 that is subsequent to step 25 described in detail above. As a result of the first phase of the Paxos algorithm, as illustrated in FIGS. 4a-d, and described in detail above, the leader 13 already is aware that none of the devices 11-15 has voted for any proposals above step 25 and that proposal number 200 is, therefore, safe for all proposals for steps greater than step 25. Therefore, as shown in FIG. 5a, for step 26 the leader can initiate the second phase of the Paxos algorithm, without needing to perform the first phase again, and can send a message 400 soliciting votes for function "x", which was requested by the client in message 300. Each of the devices 11-15 can then respond with votes. To illustrate the fault-tolerant nature of the Paxos algorithm, FIG. 5b illustrates only devices 11-13 responding messages 411-413. Devices 14 and 15 may have experienced a fault and either did not receive message 400, or cannot respond to it.

Figure 5C:
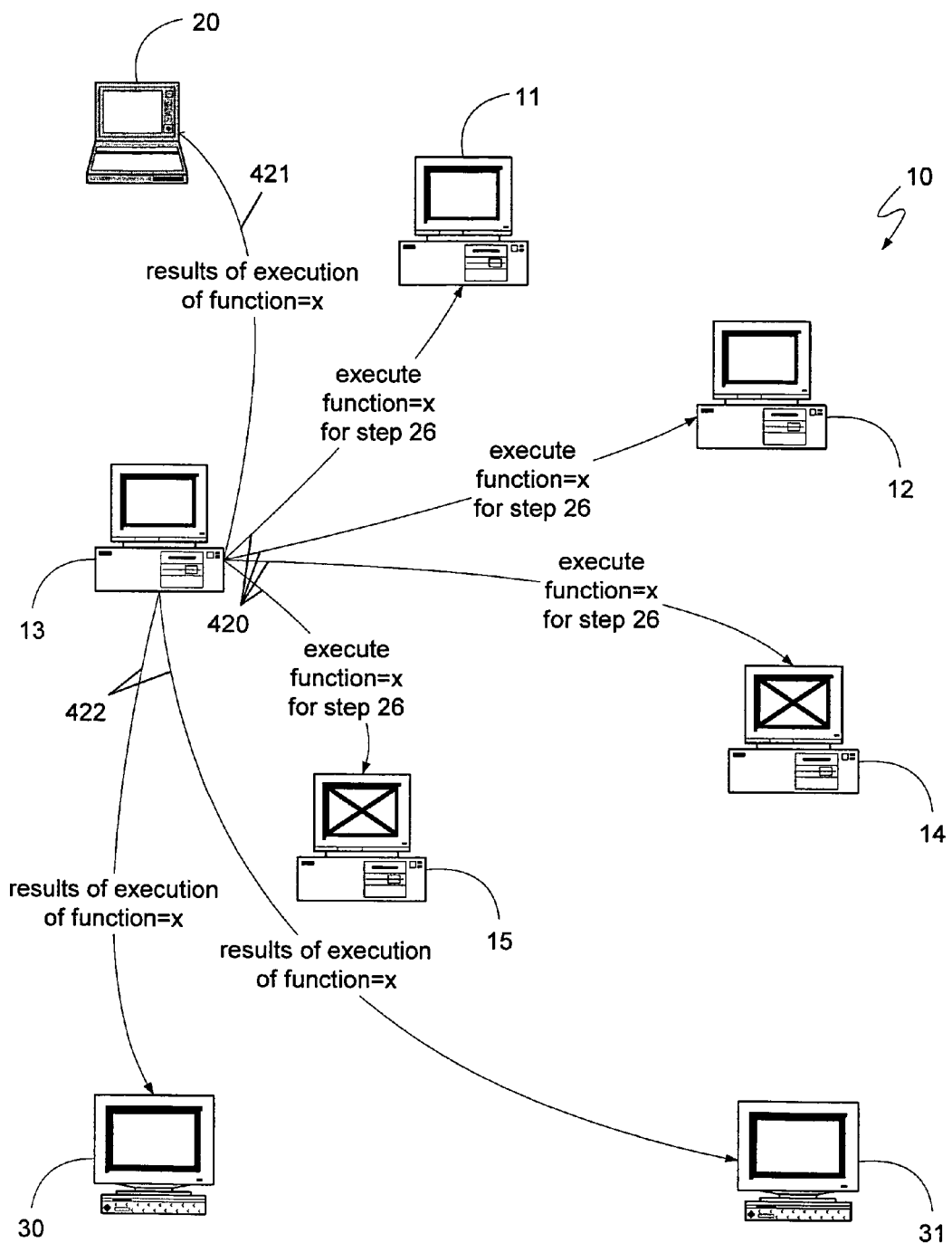

Nevertheless, the leader 13 can determine that the function "x" was selected because each of the devices in a quorum has voted for the execution of the function. As described above, a quorum can be any collection of at least a majority of the devices in the system implementing the Paxos algorithm, such as system 10. Consequently, while all of the devices 11-15 constitute one quorum of the system 10, devices 11-13, by themselves, constitute another quorum of the system 10. Because every device in the quorum comprising devices 11-13 has voted for function "x", the leader 13 can signal, with message 420, as shown in FIG. 5c, that function "x" was selected for step 26. In addition, because the leader 13 knows that the vote has succeeded, and as long as it is aware of the selected functions through step 25, it can execute function "x" for step 26 and can send the results of the execution of that function to the client as message 421, or to other interested computing devices, such as devices 30 and 31 as message 422. Messages 421 and 422 can be sent concurrently with message 420, or even before or after message 420.

As can be seen, once a leader has been established, and has learned the various highest numbered proposals voted on by the devices in the quorum for all upcoming step numbers, the leader can solicit proposals for a vote without cycling through the first phase of the Paxos algorithm. While the messages shown in FIG. 5a are described as taking place after the transmission of message 360 in FIG. 4g, the leader 13 need not wait for the devices to vote for one proposal before sending another proposal for a subsequent step. Therefore, upon sending message 340, as shown in FIG. 4e, the leader 13 can send message 400 shown in FIG. 5a, and can continue, in such a manner, proposing a series of functions, using proposal number 200, for steps greater than step 26. By operating in such an asynchronous fashion, the overall distributed computing system need not be slowed down by waiting to learn of votes for previous steps.

Should another device, such as a previously non-functioning device, attempt to become a leader, it would not cause the system to perform improperly, but would only succeed in causing the first phase of the algorithm to be repeated. For example, if another device attempted to become a leader, it might suggest a proposal number that some devices would respond to. Having responded to the proposal number offered by a second leader, the devices would then inform the first leader of the higher numbered proposal when the first leader solicited a vote, or the devices might ignore the request by the first leader to vote on its proposal. When the proposal failed, because an insufficient number of devices voted for it, the first leader would attempt to pass the proposal again by initially performing the first phase again and selecting what it believes is a sufficiently large proposal number which it can suggest to the devices. In such a manner, a second leader would only delay the system, but it would not cause improper operation on the part of the distributed computing system.

The devices implementing the Paxos algorithm, described above, can maintain variables storing information used in the algorithm. For example, for each step for which the devices do not know which function was chosen, the device can store the largest proposal number for which they responded to, the largest proposal number they voted for and the value of the corresponding proposal, and, if the device is a leader, it can additionally store the proposal number for the last proposal it issued. Additionally, devices can record which function was selected for all of the steps for which they have such information. Alternatively, a device could store a snapshot of its state at a given time, and the functions selected only since that time. For example, rather than storing each of the functions selected for steps 1-100, a device could store a snapshot of its state after the execution of step 75 and then only store the functions selected for steps 76-100, reducing the amount stored by a factor of four or more. Some or all of the above described information can be stored in either volatile storage 130 or non-volatile storage, such as hard disk 141, floppy disk 152, or optical disk 156, shown in FIG. 2.

Additional information regarding the Paxos algorithm can be found in the paper entitled "The Part-Time Parliament" by Leslie Lamport, published in ACM Transactions on Computer Systems, volume 16, number 2 on pages 133-169, dated May 1998, which is hereby incorporated by reference in its entirety to further explain or describe any teaching or suggestion contained within the present specification that is consistent with its disclosures.

Fast Paxos Algorithm

As can be seen from the above detailed description of the standard Paxos algorithm, once a leader has been established, and has learned the various highest numbered proposals for all upcoming step numbers that have been voted on by the devices in the quorum, the leader can solicit proposals for a vote without cycling through the first phase of the Paxos algorithm. To further decrease the number of message delays between the transmission of a client's request, and the transmission of a response to the client, the role of the leader in the second phase of the Paxos algorithm can be eliminated, and the devices of the distributed computing system can directly receive requests from clients such as client 20. Such an algorithm, which can be termed the "fast Paxos algorithm", relies on the above described property of the Paxos algorithm that, after a leader has established an appropriate proposal number, it often serves as a mere conduit for client requests and proposes requested functions without any additional polling of the devices of the distributed computing system.

Nevertheless, because the leader determined which functions were proposed, the Paxos algorithm could rely on the leader to ensure that functions that had previously been selected by one majority were also selected by any other majority for the same step, thereby ensuring consistency. Specifically, as described above, because every majority shared at least one device, that device would inform the leader of its previous vote and the leader could make certain that the current quorum voted for the same function for the same system step. Because the fast Paxos algorithm can operate without a leader, an alternative mechanism can be used to ensure that two quorums do not select different functions for the same system step. One such mechanism is to define a quorum as a sufficiently large number of devices so that any two quorums share a majority of their devices. In such a manner, a function selected by a previous quorum can be determined by polling any other quorum of devices and determining if a majority of the new quorum's devices have voted for the function.

Figure 6A:
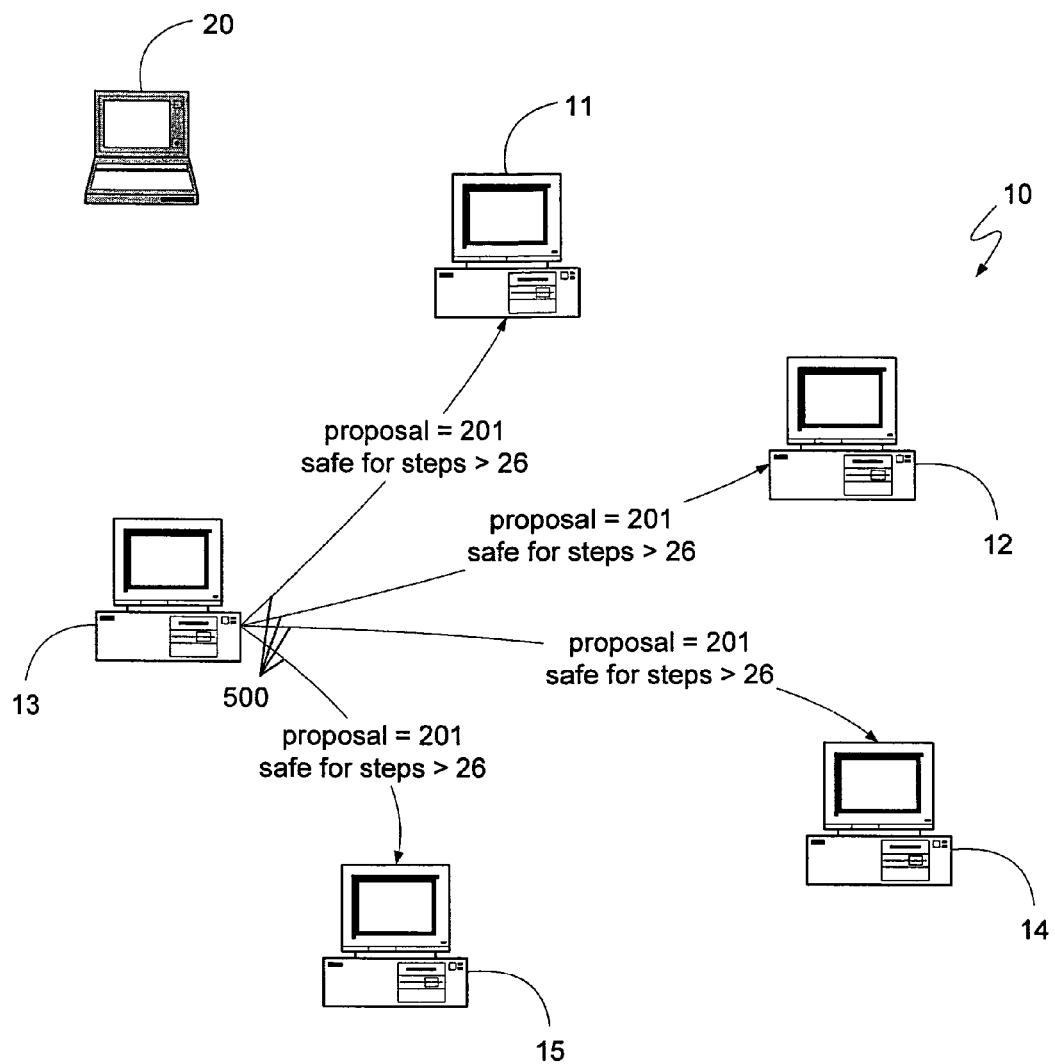
FIGS. 6a-d generally illustrate one aspect of the operation of a reduced message delay multi-phase consensus algorithm contemplated by an embodiment of the present invention.
Figure 6A:

Turning to FIG. 6a, an initial step of the fast Paxos algorithm is shown. Specifically, once the leader device 13 has determined an appropriate proposal number, it can notify each of the devices that they should treat any further messages from clients as proposals, for subsequent system steps, having the appropriate proposal number. For example, as shown in FIG. 6a, device 13 can send message 500 indicating that proposal number 201 is safe for all system steps greater than 26, indicating to the devices 11-15 that they should treat client requests as proposals of proposal number 201 for subsequent system steps.

As described in detail above, proposal numbers can be assigned to devices through various mechanisms. In addition to providing each device with a unique set of proposal numbers, the mechanism used to assign proposal numbers can be extended to categorize some proposal numbers as corresponding to the Paxos algorithm while other proposal numbers correspond to the fast Paxos algorithm. In such a manner, a device can know whether the current algorithm being used by the distributed computing system 10 is the Paxos algorithm or the fast Paxos algorithm, and can, therefore, make the appropriate adjustments. For example, as will be described in further detail below, devices in one implementation of the fast Paxos algorithm can anticipate the actions of a leader device if they learn of a conflict among the devices. A device can implement such mechanisms by noting the proposal number being used in order to determine if the Paxos algorithm or the fast Paxos algorithm is being used.

If proposal numbers were not correlated to a particular algorithm, the leader 13 in FIG. 6a could have indicated that proposal number 200 was safe for all steps greater than 26 since the leader has, as shown in FIG. 4d, already obtained an agreement by the devices 11-15 that they will not vote for any proposals having proposal numbers less than 200. Because a quorum of devices has promised not to vote for any proposals having proposal numbers less than 200, 200 can be considered a "safe" proposal number. Consequently, message 500 could have indicated to the devices 11-15 to treat further requests from clients as requests having a proposal number of 200.

However, if proposal numbers are correlated to a particular algorithm, as described above, then, as illustrated in FIG. 6a, the leader 13 can select a proposal number corresponding to the fast Paxos algorithm that is higher than any proposal number that was previously used of which the leader is aware. Because the leader 13 has been using a proposal number of 200, as illustrated in FIGS. 4c-g and 5a-c, the leader can select a proposal number higher than 200 that also corresponds to the fast Paxos algorithm, such as, for example, a proposal number of 201. However, before the leader can send message 500, the leader can determine that the proposal number is safe by, as described above, obtaining a promise from a quorum of devices not to vote for any proposals using lower proposal numbers. Once the proposal number of 201 is proposed and is accepted by a quorum, such as in the manner illustrated in FIGS. 4c and 4d, the leader 13 can transmit that proposal number to the clients 11-15. Because proposal number 201 corresponds to a fast Paxos algorithm, the devices 11-15 can know to treat further requests from the clients, such as client 20, as proposals having the transmitted safe proposal number.

Figure 6B:
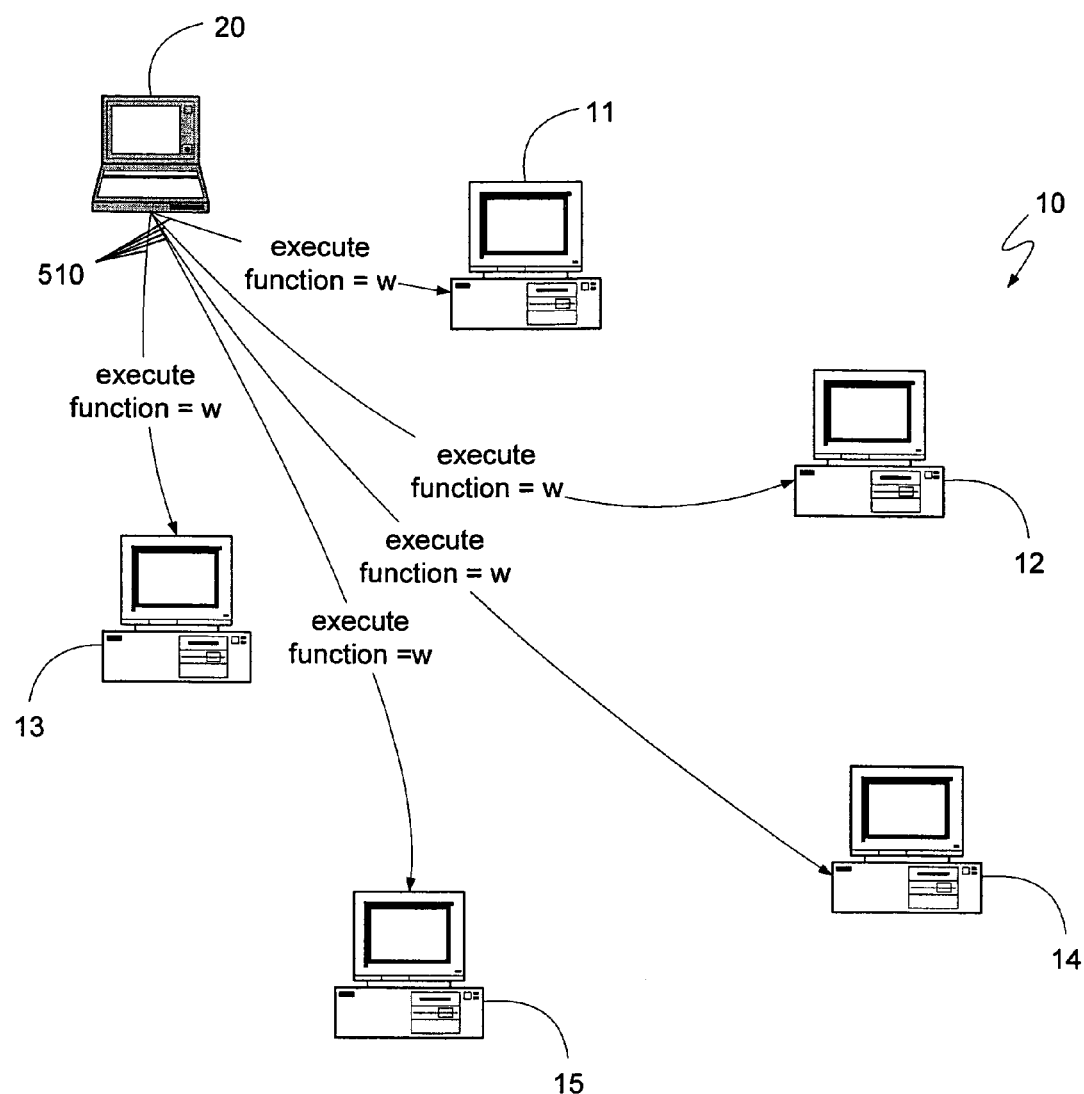
Figure 6B:
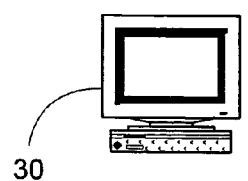
Figure 6B:
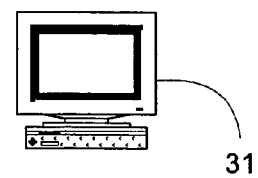

Turning to FIG. 6b, the operation of the fast Paxos algorithm is shown with reference to a request 511, from client 20 to the system 10. As can be seen, the client 20 sends request 510 directly to the devices 11-15, rather than sending it to a leader device, as was done with request 300. Each of the devices 11-15 can then treat the client's request as a proposal having a proposal number of 201 for a subsequent system step, which in the example illustrated in FIG. 6 would be step 27. Thus, each of the devices can determine whether to vote for the proposal based on any previous votes for step 27. Because, in the present example, none of the devices have voted for any other proposals, they can individually determine that the client's request of the execution of a function, represented by the variable "w" in FIG. 6b, is acceptable.

Figure 6C:
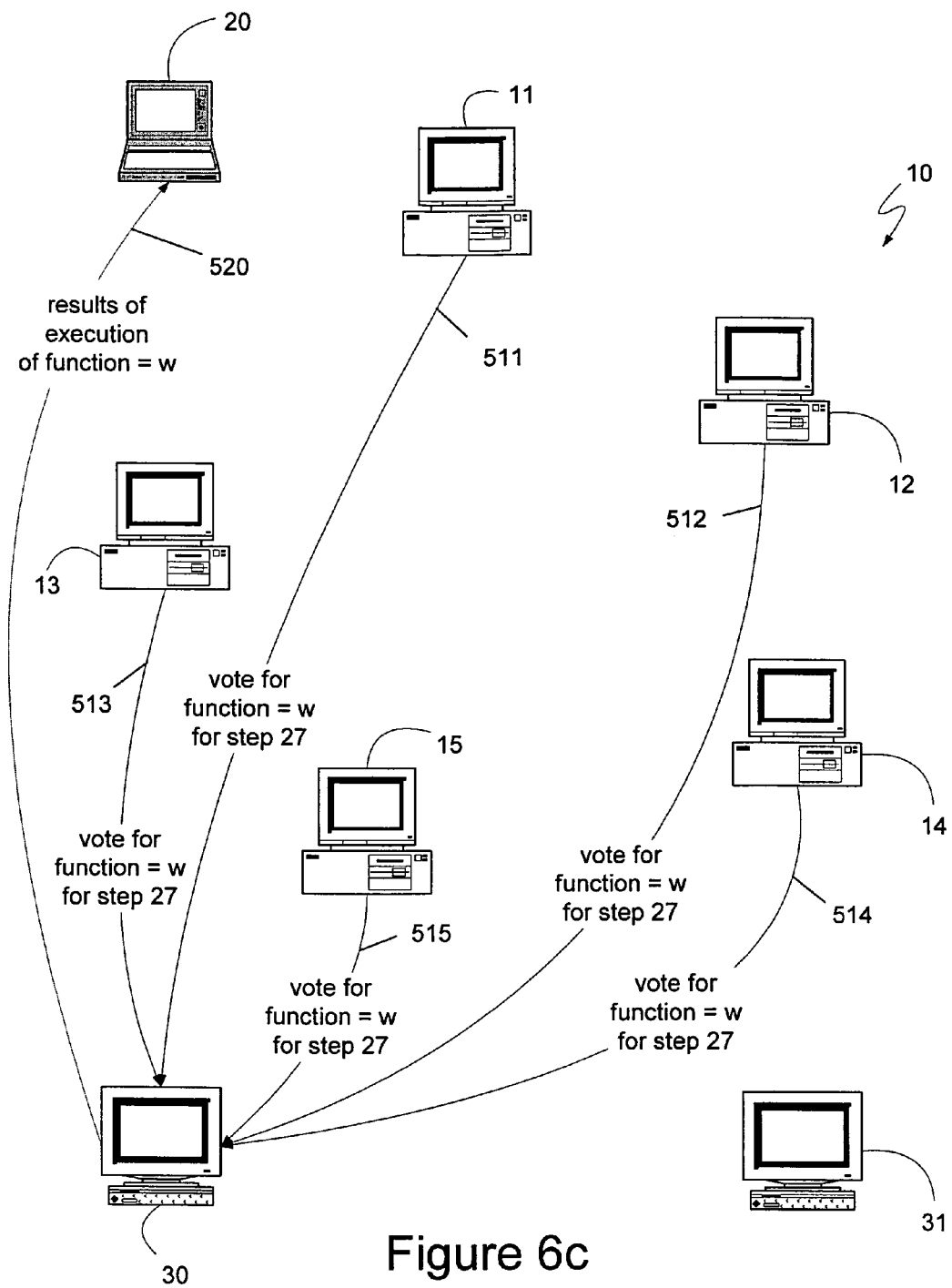

In one embodiment of the fast Paxos algorithm, illustrated in FIG. 6c, the devices 11-15 simply vote for the requested function. Thus, as shown, they would vote for the function represented by the variable "w" for system step 27. A further device, such as device 30, can act as a learner device and can learn of the decision made by the distributed computing system 10. As indicated above, if a quorum of devices of the system 10 votes for a particular function, then that function has been selected by the system. In the example illustrated in FIG. 6c, each of the devices votes for function "w". However, any one of the devices 11-15 could have failed or otherwise not voted for function "w", and it still would have been selected by the system 10 since any four devices comprise a quorum. As stated above, a quorum of devices for a fast Paxos algorithm can be any collection of devices that shares a majority of its devices with any other quorum. Expressed in terms of the number of failures that can be tolerated, a quorum can be any collection of devices larger than twice the number of failures that the system can tolerate. Consequently, as stated above, the size of a distributed computing system that seeks to implement the fast Paxos algorithm can therefore be larger than three times the number of failures that the system can tolerate.

Because, as illustrated in FIG. 6c, each of the devices 11-15 voted for the function "w" for system step 27, a learner device 30 can determine that the function "w" was selected by the distributed computing system 10, and can proceed to execute the function and return the results of that execution to the client 20 via message 520. Thus, the devices 11-15 can, when they vote for a particular function, transmit that vote to one or more learner devices, such as learner device 30. Alternatively, the devices 11-15 can merely store their votes and learner devices, such as device 30, can poll the devices 11-15 to determine if a new function has been selected for a further system step.

Figure 6D:
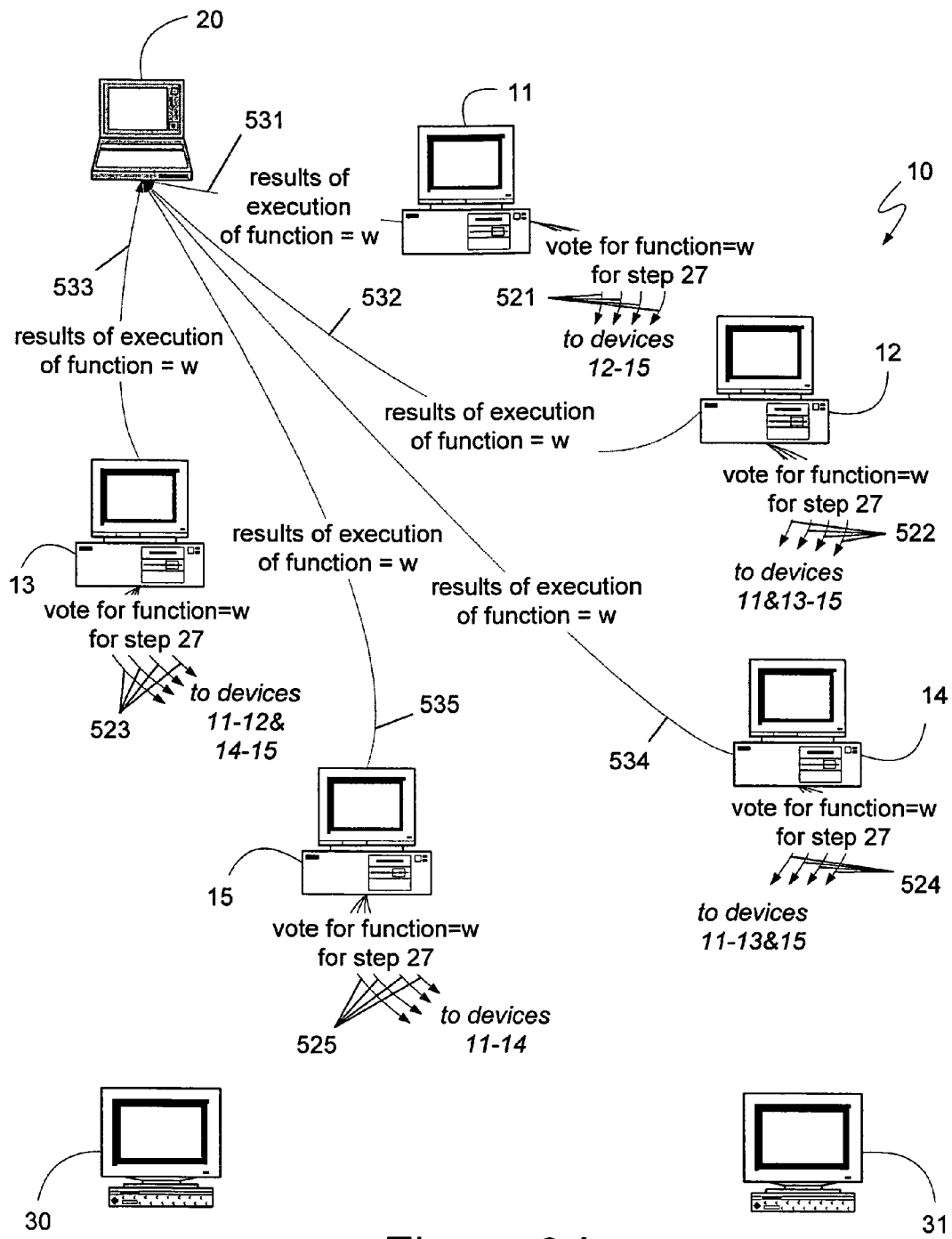

An alternative embodiment of the fast Paxos algorithm, as shown in FIG. 6d, contemplates that devices 11-15 can send their votes to each other, such as via messages 521-523. Once a device receives votes from a quorum of devices, including itself, for a particular function, it can determine that the function was selected and can execute the function and provide the results to the client 20. Since each device will be receiving the other devices' votes, each device can independently determine which functions were selected, and can independently transmit the results to the client 20. Consequently, the client 20 can receive multiple messages, such as messages 531-535, providing it the results of the requested function. In such a manner, some or all of the devices 11-15 can maintain a copy of the state of system 10, in effect each acting as learner devices.

As can be seen, the fast Paxos algorithm allows devices to propose functions to be executed by a distributed computing system, and receive responses, with fewer intervening message delays. For example, as shown in FIGS. 6b through 6d, only one set of messages was sent between the transmission of the client's request and the transmission of the results of the client's request. However, the fast Paxos algorithm may operate properly only so long as a quorum of devices remains operational. Thus, if two or more devices in the exemplary system 10 were to fail, no proposal could be selected since a quorum of operational devices does not exist. In such a case, the system 10 may resort to using the standard Paxos algorithm, which can define a quorum as a smaller set of devices, as described in detail above, and can, thereby, continue to act on client proposals.

Figure 7A:
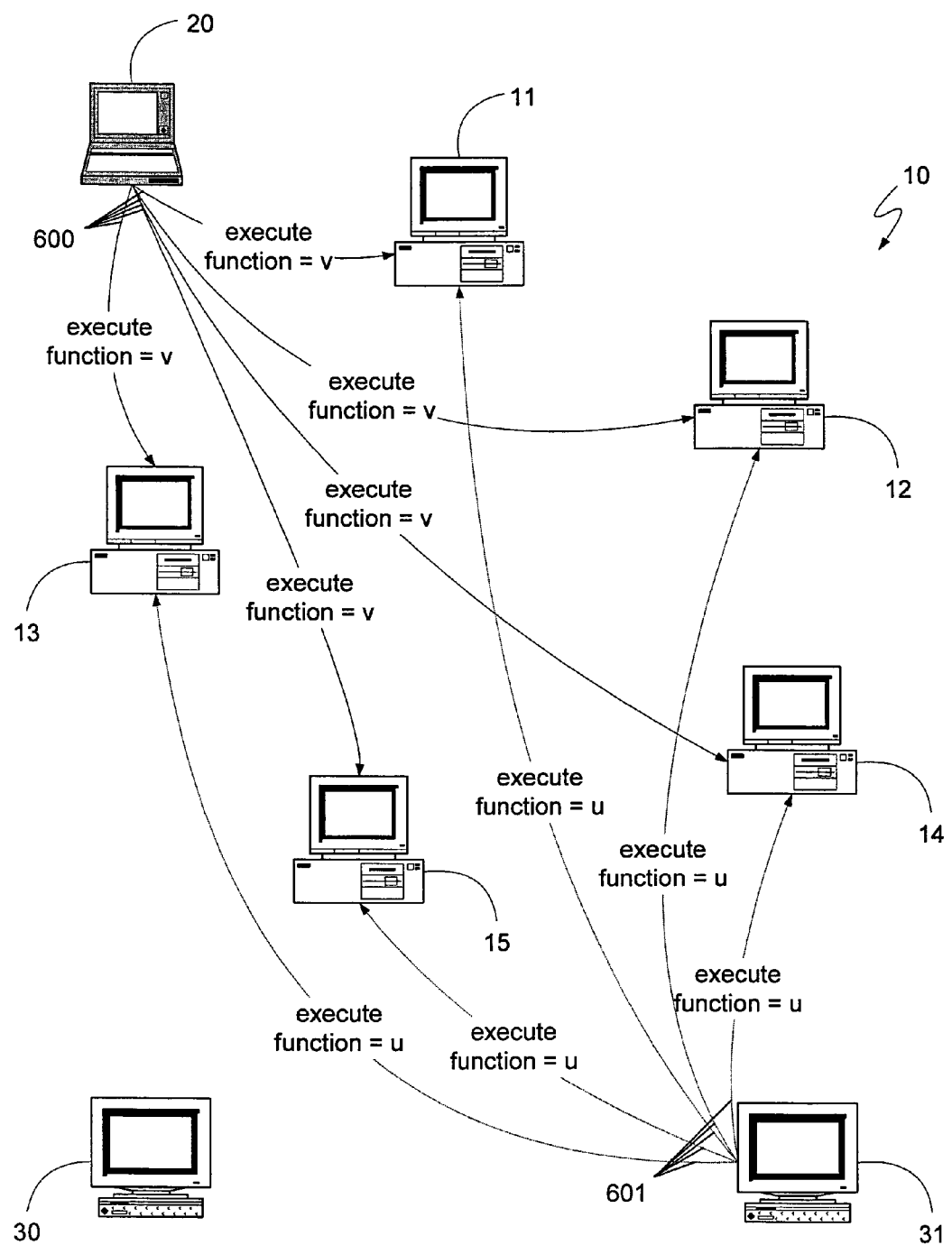
FIGS. 7a-e generally illustrate another aspect of the operation of a reduced message delay multi-phase consensus algorithm contemplated by an embodiment of the present invention.

The fast Paxos algorithm may also not operate properly if more than one client of the system 10 requests a function at approximately the same time. Turning to FIG. 7a, the client 20 is shown requesting that the system 10 execute a function, represented by the variable "v", by sending request message 600. However, at approximately the same time, device 31 also attempts to act as a client of the system 10 by sending request message 601, requesting that the system execute a function represented in the figure by the variable "u". Each of the messages 600 and 601 can arrive at the devices 11-15 at approximately the same time, with some devices receiving message 600 first, and other devices receiving message 601 first. Those devices that receive message 600 first may vote for or provisionally execute function "v", in the manner described above, while those devices that receive message 601 first may attempt to vote for or provisionally execute function "u" first.

Figure 7B:
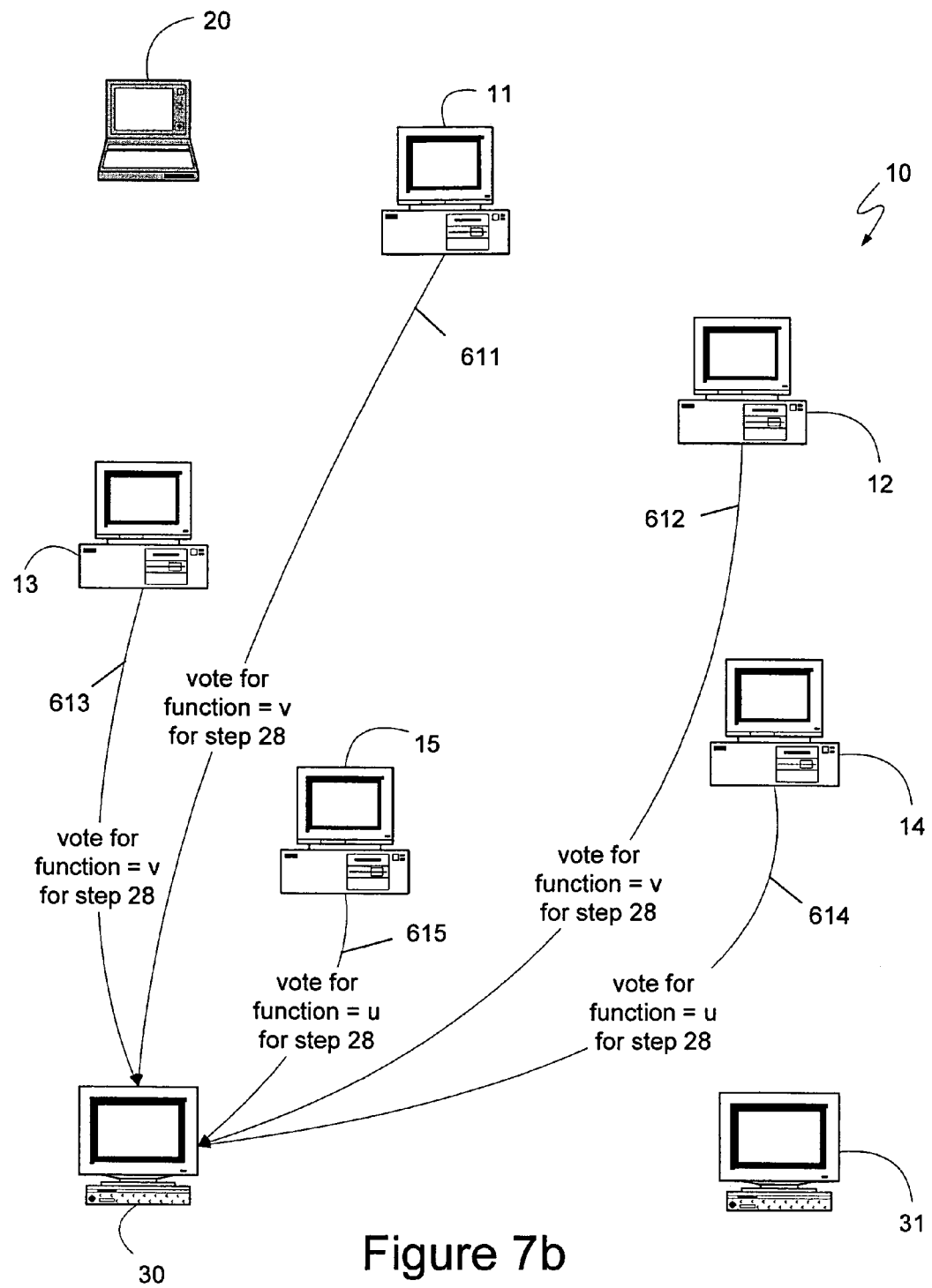

Turning to FIG. 7b, one possible outcome of the conflicting messages 600 and 601 is shown, with devices 11-13 voting for function "v" and devices 14-15 voting for function "u". A learner device, such as device 30 can collect the vote information from the devices 11-15 of the distributed computing system 10. In the example illustrated in FIG. 7b, the learner device 30 can receive messages 611-613 from devices 11-13, respectively, indicating a vote for function "v". Similarly, the learner device 30 can receive messages 614-615 from devices 14-15, respectively, indicating a vote for function "u". As above, for the exemplary system 10 illustrated in the figures, a quorum of devices for the fast Paxos algorithm can be four devices. Consequently, neither function "v" nor function "u" have been voted for by a quorum of devices, and the learner device 30 cannot execute either function.

Figure 7C:
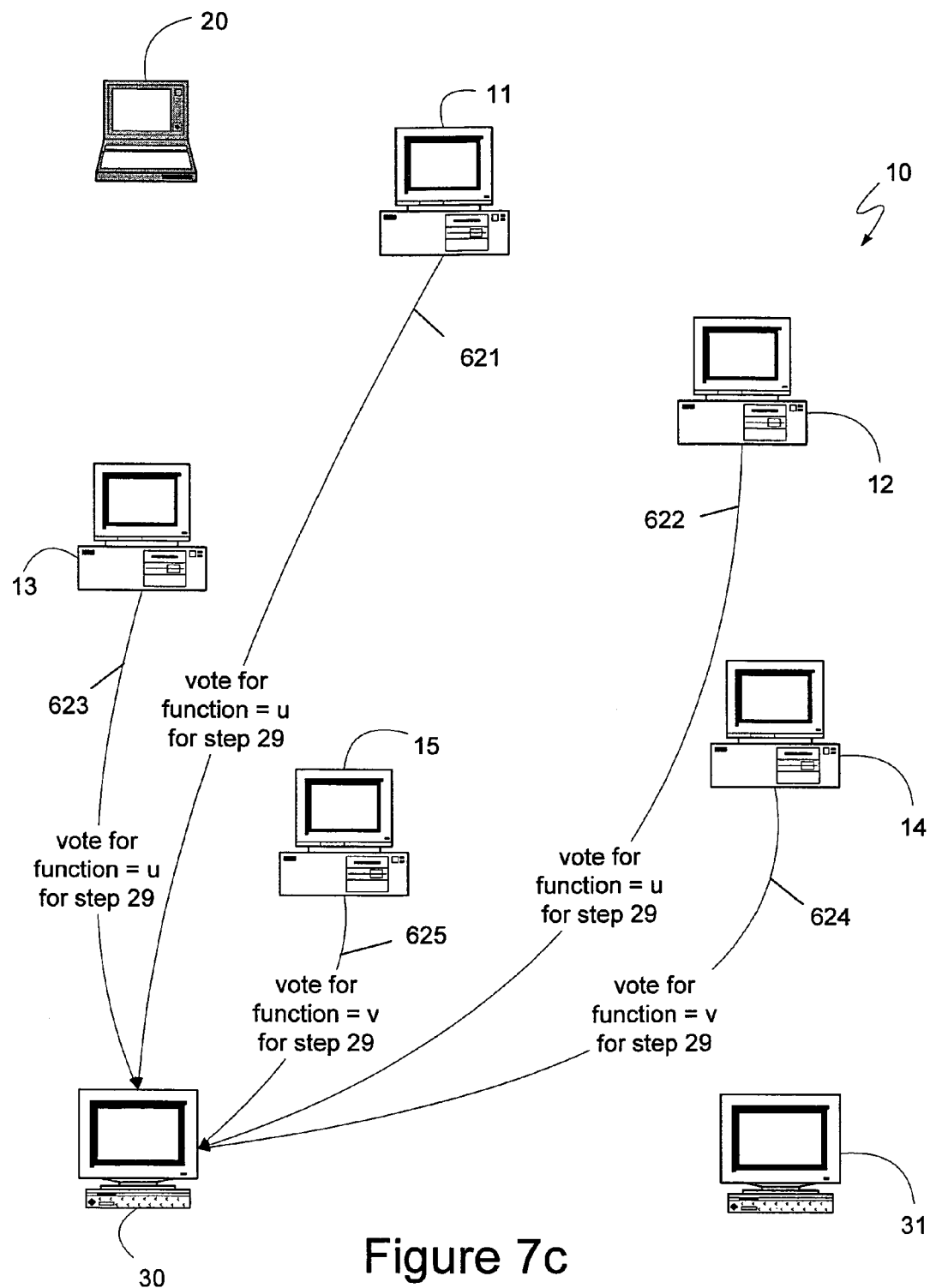

Of course, because messages 600 and 601 were transmitted at approximately the same time, each of the devices will receive both messages in very close succession. As illustrated in FIG. 7b, devices 11-13 received message 600 first, and consequently voted for function "v", while devices 14-15 received message 601 first, and consequently voted for function "u". However, before the learner device 30 can signal a conflict based on the differing vote messages 611-615, each of the devices is likely to receive the second of messages 600 and 601. Because, as explained above, the devices 11-15 treat messages from clients as proposals for subsequent system steps, the devices 11-15 can vote for the second received message. Consequently, as illustrated in FIG. 7c, before the learner device 30 can signal a conflict, it is likely to receive messages 621-623, indicating that devices 11-13 have voted for function "u" for system step 29; and message 624-625, indicating that devices 14-15 have voted for function "v" for system step 29. As can be seen, therefore, a conflict among two proposals that were transmitted at approximately the same time results in two system steps having no functions selected by a quorum of devices. Specifically, as shown, for system step 28, devices 11-13 selected function "v" and devices 14-15 selected function "u", while for system step 29, devices 14-15 selected function "v" and devices 11-13 selected function "u".

Figure 7D:
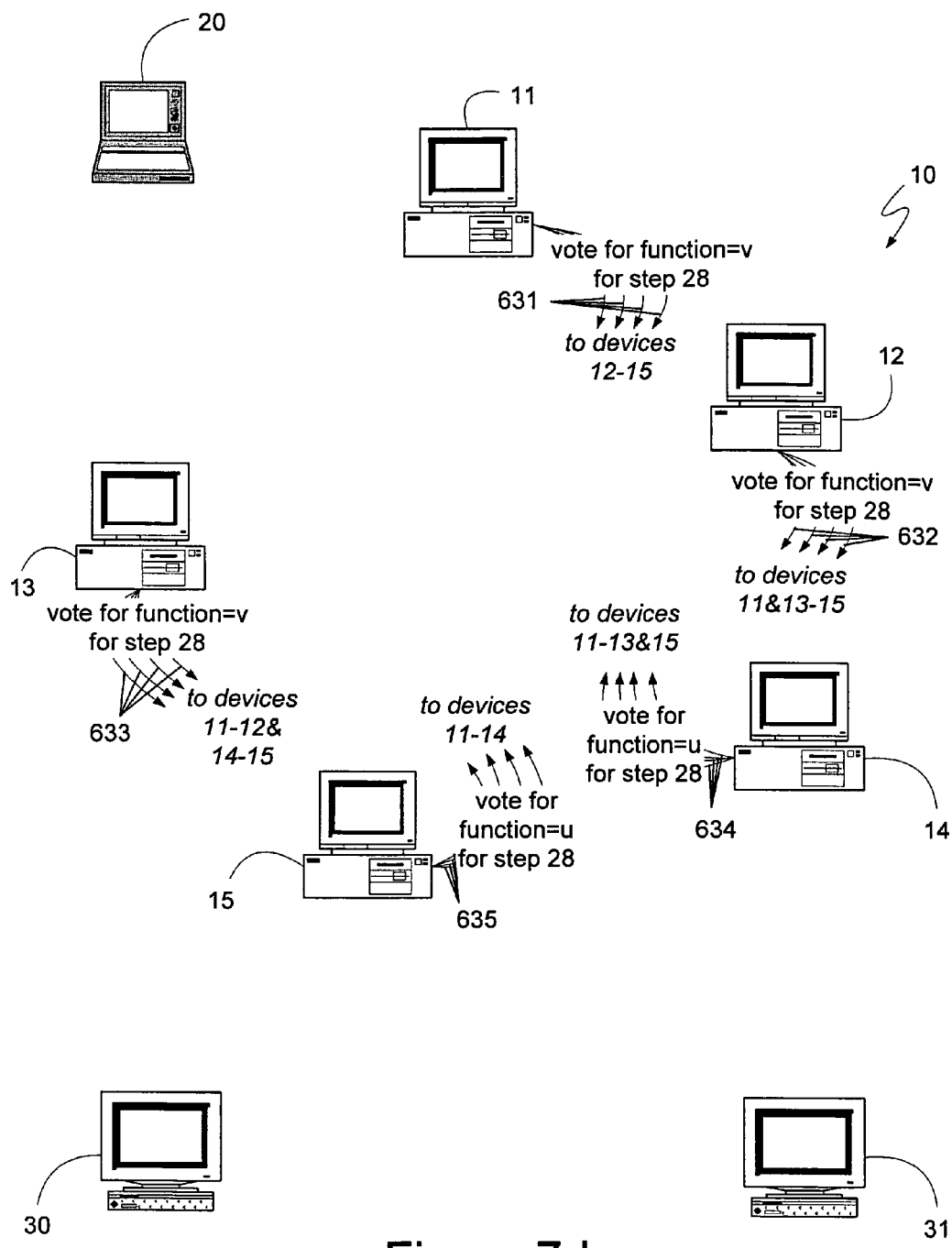

If, instead of transmitting the vote information to only leader devices, the devices 11-15 transmitted their votes to each other, a similar result would be obtained. Turning to FIG. 7d, the devices 11-15 are shown sending vote messages 631-635, respectively, to each other. As before, devices 11-13 can have received message 600 first, and vote messages 631-633 can, therefore, indicate a vote for function "v", while devices 14-15 can have received message 601 first, and vote messages 634-635 can indicate a vote for function "u". However, because messages 600 and 601 were transmitted at approximately the same time, it is likely that the second of those messages will arrive at the devices 11-15 prior to any of the messages 631-635. Consequently, before any of the device can detect a conflict, at least some of the devices will receive the second of messages 600 and 601, and will vote for that function for a subsequent system step. Therefore, turning to FIG. 7e, devices 11-13 are shown sending messages 641-643, respectively, voting for function "u" for system step 29, while devices 14-15 are shown sending messages 644-645, respectively, voting for function "v" for system step 29.

The fast Paxos algorithm can handle conflicts, such as the ones illustrated in FIGS. 7a-e, by resorting to the standard Paxos algorithm, and learning which of the two functions may have been selected, and then attempting to achieve a consensus on that function. Thus, following the situation illustrated in FIG. 7c or 7e, a leader device could proceed with the first phase of the standard Paxos algorithm, in a manner analogous to that described above with reference to FIGS. 4a-4d. After the completion of the first phase, the leader could initiate the second phase of the standard Paxos algorithm, in a manner analogous to that described above with reference to FIGS. 4e-4g, to achieve a consensus on the proposals learned of during the first phase. Because neither function "u" nor function "v" was selected for either system step 28 or 29, the leader can, based on some predefined selection criteria, pick one and have it selected by the system. The leader can then propose the other function and have it selected for a subsequent system step. Once a point is reached at which the leader knows of no device in the system 10 that has voted for any proposals for system steps greater than the current system step, it can send a message beginning another round of the fast Paxos algorithm, in a manner analogous to that described above with reference to FIG. 5d. Alternatively, the devices 11-15 could have continued to use the fast Paxos algorithm to select functions for system steps above step 29 while simultaneously participating in the standard Paxos algorithm, as described above, to resolve the conflict and determine whether to select function "u" or function "v" for system steps 28 and 29. In such a case, the leader, after resolving the conflict using the standard Paxos algorithm, need not send an explicit message to restart the fast Paxos algorithm, as the devices would have already been using the fast Paxos algorithm to select functions for system steps above step 29.

Modified Fast Paxos Algorithms

Instead of restarting the first phase of the Paxos algorithm, embodiments of the present invention contemplate mechanisms by which the first phase of the Paxos algorithm can be bypassed, thereby resolving the conflict while simultaneously introducing fewer message delays. One mechanism, contemplated by an embodiment of the present invention, enables the selection of a leader device such that, when reverting to the Paxos algorithm if a conflict had occurred, such as illustrated in FIGS. 7a-e, the leader device can be selected from among the devices 11-15. Specifically, the leader device can be selected such that the leader is already aware of each of the devices' previous votes, and can, thereby, avoid performing the first phase of the Paxos algorithm. In fact, in one preferred embodiment, the leader device that initiated the fast Paxos algorithm during which the conflict occurred can be selected as the leader device for the standard Paxos algorithm used to recover from the conflict.

Figure 7E:
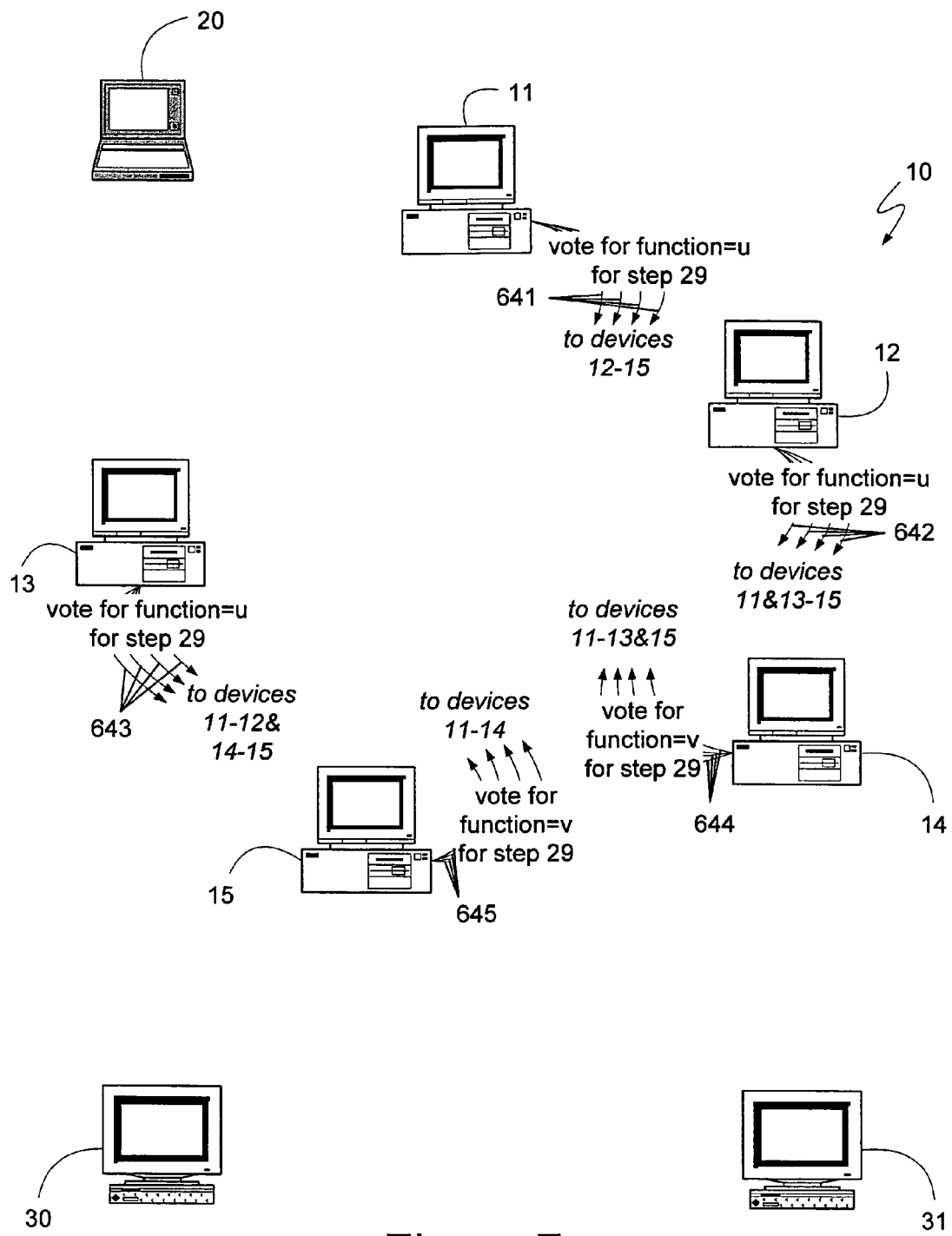
Figure 8A:
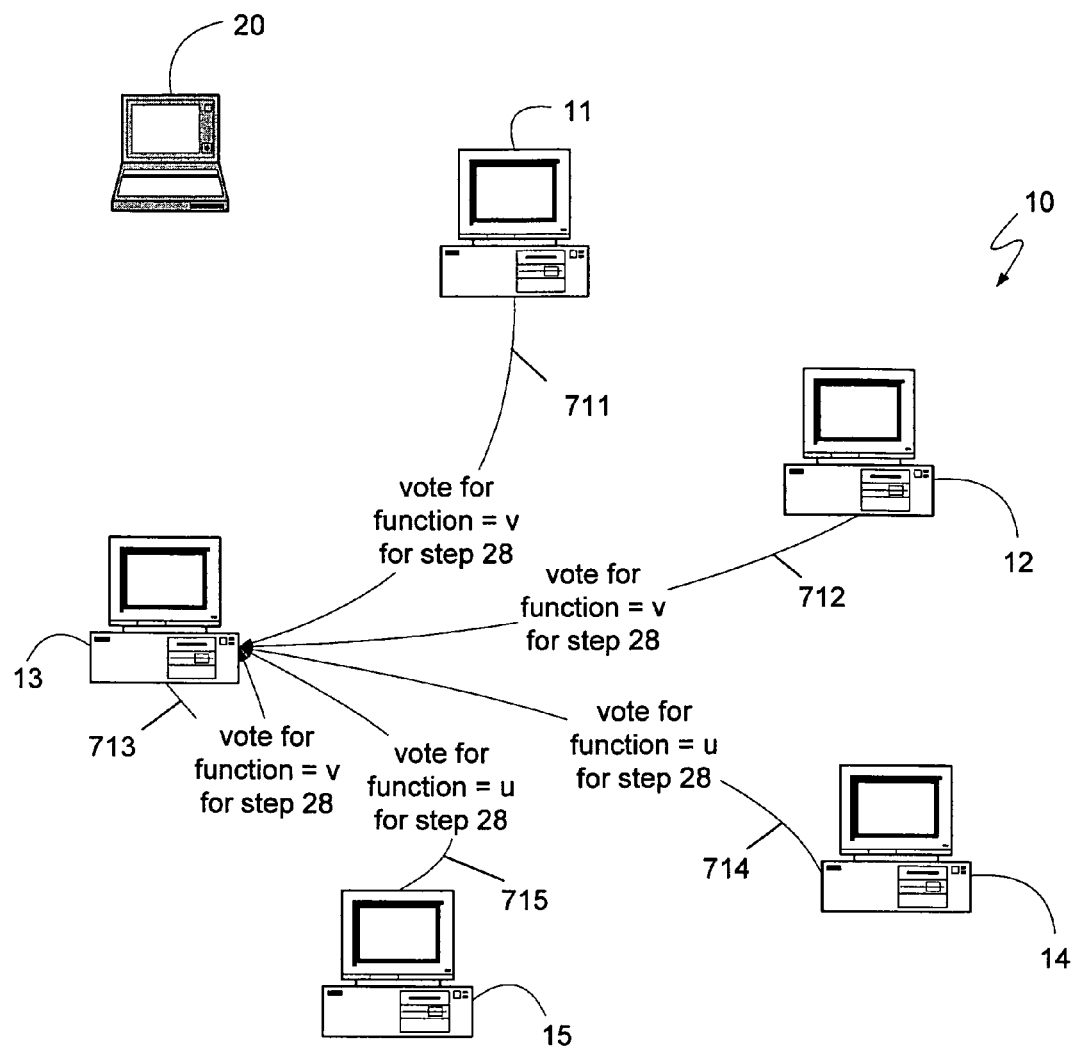
FIGS. 8a-h generally illustrate the operation of one modified reduced message delay multi-phase consensus algorithm contemplated by an embodiment of the present invention.
Figure 8B:
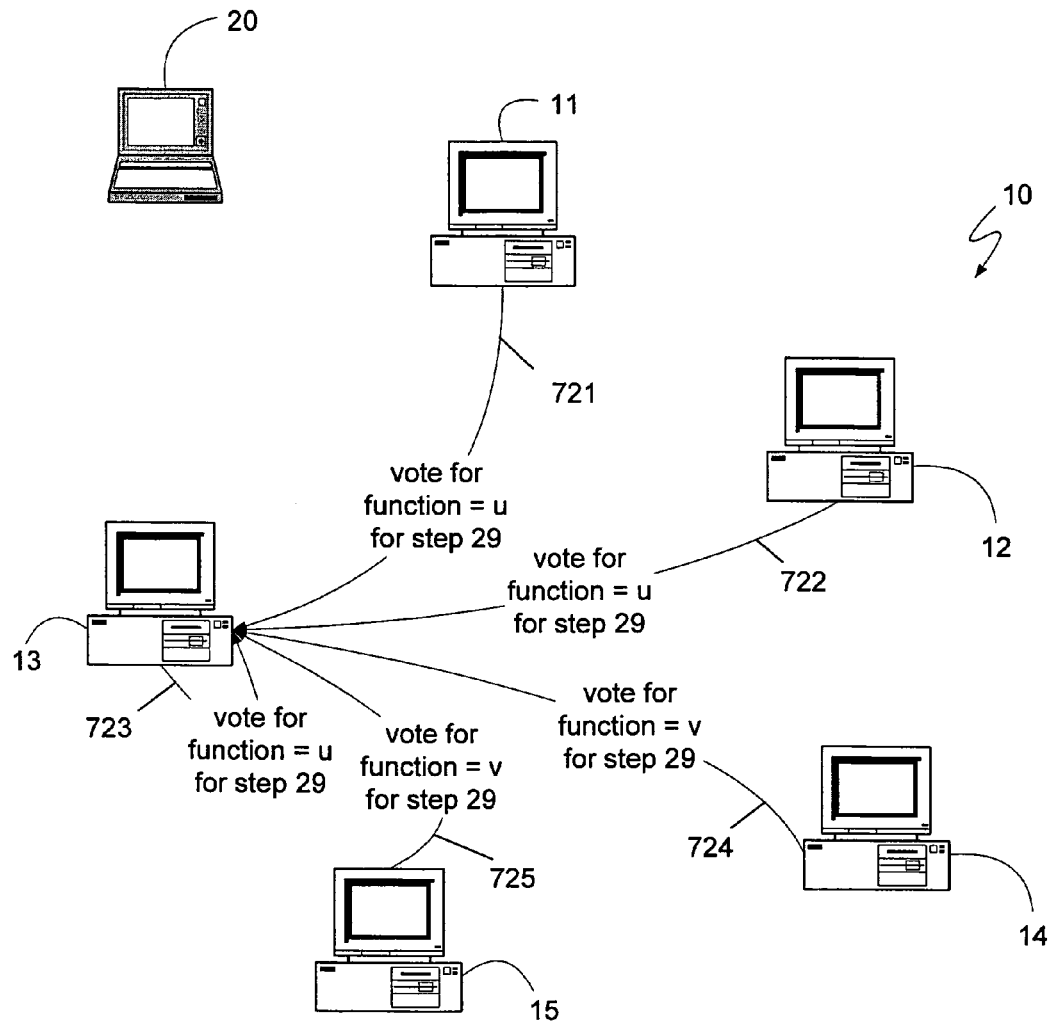

As explained in detail above, each of the devices 11-15 can, as part of the fast Paxos algorithm, transmit vote messages to one another, such as illustrated by FIGS. 7d-e. In such a case, any of the devices 11-15 can be selected as a leader device if a conflict occurs. However, if the devices 11-15 are only sending their vote messages to learner devices, such as illustrated by FIGS. 7b-c, a slight modification can be made. Specifically, the devices 11-15 can send their vote messages to at least one of the devices 11-15, which can then be selected as a leader device in case of conflict. For example, FIG. 8a illustrates the transmission of vote messages 711-715 from the devices 11-15, respectively, to a device 13 that would occur simultaneously with the transmission of messages 611-615 to the learner device 30 illustrated in FIG. 7b. Similarly, FIG. 8b illustrates the transmission of vote messages 721-725 from the devices 11-15, respectively, to the device 13 that would occur simultaneously with the transmission of messages 621-625 to the learner device 30 illustrated in FIG. 7c. As before, messages 713 and 723, sent from device 13 to itself, are illustrated for clarity, and would likely only comprise inter-process or intra-process communications, rather than explicit network traffic. In the illustrated example, device 13 is also the leader device that initiated the fast Paxos algorithm, as illustrated in FIG. 6a, that was in operation when the conflict occurred. As will be explained in further detail below, there can be advantages in selecting the same leader device for recovering from a conflict as was used to initiate the fast Paxos algorithm that resulted in the conflict in the first place. However, in one preferred embodiment, the devices 11-15 could send vote messages 711-715 to more than just one device to account for the possibility that that a single device, such as device 13, might fail. In such a case, any device could be selected to be the leader device to resolve the conflict.

As explained above, if a conflict occurs during the operation of the fast Paxos algorithm, such as illustrated in FIGS. 7a-e, the distributed computing system 10 can revert to using the Paxos algorithm to resolve the conflict. However, where one of the devices 11-15, that has received vote messages from the other devices as part of the fast Paxos algorithm, is selected as the leader device, that device does not need to perform the first phase of the Paxos algorithm because it is already aware of the other devices' prior votes. For example, as illustrated in FIG. 8a, device 13 received messages 711-713 from devices 11-13, respectively, indicating that they had voted for function "v" for system step 28, and it received messages 714-715 from devices 14-15, respectively, indicating that those devices had voted for function "u" for system step 28. Alternatively, if the system illustrated in FIG. 7d had been implemented, then device 13, along with each of the other devices, would have received messages 641-645, from devices 11-15, respectively, indicating the same vote information as messages 711-715. In either case, device 13 can already know of the prior votes of devices 11-15 and can proceed with just the second phase of the Paxos algorithm in an attempt to resolve the conflict.

Figure 8C:
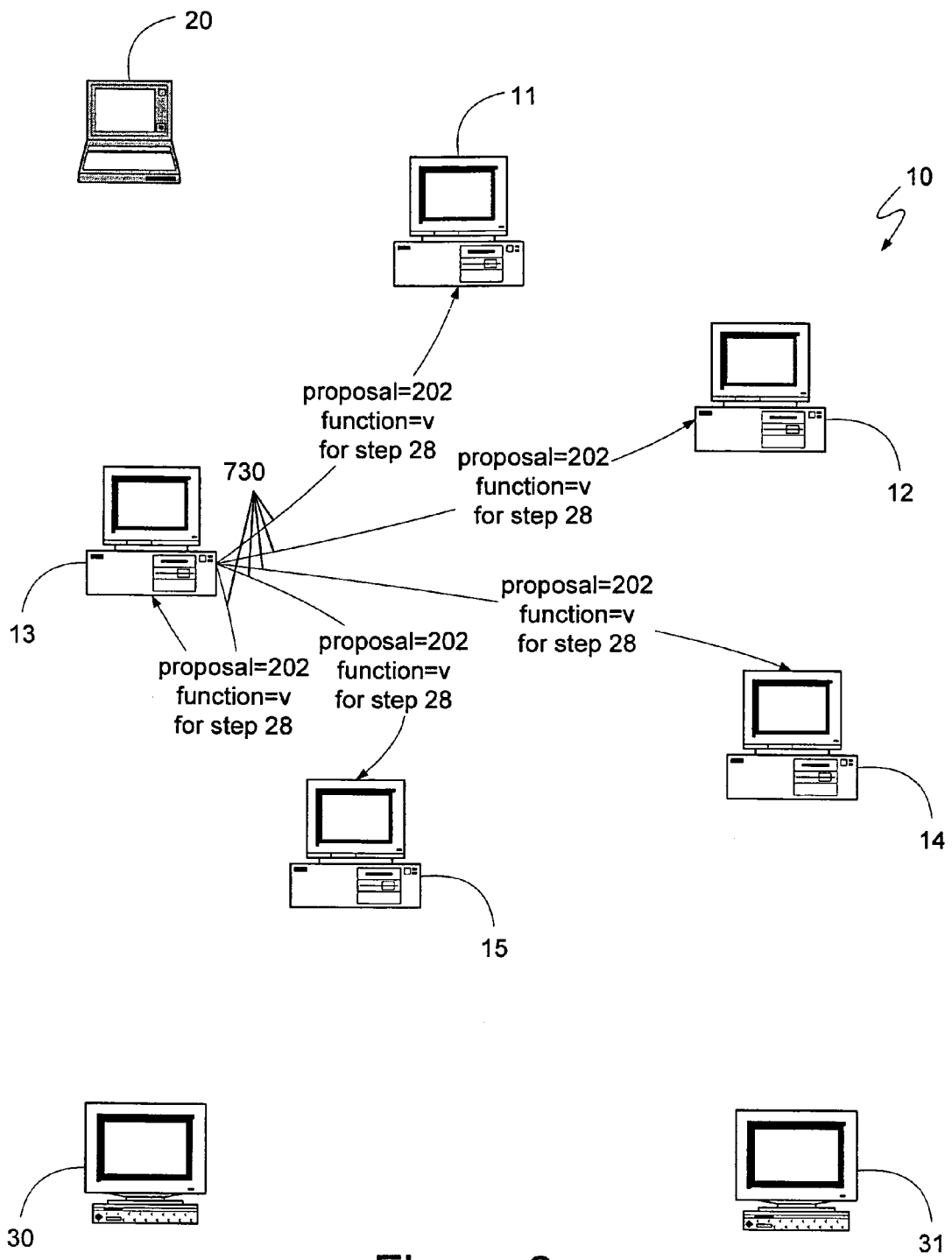

Turning to FIG. 8c, device 13 is shown acting as a leader device and selecting one of the functions "u" or "v" to propose for system step 28. As explained in detail above, because the leader device 13 has learned that neither function "u" nor function "v" were selected, and that both were voted for by at least one device for system step 28, the leader device 13 is free to select among function "u" or function "v" to propose for system step 28 as part of the process by which the conflict between the two functions is resolved. In the example illustrated in FIG. 8c, the device 13 selects function "v" and proposes it to the devices 11-15 via message 730. In addition, the leader device 13 can select an immediately subsequent proposal number corresponding to the Paxos algorithm, since the prior proposal number of 201 resulted in a conflict and selected no function for either system steps 28 or 29, and cannot, therefore, be used again. Thus, as illustrated in FIG. 8c, the leader device 13 can select a proposal number of 202, which can correspond to the Paxos algorithm. While it is possible that some of the devices 11-15 have voted for other functions for system step 28 after the transmission of messages 711-715, or 641-645, those other votes would have to have been made with a proposal number larger than 201, since a proposal number of 201 was implicitly used in messages 711-715 and 641-645. Therefore, by selecting a proposal number of 202, the leader device 13 can propose function "v" in message 730 and, if some devices had cast another vote, those devices need not respond to message 730, since a proposal number of 202 is no higher than any proposal number that would have been used by those devices that cast another vote.

As explained previously, the first phase of the Paxos algorithm comprises an implicit promise, by the responding devices, that they will not vote for any proposals having proposal numbers lower than the proposal number suggested by the leader to which the devices are responding. Because devices 11-15 previously promised not to respond to any proposals having proposal numbers lower than 201, as shown in FIG. 6a, the information contained in messages 711-715, or 641-645, can provide the same effect as the first phase of the Paxos algorithm. The leader device 13 can take advantage of this promise by selecting a proposal number such that there are no intervening proposal numbers between the proposal number used by the devices during the fast Paxos algorithm, and the newly selected proposal number. As explained in detail above, proposal numbers can be partitioned among the devices using a variety of mechanisms. Any mechanism that can provide each device with at least two contiguous proposal numbers can support an embodiment analogous to that illustrated, where a single device, such as device 13, acts as both the leader that starts a fast Paxos algorithm using one proposal number, such as the proposal number of 201, and that acts as a leader device using the standard Paxos algorithm to resolve a conflict arising during the fast Paxos algorithm by using the very next proposal number, such as the proposal number of 202. However, if the proposal numbers are partitioned among the devices such that two different devices are assigned contiguous proposal numbers, then the leader device for the standard Paxos algorithm used to resolve a conflict arising during the fast Paxos algorithm can be a different device than the device that initiated the fast Paxos algorithm; and, in order to avoid performing the first phase of the Paxos algorithm, that other device can be sent messages, such as messages 711-715 and 721-725 during the fast Paxos algorithm. Yet another alternative, contemplated by embodiments of the present invention, would be to assign proposal numbers that included decimal fractions rather than simply whole numbers. In such a case, a single device could be assigned ten contiguous proposal numbers corresponding to one whole number, such as proposal numbers 201.0, 201.1, 201.2, etc. However, as shown above, to avoid performing the first phase of the Paxos algorithm when attempting to resolve a conflict, the proposal number selected can be an immediately subsequent proposal number. Thus, if proposal numbers are subdivided into quanta smaller than whole numbers, such as decimal fractions, then an immediately subsequent proposal number is the next number at whatever level of quantization the proposal numbers are divided. At bottom, what is required of proposal numbers is that they are ordered and that every proposal number is followed by a next one. As is well known to one skilled in the art, there are many possible ways of numbering proposals, in addition to those described explicitly above, that have these properties.

Figure 8D:
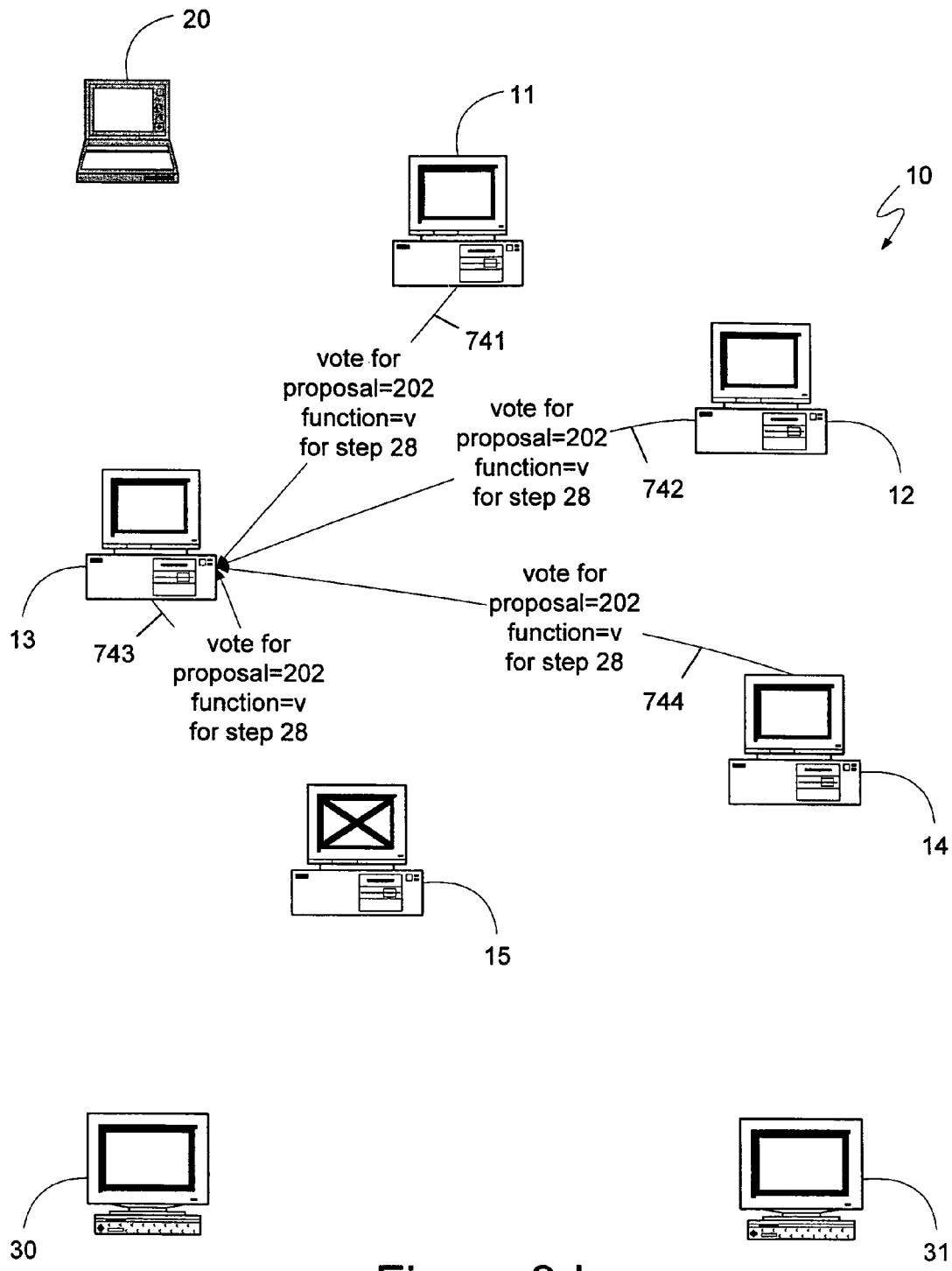

Turning to FIG. 8d, in order to illustrate that the Paxos algorithm used to recover from a conflict maintains the same fault-tolerance as the Paxos algorithm described in detail above, a scenario is illustrated in which device 15 has failed. Nevertheless, each of the remaining devices 11-14 vote for the proposed function "v" by sending messages 741-744, respectively, to the leader device 13. As explained above, because the Paxos algorithm is being used, as many as two of the devices 11-15 could have failed or otherwise not responded and a quorum of devices could still have selected function "v" for system step 28. And while it is possible that some of the devices 11-15 could have failed, it is unlikely that any of them would have voted for a different function, proposed with a proposal number higher than 201, between the transmission of messages 721-725, or 641-645, and the transmission of message 730. Thus, it is likely that the function proposed by the leader device 13, while attempting to resolve the conflict described above, will be selected by the distributed computing system 10.

Figure 8E:
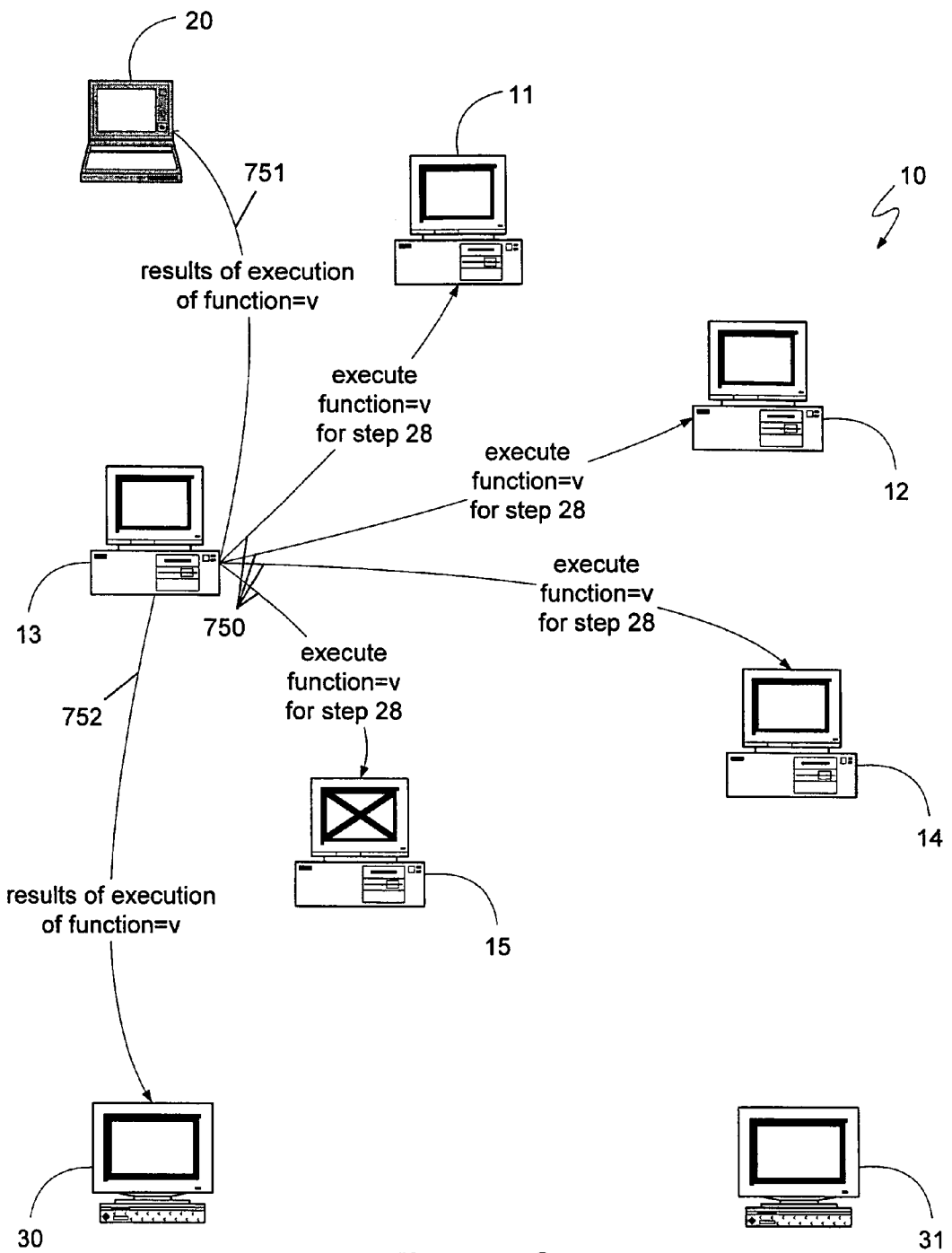

Turning to FIG. 8e, once the leader device 13 receives messages 741-744 indicating that a quorum of devices has voted for the function "v" for system step 28, the leader can determine that the function was selected, since a quorum of devices voted for the function, and can proceed to execute the function and provide the results to the requesting client 20 via message 751. In addition, the leader 13 can inform the other devices of the selection via message 750, and it can either inform a learner device 30 of the selection, or it can simply send the results to the learner device as illustrated by message 752.

Figure 8F:
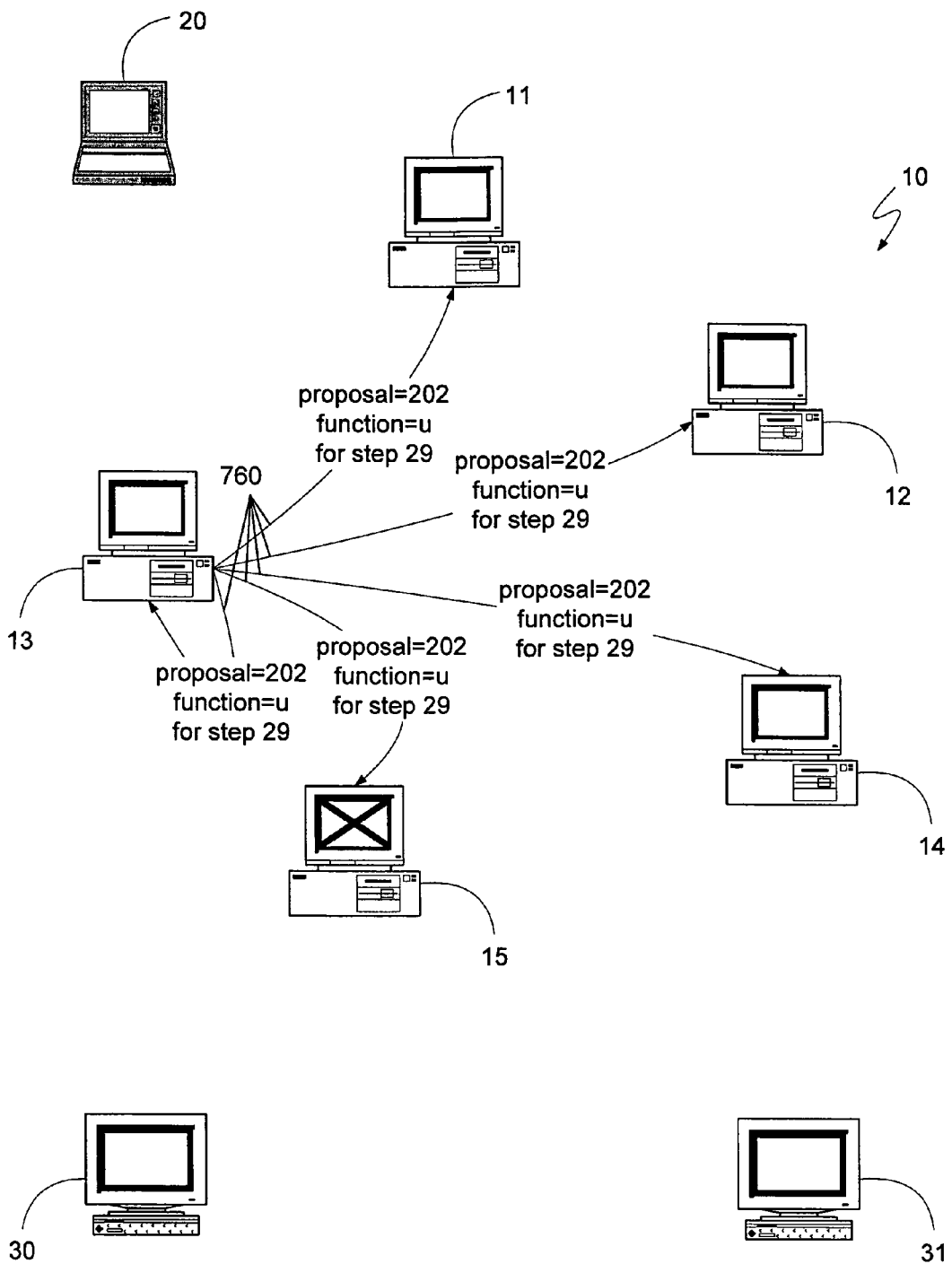

However, as illustrated in FIGS. 7e and 8b, a conflict also occurred during the selection of a function to be executed for system step 29. Consequently, the leader 13 can perform analogous procedures to those described above to select a function to propose for system step 29. Specifically, the leader can know, based on messages 641-645 or 721-725, that neither function "u" nor function "v" was selected, and that each was voted for by at least one device. Thus, the leader device is free to propose either function for system step 29. However, in one preferred embodiment, because conflicts often happen when two functions are requested by two different clients at approximately the same time, a leader device 13 can attempt to select one function for one system step and the other function for a subsequent system step. Thus, as illustrated in FIG. 8f, the leader 13 can determine that function "v" was previously selected for system step 28, and it can, therefore, propose function "u" for system step 29. For the reasons described in detail above, the leader device 13 can again use a proposal number of 202 with which to propose function "u", as indicated by message 760 in FIG. 8f.

Figure 8G:
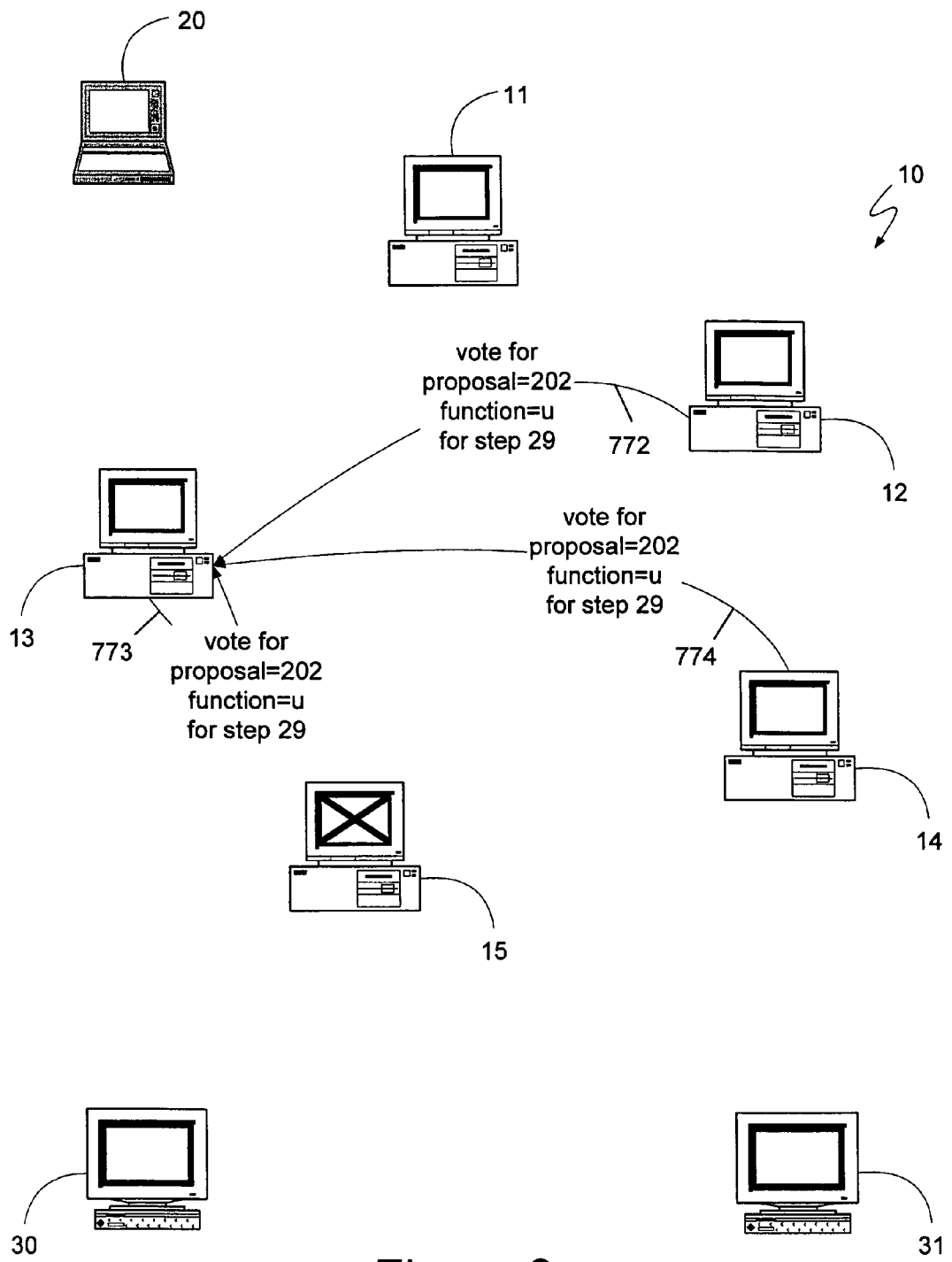

Turning to FIG. 8g, the devices 12-14 are again illustrated as voting for the proposed function via messages 772-774, and device 15 is again illustrated as having experienced a failure. As explained above, if one or more of the devices 11-15 has voted for some other function between the transmission of messages 641-645 or 721-725 and the transmission of proposal message 760, those devices will not vote for the proposal in message 760 since the other function must have been proposed using a proposal number that was at least as large as the proposal number used by the proposal in message 760. Illustratively, device 11 is shown having responded to such other proposal number and, consequently, it casts no vote for the proposal submitted using a proposal number of 202. If devices, such as device 11, comprise a quorum of devices, the leader 13 can use the first phase of the Paxos algorithm to learn of the other function.

Figure 8H:
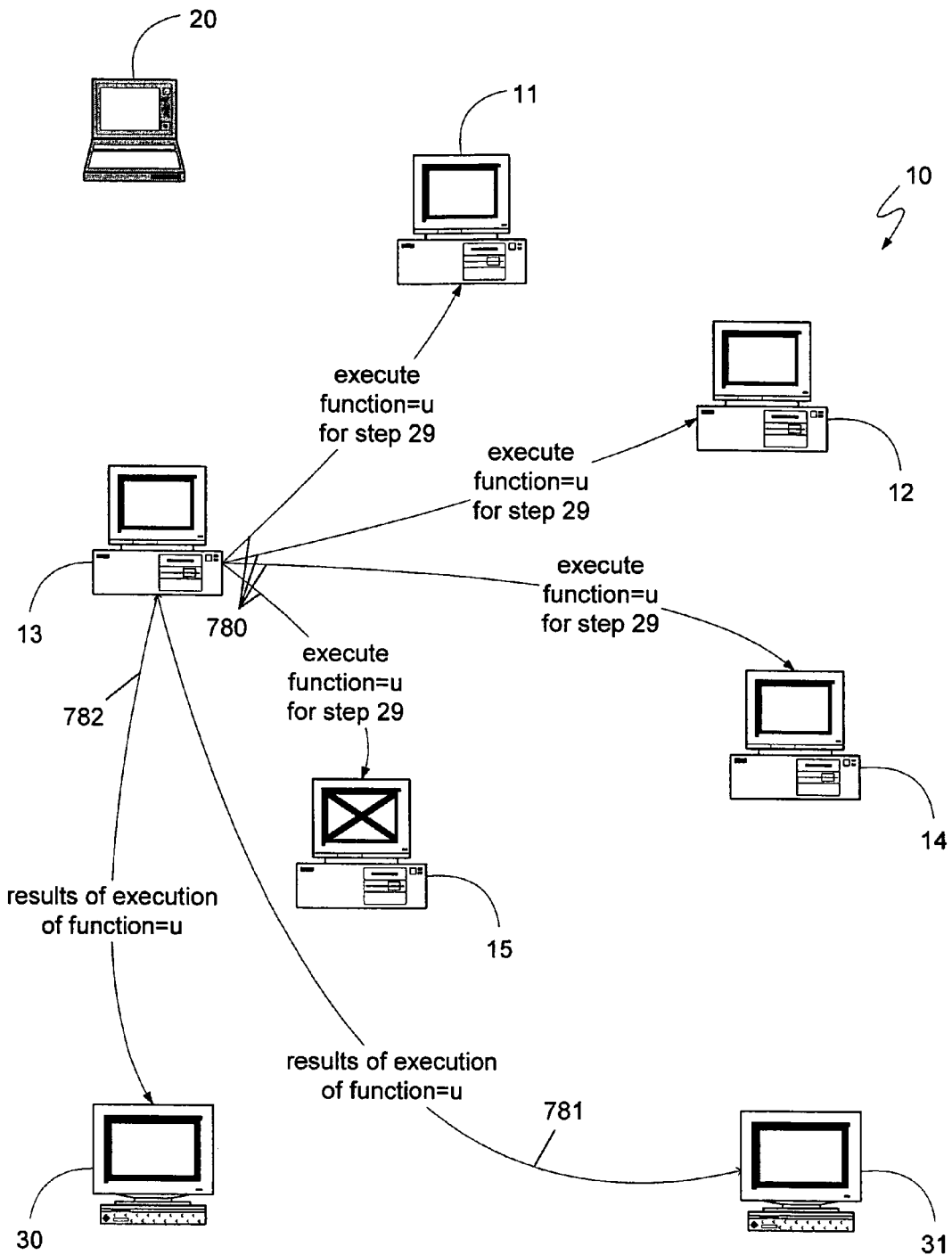

Turning to FIG. 8h, in a manner analogous to that illustrated in FIG. 8e, if the leader device determines that a quorum of devices has voted for the proposed function, it can execute that function and provide the results to the requesting client 31 via message 781. The leader 13 can also inform the devices 11-15 of the selection of the function "u" via message 780, and the leader can either transmit an indication of the selection of the function "u", or the results of the function, to one or more learner devices via message 782. As shown, despite the non-responsiveness of two devices, the Paxos algorithm can still determine that a function was selected, since a quorum of devices voted for the function. Thus, the Paxos algorithm used to resolve conflicts remains fault-tolerant, as described in detail above.

Once the leader 13 has resolved the conflict between two or more functions, such as the functions "u" and "v" used in the above examples, the leader can restart the fast Paxos algorithm. One mechanism for doing so is to increment the proposal number to a subsequent proposal number corresponding to the fast Paxos algorithm, and transmit that proposal number to the devices 11-15, indicating that they should treat client requests as proposals from a leader, in a manner analogous to that described above with reference to FIG. 6a. Such a mechanism could be particularly useful if the conflict arose due to a message transmission failure. For example, if, in FIG. 7a, device 31 had only proposed function "u" to devices 14 and 15, then a similar conflict would have arisen, except that devices 11-13 would never have received a request for function "u" and, if the fast Paxos algorithm had continued, devices 11-13 would likely have been selecting the same functions as devices 14-15, except for one system step prior; resulting in a conflict among the devices 11-15 for each system step. If, however, the proposal number was again incremented after the first conflict was resolved, such a continuing conflict, due to only a few devices having received a proposal, can be avoided. Nevertheless, an alternative mechanism contemplated by an embodiment of the present invention, that could be more efficient in other instances, allows the distributed computing system 10 to utilize multiple instances of the Paxos and fast Paxos algorithms in parallel. Consequently, while the devices 11-15 were performing the steps described in detail above, and illustrated in FIGS. 8a-h, those same devices could also have continued to operate the fast Paxos algorithm illustrated in FIGS. 6a-d and 7a-e. For example, if, after the receipt of messages 600 and 601, illustrated in FIG. 7a, another client transmitted another request, and no other client transmitted any other requests at approximately the same time, then that request would arrive at each of the devices 11-15 and each of the devices could select a function in response to that request to be executed for system step 30 in a manner analogous to that illustrated in FIGS. 6b-d. Thus, while an instance of the Paxos algorithm attempts to resolve the conflict caused by the near-simultaneous transmission of the requests of messages 600 and 601, other instances of the fast Paxos algorithm can continue to respond to subsequent requests and select functions for system steps beyond system step 29. In such a case, no explicit action is required on the part of the leader 13 once the conflict is resolved. Instead, that instance of the Paxos algorithm can simply cease to function, enabling the one or more instances of the fast Paxos algorithm to utilize additional resources, and thereby operate more efficiently. Additionally, while illustrated and described above as two successive steps, the resolution of the conflicts for system steps 28 and 29 could also have progressed in parallel in the same manner, such that each was completed independently, and, upon completion, that particular instance of the Paxos algorithm simply ceased to function.

As can be seen, by selecting as a leader device a device that was participating in the fast Paxos algorithm at the time of a conflict, and that has received vote messages from the other devices, the first phase of the Paxos algorithm can be skipped while still resolving the conflict, thereby reducing the number of message delays introduced when an conflict occurs, and enabling the distributed computing system 10 to respond to clients that much more efficiently.

Another modified fast Paxos algorithm contemplated by an embodiment of the present invention provides a mechanism by which a conflict can be resolved without resorting to the Paxos algorithm. Because a leader device can determine which function to propose based on a repeatable and predetermined mechanism, it is also possible for the devices 11-15 to each use the same mechanism to independently select the same function that a leader device would have selected. However, because the leader can use the received vote messages as inputs to the algorithm by which the leader selects one of the conflicted functions to propose, it can be necessary for each of the devices to receive the same set of vote messages, such as illustrated in FIG. 6d or 7d-e. A fast Paxos implementation, such as that illustrated in FIG. 6c or 7b-c, does not provide each of the devices 11-15 with a sufficient amount of information to independently determine what a leader device would propose because, as illustrated, the devices 11-15 do not send their vote messages to each of the other devices.

In addition to a fast Paxos algorithm in which each device sends its vote information to each of the other devices, mechanisms that require each device to independently determine the function a leader would propose can also require that any failure, either of the device, or of the communication medium, affect the messages received by each of the other devices equally. Specifically, if some devices receive information from a failed device, while other devices do not, those devices that received the information may determine that a leader would select one function, while those devices that did not receive the information may determine that a leader would select a different function. As explained above, the mechanism by which a leader device determines which function to propose, from among the conflicting functions, can depend on the vote messages that the leader device receives. Consequently, if each device does not receive the same vote messages, it is possible that the devices will not agree on which function would have been selected by a leader device. Therefore, if there is a failure of a device or of the communication medium such that each device did not receive the same vote information, different devices might vote for different functions and cause another conflict. However, if it is likely that every device received the same vote information, then each device can use the received vote information to perform the same algorithm as a leader device would perform to select which function to propose, from among the functions that caused the conflict.

Figure 9A:
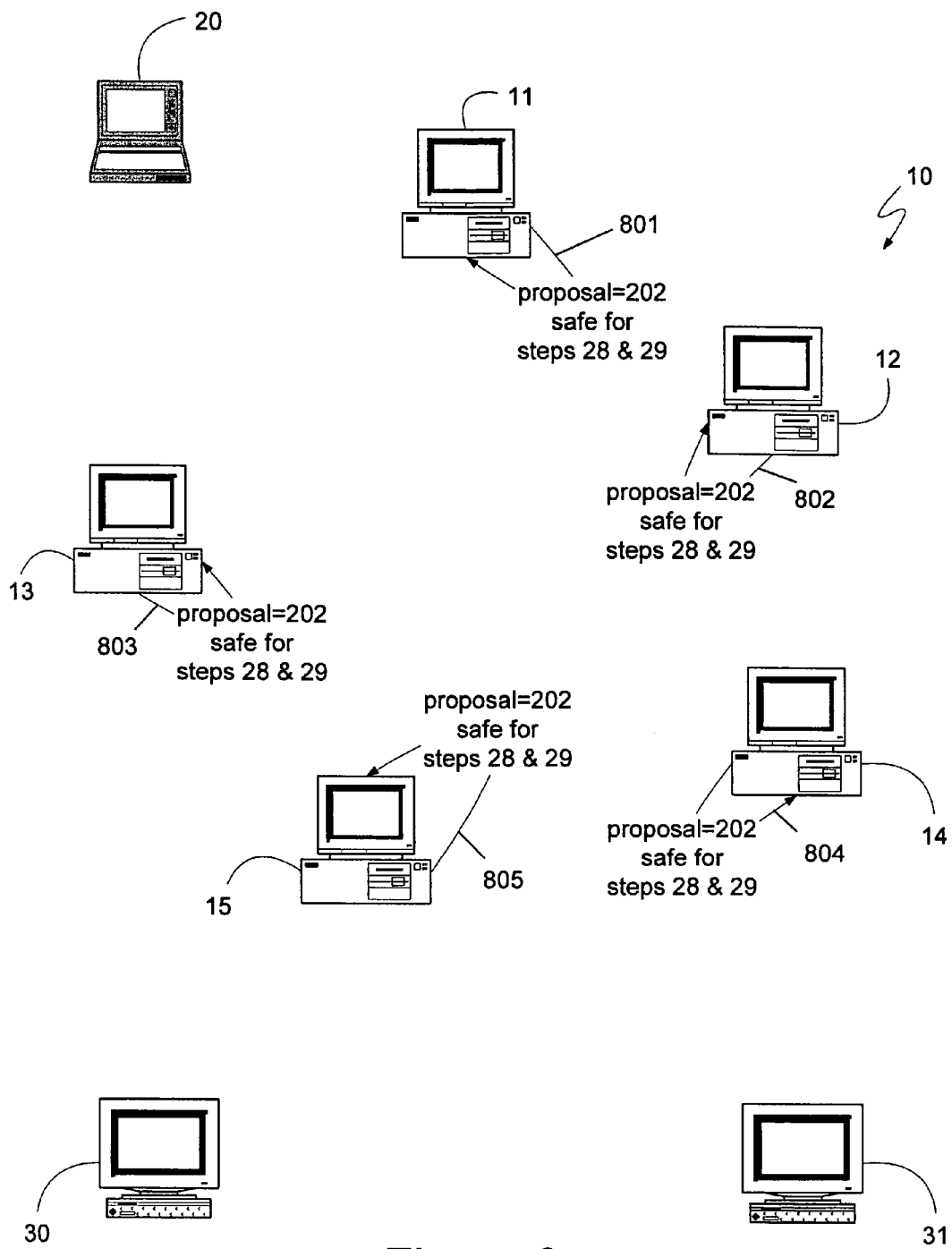
FIGS. 9a-g generally illustrate the operation of another modified reduced message delay multi-phase consensus algorithm contemplated by an embodiment of the present invention.

Turning to FIG. 9a, if the devices 11-15 detect that a conflict has occurred, such as by monitoring messages 631-635 and 641-645 illustrated in FIGS. 7d-e, the devices 11-15 can send messages 801-805, respectively, as a preliminary step to attempting to resolve the conflict without using a leader device. Messages 801-805 are analogous to message 500, and are used to indicate the start of another instance of the fast Paxos algorithm. However, because messages 801-805 are only sent from a device to itself, they would likely not be explicit network communications, but would rather be inter-process or intra-process communications within devices 11-15, respectively. Additionally, as indicated above, it is possible for the devices to not agree on which function would have been proposed by a leader device, and therefore to not vote for the same function for a given system step. To accommodate the possibility that conflicting votes may again be submitted, the immediately subsequent proposal number selected by the devices and specified in messages 801-805 can correspond to a fast Paxos algorithm. As will be shown in more detail below, because the devices 11-15 can attempt to resolve the conflict without a leader device, the use of a proposal number corresponding to a fast Paxos algorithm is appropriate.

As explained above, the proposal number that is selected by the devices can be a next proposal number to ensure that no device voted for any proposal between the messages 631-635/641-645 and the current messages of 801-805. In other words, messages 631-635 and 641-645 can only act as messages corresponding to the first phase of the Paxos algorithm if the devices either use the same proposal number as messages 631-635 and 641-645, such as in the standard Paxos algorithm, or an immediately subsequent proposal number, since none of the devices can change their vote between the proposal number used in messages 631-635/641-645 and the next proposal number. Therefore, because the instance of the fast Paxos algorithm that initially caused the conflict, as illustrated in FIGS. 7a-e, implicitly used a proposal number of 201, the proposal number specified in messages 801-805 can be a proposal number of 202. As illustrated above, proposal number 202 was also used with the standard Paxos algorithm to resolve the conflict. Because a single proposal number can correspond to either the Paxos or the fast Paxos algorithm, the correspondence between a proposal number and either the Paxos or fast Paxos algorithm can be determined at the start of the fast Paxos algorithm using the preceding proposal number. The selection of the correspondence between the immediately subsequent proposal number and the Paxos or fast Paxos algorithms, also acts as a selection of the mechanism to be used to recover from any conflicts that may arise.

Once the devices 11-15 have initiated a second instance of the fast Paxos algorithm, via messages 801-805, each device can independently determine what a leader device would propose if the leader device had been provided with the same input. As explained in detail above, in connection with the use of the Paxos algorithm to resolve conflicts, if a leader device determines that some devices voted for function "u", and some voted for function "v", and neither function was voted for by a quorum of devices, the leader is free to select either function to propose. Consequently, because each of the devices 11-15 received messages 631-635, each of the devices 11-15 can independently determine that either function "u" or function "v" could be proposed by a leader device for system step 28.

The exact mechanisms by which a leader device selects one function to propose, from among the conflicting functions, are not relevant so long as the mechanisms are predetermined and repeatable. As an example of a mechanism that could be used to select among the conflicting functions, the leader device can select the function with the most votes, unless that function was already accepted for the prior system step. Alternatively, the leader device could select a function with the largest function identifier, or a function that was requested by a client having the largest client identifier, such as would either be assigned before the client was allowed to make requests of the system 10, or which could be based on the client's network identifier or the like. Again, however, the leader device can check if the selected function was previously accepted for the prior system step, in which case the leader device can select the other function.

Figure 9B:
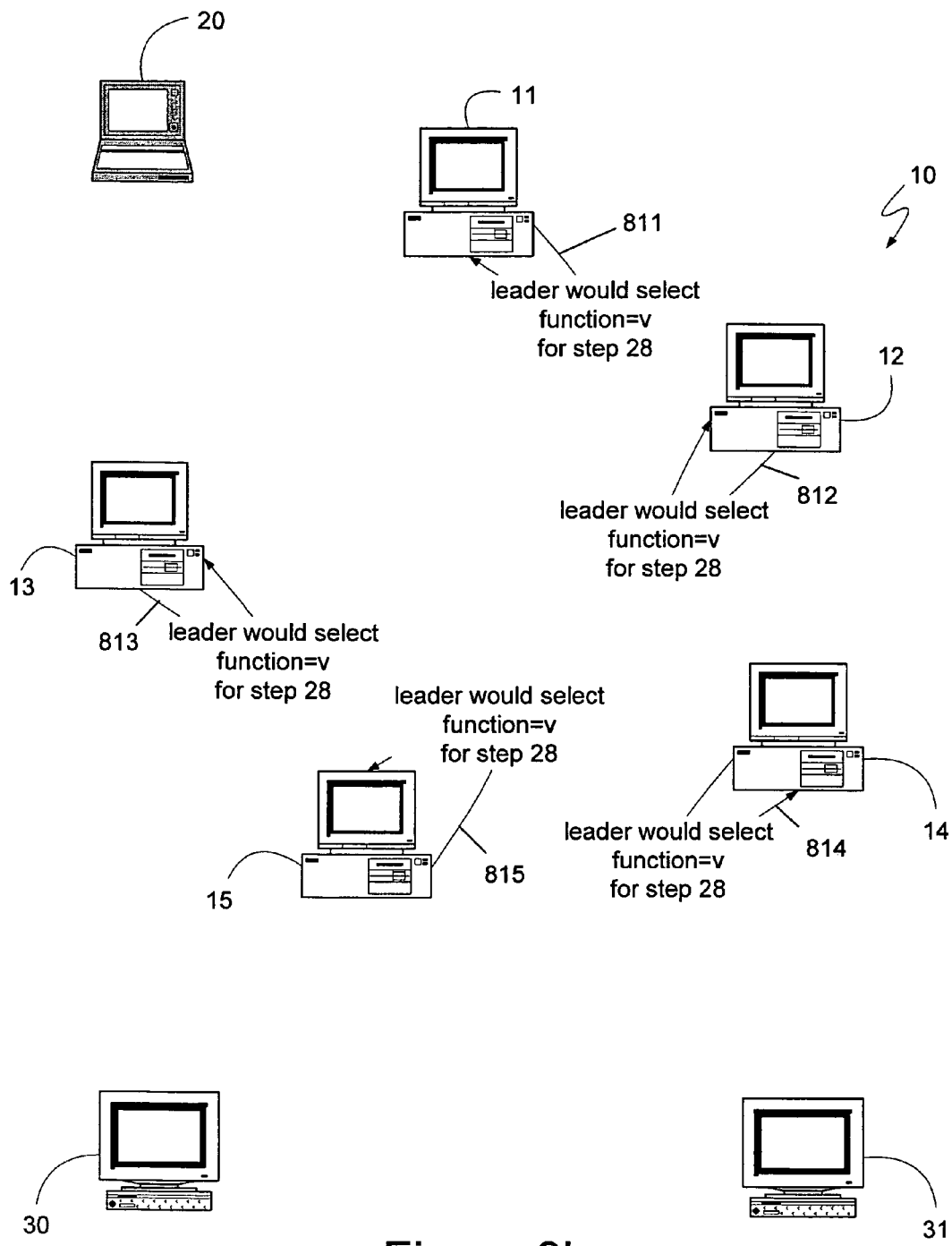

Whichever mechanism is used by a leader device to determine whether to propose, for example, function "u" or function "v", such a mechanism can be similarly used by each of the devices 11-15 independently. Consequently, as illustrated in FIG. 9b, each of the devices 11-15 can determine which function they believe a leader device would have proposed for a vote, and can propose that function to themselves via messages 811-815, respectively. Again, as above, because messages 811-815 are from devices 11-15, respectively, to themselves, it is likely that messages 811-815 would not be explicit network communications, but would rather be inter-process or intra-process messages within their respective devices.

Because all of the devices 11-15 are functioning properly, and all of the messages sent by the devices to each other have been illustrated as having been delivered, it is expected that each device will independently determine the same function. Therefore, as illustrated in FIG. 9b, each of the messages 811-815 propose function "v" to be selected for system step 28. If each of the devices 11-15 did not propose the same function to themselves, they would not all select the same function. In such a case, as long as a quorum of devices selected the same function, the conflict could be resolved. However, if a quorum of devices again did not select a single function for system step 28, the Paxos algorithm, including the above described improvements, can be used to achieve consistency and prevent an endless number of conflicts on the same system step. Alternatively, resort to the Paxos algorithm could be postponed until 3 or more conflicts occur in selecting the same system step.

Figure 9C:
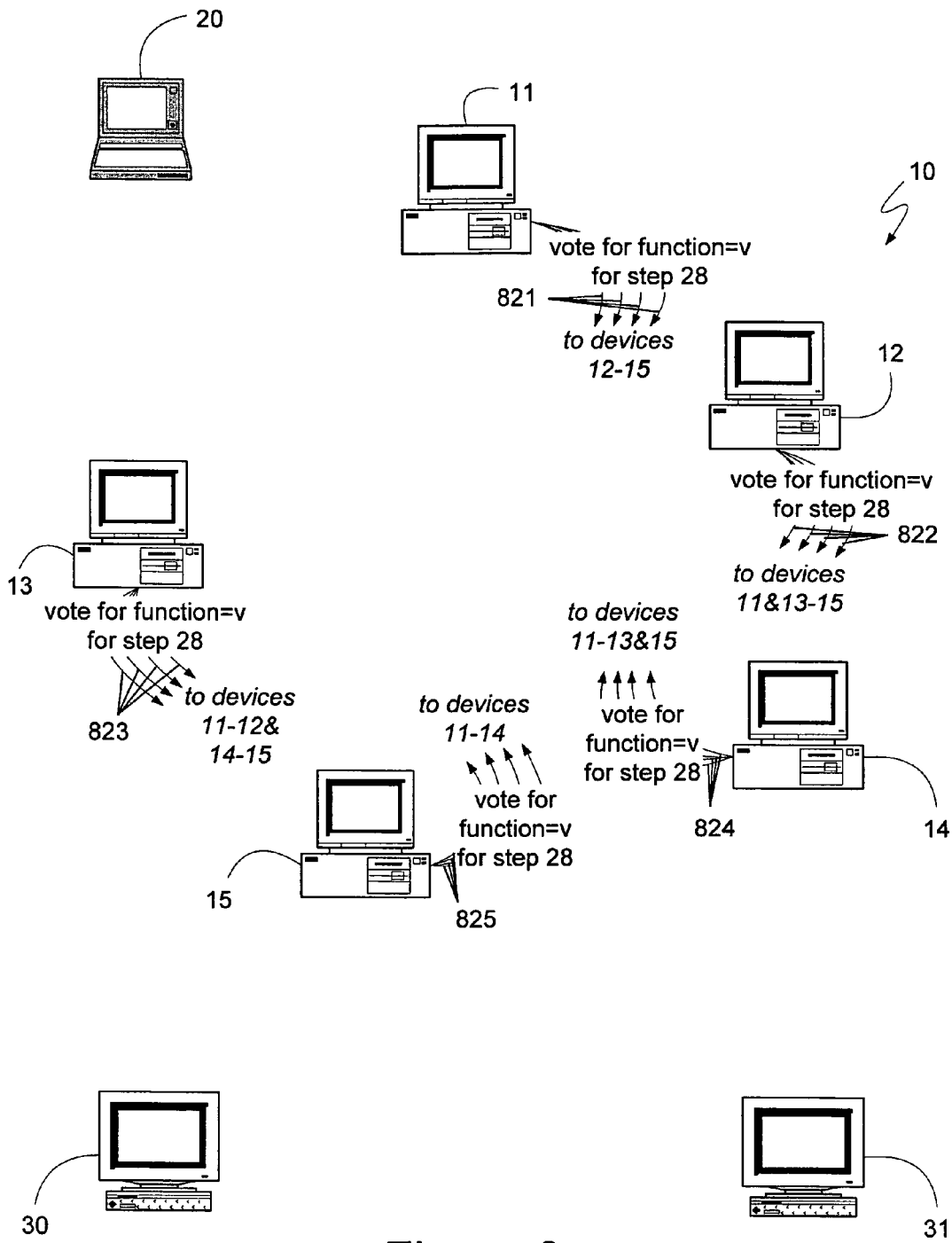

Turning to FIG. 9c, because the selected proposal number corresponds to a fast Paxos algorithm, each of the devices 11-15, upon receiving messages 811-815, can treat such messages as requests from a client, and can vote for the requested function. Consequently, as shown in FIG. 9c, each of the devices can vote for the function "v", proposed by messages 811-815, and can transmit the results of their votes to all of the other devices via messages 821-825.

Figure 9D:
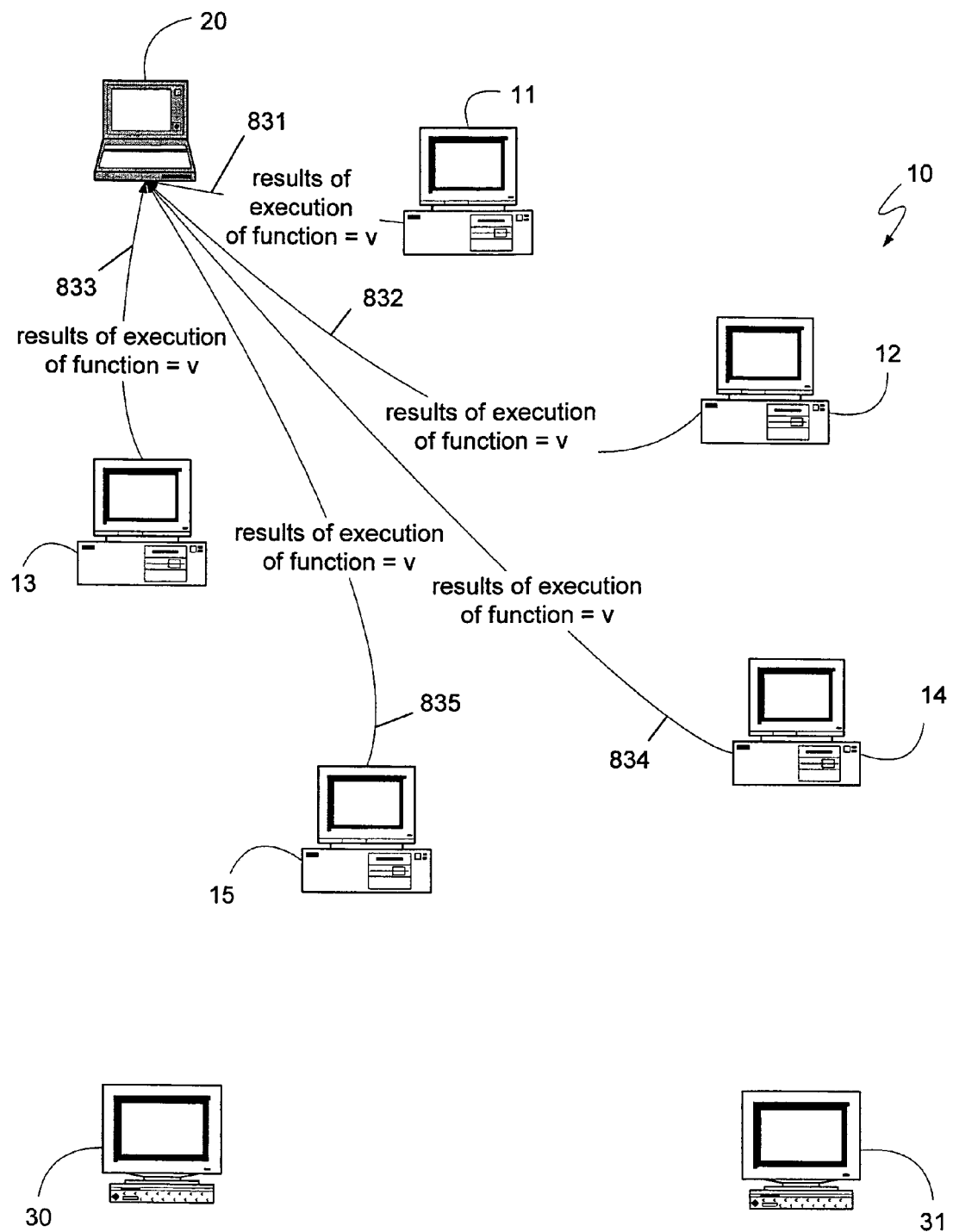

Turning to FIG. 9d, upon receiving messages 821-825, each of the devices 11-15 can independently determine that the function "v" was selected for system step 28, and can proceed to execute the function and provide the results of that execution to the requesting client via messages 831-835 in the same manner as with the fast Paxos algorithm described in detail above. Once a function for system step 28 is selected, the above described process can be repeated in an analogous manner for system step 29 since, as illustrated in FIG. 7e by messages 741-745, a conflict exists between functions "u" and "v" for system step 29 as well.

Figure 9E:
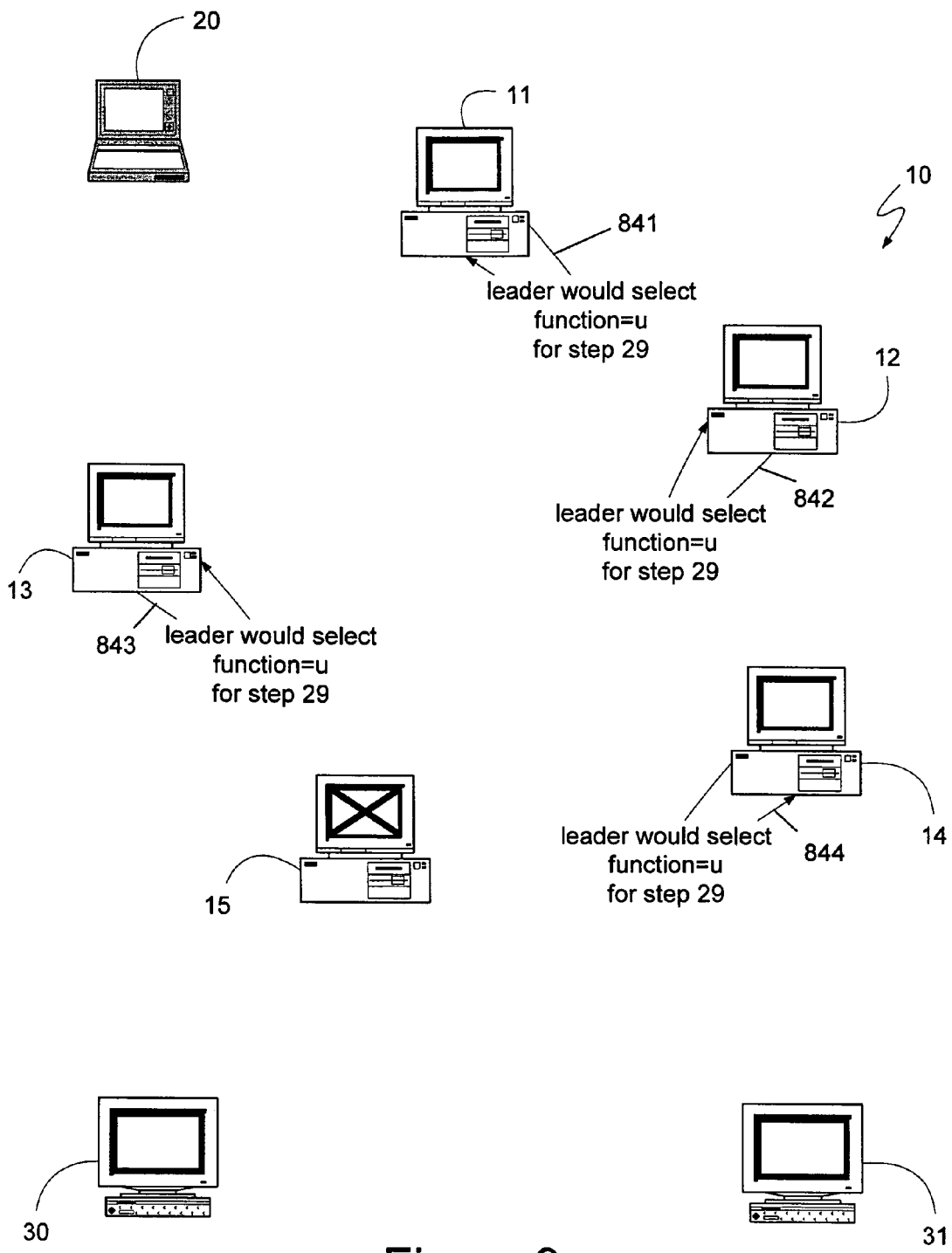

Therefore, turning to FIG. 9e, messages 841-844 are shown indicating that devices 11-14 each independently reached the conclusion that a leader device would have proposed function "u" for step 29. Device 15 is shown as having experienced a failure so as to illustrate that the mechanisms described retain the fault-tolerant aspects of the fast Paxos algorithm, described in detail above. As before, messages 841-843 are likely inter-process or intra-process messages sent within their respective devices. As also explained above, because functions "u" and "v" were in conflict for system steps 28 and 29, the leader device, and consequently devices 11-14, can take into account when one of the two or more conflicting functions is already selected for a prior system step, and can, in such cases, select the other function. Thus, as illustrated by messages 841-844, since function "v" was selected for system step 28, function "u" can be proposed for system step 29.

Figure 9F:
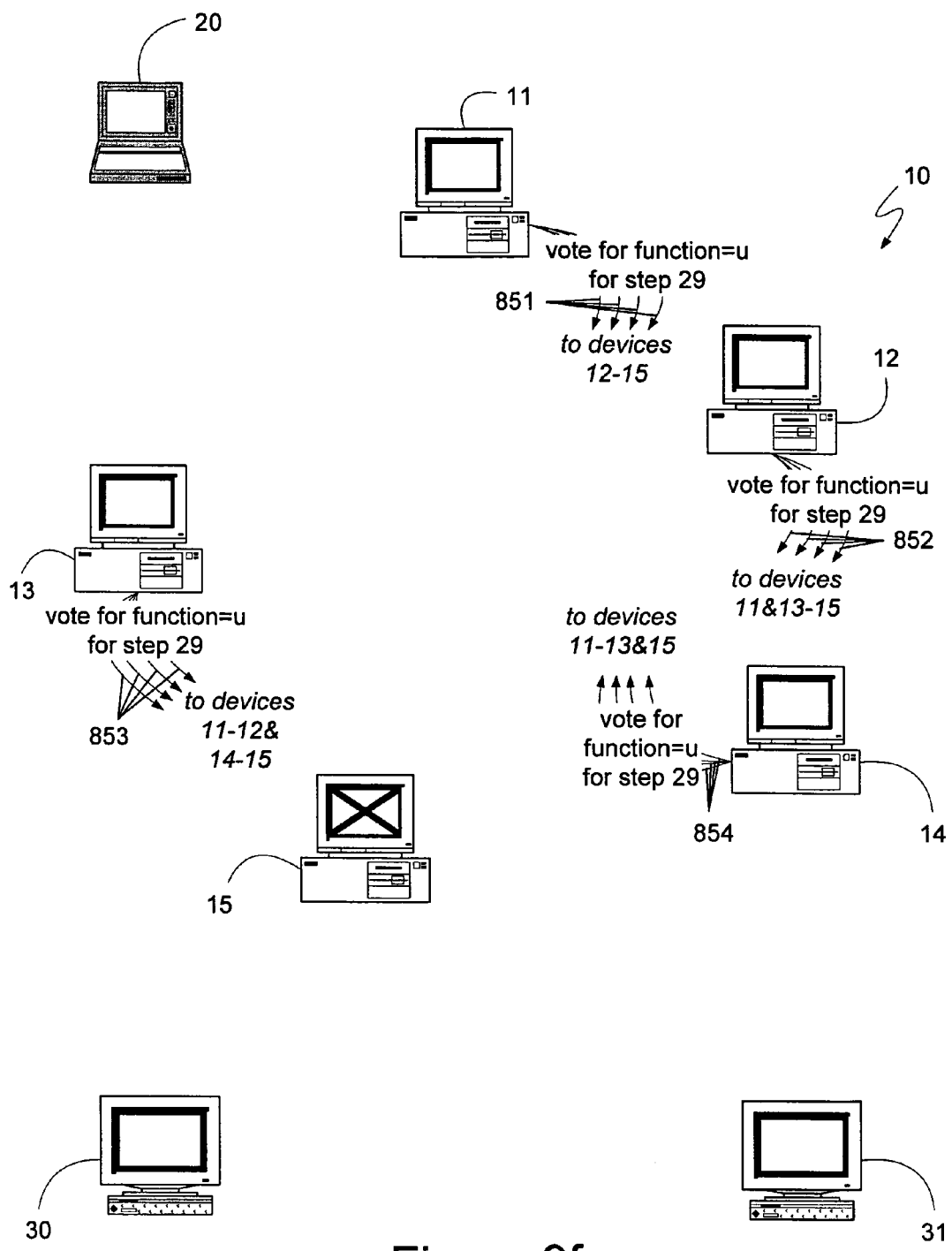

Turning to FIG. 9f, the devices 11-14 are shown voting for the function "u" for system step 29, and transmitting that vote information to each of the other devices via messages 851-854. As before, device 15 is illustrated as having experienced a failure. However, because only a quorum of devices needs to vote for a particular function in order for the function to be selected, in the example illustrated in FIG. 9f, even though only four devices vote for function "u", it is still selected. As also explained above, if a conflict arose, and no function was selected, the Paxos algorithm could be used to resolve the conflict and avoid an endlessly repeating conflict on the same system step. Alternatively, resort to the Paxos algorithm can be delayed for any number of further conflicts.

Figure 9G:
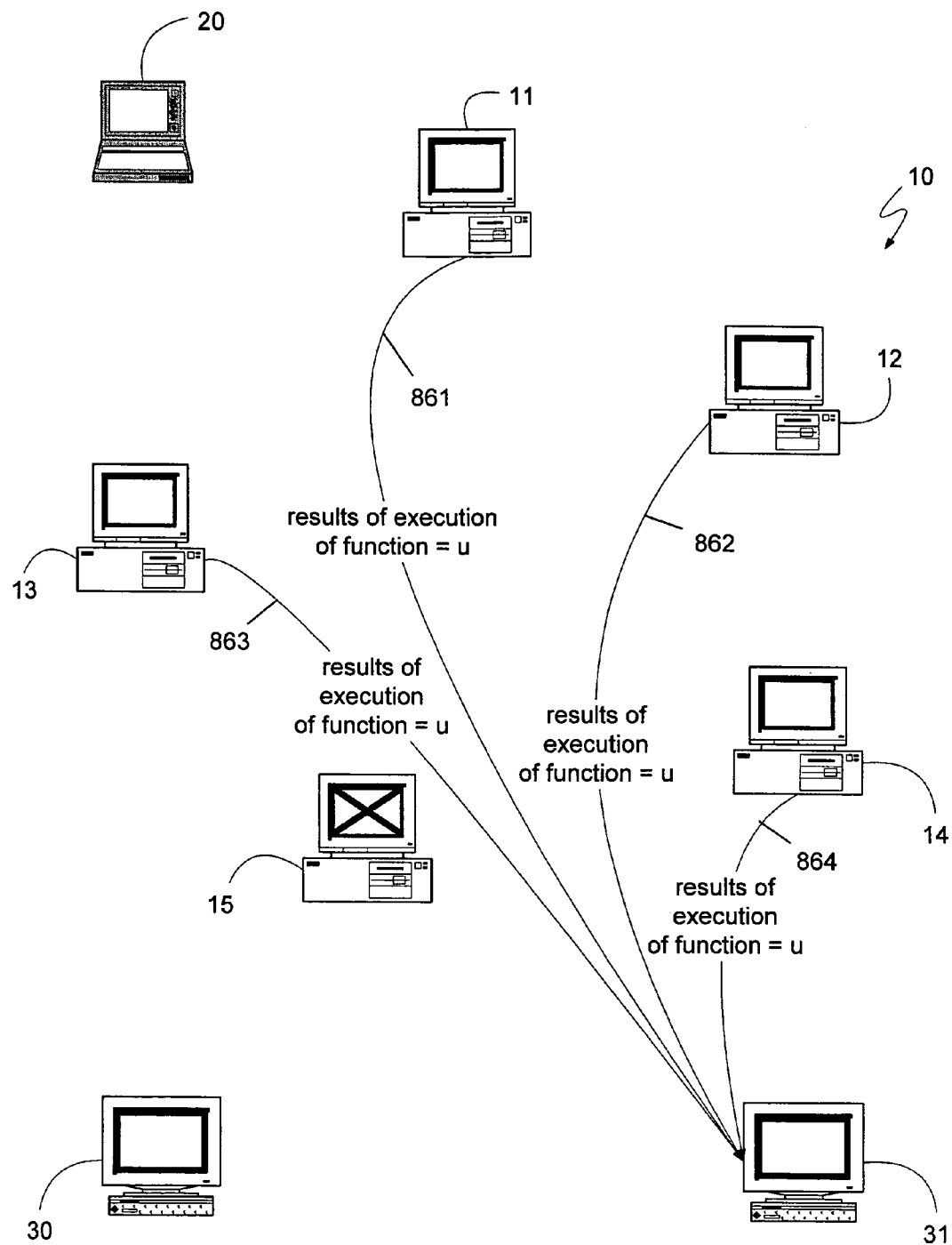

Nevertheless, because each of the devices 11-14 voted for the function "u" for system step 29, each of the devices 11-14 can determine, based on messages 851-854, that the function "u" was selected, and each of the devices 11-14 can execute the function and provide the results to the requesting client via messages 861-864, as shown in FIG. 9g.

Once the conflict for steps 28 and 29 is resolved, such as in the manner just described, the system 10 can resume operation of the fast Paxos algorithm. One mechanism for resuming operation of the fast Paxos algorithm is to send an explicit message, such as message 500. However, as explained in detail above, a distributed computing system can implement more than one instance of a consensus algorithm at a given time. Thus, while devices 11-15 were performing the steps described above, they could simultaneously have been implementing the original instance of the fast Paxos algorithm for system steps above 29. Consequently, as described in detail above, once the conflict for steps 28 and 29 is resolved, the currently described instance of the fast Paxos algorithm can simply terminate, enabling the original instance of the fast Paxos algorithm, and any other currently running instances, to have access to additional processing power and memory resources. Additionally, even the above described instances could have been performed in parallel, such that the conflict for step 29 was resolved simultaneously, or even before, the conflict for step 28 was resolved.

As can be seen, a conflict can be resolved without resorting to the standard Paxos algorithm, and the message delays associated therewith. Specifically, by allowing each device to attempt to determine what a leader device would do, and respond as if the leader device had, in fact, done that, a conflict can be resolved in as few as one additional message delay. If continued conflicts result from the optimization, the Paxos algorithm can be used to prevent additional delay from endless conflicts over the same system steps. Simultaneously, however, another instance of a consensus algorithm can also be running, so that the distributed computing system can continue to select functions for subsequent system steps.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for resolving conflicts in a distributed computer system implementing distributed fault-tolerant consensus algorithms, the method comprising:
   performing a distributed fault-tolerant consensus process in the distributed computer system comprising a plurality of devices, wherein each device votes for proposals received directly from a client and generates vote messages used to reach consensus on said client proposals;
   sending the vote messages generated during operation of the distributed fault-tolerant consensus process to at least one device among the plurality of devices;
   initiating a conflict resolution process when the vote messages for at least one function received from a first quorum of devices among the plurality of devices indicate that a conflict had occurred; and
   performing the conflict resolution process by the at least one device using the vote messages previously sent to the at least one device, wherein performing the conflict resolution process comprises:
      the at least one device selecting a proposed function from the at least one function voted for by the vote messages and transmitting a proposal to a second quorum of devices among the plurality of devices, the proposal comprising the proposed function and a next proposal number that is immediately subsequent to a proposal number corresponding to the vote messages; and
      the at least one device determining that the proposed function is selected for conflict resolution when subsequent vote messages are received in response to the transmitted proposal from a third quorum of devices among the plurality of devices.

2. The method of claim 1, wherein the proposal number corresponding to the vote messages and the next proposal number were assigned to one device in the distributed computer system implementing the distributed fault-tolerant consensus algorithms.

3. The method of claim 1, wherein the proposal number corresponding to the vote messages indicates the use of a leaderless distributed fault-tolerant consensus algorithm and the next proposal number indicates the use of a leader-based distributed fault-tolerant consensus algorithm.

4. The method of claim 3, wherein the next proposal number is selected to indicate the use of the leader-based distributed fault-tolerant consensus algorithm prior to the commencement of an instance of one of the distributed fault-tolerant consensus algorithms, the instance resulting in the vote messages.

5. The method of claim 1, wherein transmitting the proposal and receiving subsequent vote messages are performed in parallel with an instance of one of the distributed fault-tolerant consensus algorithms, the instance resulting in the vote messages.

6. A method for resolving conflicts in a distributed computer system implementing distributed fault-tolerant consensus algorithms, the method comprising:
   performing a distributed fault-tolerant consensus process in a distributed computer system comprising a plurality of devices, wherein each device votes for proposals received directly from a client and generates vote messages used to reach consensus on said client proposals;
   each device sending the vote messages generated by that device during operation of the distributed fault-tolerant consensus process to each of other devices among the plurality of devices;
   initiating a conflict resolution process when the vote messages for at least one function received from a first quorum of devices among the plurality of devices indicate that a conflict had occurred; and
   performing the conflict resolution process by each of the devices using the vote messages previously sent to the devices, wherein performing the conflict resolution process comprises:
      each device independently determining a function that would have been proposed by a leader device had the leader device received the vote messages sent to that device;
      each device transmitting a subsequent vote message to a second quorum of devices among the plurality of devices, the subsequent vote message comprising the determined function and a next proposal number that is immediately subsequent to a proposal number corresponding to the vote messages;
      each device receiving subsequent vote messages from other devices among the plurality of devices; and
      each device determining that the determined function was selected for conflict resolution when the subsequent vote messages are received from the other devices among the plurality of devices, and the transmitted subsequent vote message comprises a quorum of subsequent vote messages.

7. The method of claim 6, further comprising:
   each device determining that the determined function was not selected when the subsequent vote messages received from the other devices and the transmitted subsequent vote message do not comprise the quorum of subsequent vote messages; and
   implementing a leader-based distributed fault-tolerant consensus algorithm if the determined function was not selected.

8. The method of claim 7, wherein the implementing the leader-based distributed fault-tolerant consensus algorithm comprises repeating the determining the function that would have been proposed by a leader device, the transmitting the subsequent vote message and the receiving the subsequent vote messages for at least one additional iteration prior to implementing the leader-based distributed fault-tolerant consensus algorithm.

9. The method of claim 6, wherein the proposal number corresponding to the vote messages and the next proposal number indicate the use of a leaderless distributed fault-tolerant consensus algorithm.

10. The method of claim 9, wherein the next proposal number is selected to indicate the use of the leaderless distributed fault-tolerant consensus algorithm prior to the commencement of an instance of one of the distributed fault-tolerant consensus algorithms, the instance resulting in the vote messages.

11. The method of claim 6, wherein the transmitting the subsequent vote message and the receiving subsequent vote messages are performed in parallel with an instance of one of the distributed fault-tolerant consensus algorithms, the instance resulting in the vote messages.

12. A computer-readable storage medium having computer-executable instructions for resolving conflicts in a distributed computer system comprising a plurality of devices implementing distributed fault-tolerant consensus algorithms, wherein the computer-executable instructions are executed to perform steps comprising:

at least one device among the plurality of devices receiving vote messages generated by each device during operation of a distributed fault-tolerant consensus process;

initiating a conflict resolution process when the vote messages for at least one function received from a first quorum of devices among the plurality of devices indicate that a conflict had occurred; and performing the conflict resolution process by the at least one device using the vote messages previously received by the at least one device, wherein performing the conflict resolution process comprises:

the at least one device selecting a proposed function from the at least one function voted for by the vote messages and transmitting a proposal to a second quorum of devices among the plurality of devices, the proposal comprising the proposed function and a next proposal number that is immediately subsequent to a proposal number corresponding to the vote messages; and the at least one device determining that the proposed function is selected for conflict resolution when subsequent vote messages are received in response to the transmitted proposal from a third quorum of devices among the plurality of devices.

13. The computer-readable storage medium of claim 12, wherein the proposal number corresponding to the vote messages and the next proposal number were assigned to one device in the distributed computer system implementing the distributed fault-tolerant consensus algorithms.

14. The computer-readable storage medium of claim 12, wherein the proposal number corresponding to the vote messages indicates the use of a leaderless distributed fault-tolerant consensus algorithm and the next proposal number indicates the use of a leader-based distributed fault-tolerant consensus algorithm.

15. The computer-readable storage medium of claim 14, wherein the next proposal number is selected to indicate the use of the leader-based distributed fault-tolerant consensus algorithm prior to the commencement of an instance of one of the distributed fault-tolerant consensus algorithms, the instance resulting in the vote messages.

16. The computer-readable storage medium of claim 12, wherein transmitting the proposal and receiving subsequent vote messages are performed in parallel with an instance of one of the distributed fault-tolerant consensus algorithms, the instance resulting in the vote messages.

17. A computer-readable storage medium having computer-readable instructions for resolving conflicts in a distributed computer system comprising a plurality of devices implementing distributed fault-tolerant consensus algorithms, wherein the computer-executable instructions are executed to perform steps comprising:

each device among the plurality of devices receiving vote messages generated by each of other devices among the plurality of devices during operation of a distributed fault-tolerant consensus process;

initiating a conflict resolution process when the vote messages for at least one function received from a first quorum of devices among the plurality of devices indicate that a conflict had occurred; and performing the conflict resolution process by each of the devices using the vote messages previously received by each of the devices, wherein performing the conflict resolution process comprises:

each device independently determining a function that would have been proposed by a leader device had the leader device received the vote messages received by that device;

each device transmitting a subsequent vote message to a second quorum of devices among the plurality of devices, the subsequent vote message comprising the determined function and a next proposal number that is immediately subsequent to a proposal number corresponding to the vote messages;

each device receiving subsequent vote messages from other devices among the plurality of devices; and each device determining that the determined function was selected for conflict resolution when the subsequent vote messages are received from the other devices among the plurality of devices, and the transmitted subsequent vote message comprises a quorum of subsequent vote messages.

18. The computer-readable storage medium of claim 17, further comprising computer-executable instructions that are executed for:

determining that the determined function was not selected when the subsequent vote messages received from the other devices and the transmitted subsequent vote message do not comprise the quorum of subsequent vote messages; and implementing a leader-based distributed fault-tolerant consensus algorithm if the determined function was not selected.

19. The computer-readable storage medium of claim 18, wherein the computer-executable instructions for implementing the leader-based distributed fault-tolerant consensus algorithm comprise computer-executable instructions for repeating the determining the function that would have been proposed by the leader device, the transmitting the subsequent vote message and the receiving the subsequent vote messages for at least one additional iteration prior to implementing the leader-based distributed fault-tolerant consensus algorithm.

20. The computer-readable storage medium of claim 17, wherein the proposal number corresponding to the vote messages and the next proposal number indicate the use of a leaderless distributed fault-tolerant consensus algorithm.

21. The computer-readable storage medium of claim 20, wherein the next proposal number is selected to indicate the use of the leaderless distributed fault-tolerant consensus algorithm prior to the commencement of an instance of one of the distributed fault-tolerant consensus algorithms, the instance resulting in the vote messages.

22. The computer-readable storage medium of claim 17, wherein transmitting the subsequent vote message and receiving subsequent vote messages are performed in parallel with an instance of one of the distributed fault-tolerant consensus algorithms, the instance resulting in the vote messages.

23. A computing device in a distributed computer system implementing distributed fault-tolerant consensus algorithms, the computing device comprising:
- a network interface performing steps comprising: receiving vote messages for at least one function from a first quorum of devices among a plurality of devices in the distributed computer system during operation of a distributed fault-tolerant consensus process, a conflict resolution process being initiated when the vote messages received indicate that a conflict had occurred; transmitting a proposal for conflict resolution to a second quorum of devices among the plurality of devices, the proposal comprising a proposed function and a next proposal number that is immediately subsequent to a proposal number corresponding to the vote messages; and receiving subsequent vote messages in response to the transmitted proposal; and
- a processing unit performing steps comprising: choosing the proposed function from the at least one function voted for by the vote messages; and determining that the proposed function was selected when the subsequent vote messages are received from a third quorum of devices among the plurality of devices.

24. The computing device of claim 23, wherein the proposal number corresponding to the vote messages and the next proposal number were assigned to it.

25. The computing device of claim 23, wherein the proposal number corresponding to the vote messages indicates the use of a leaderless distributed fault-tolerant consensus algorithm and the next proposal number indicates the use of a leader-based distributed fault-tolerant consensus algorithm.

26. The computing device of claim 25, wherein the next proposal number is selected to indicate the use of the leader-based distributed fault-tolerant consensus algorithm prior to the commencement of an instance of one of the distributed fault-tolerant consensus algorithms, the instance resulting in the vote messages.

27. The computing device of claim 23, wherein the network interface performs the instance of one of the distributed fault-tolerant consensus algorithms, the instance resulting in the vote messages.

28. A computing device in a distributed computer system implementing distributed fault-tolerant consensus algorithms, the computing device comprising:
- a network interface performing steps comprising: receiving vote messages for at least one function from a first quorum of devices among a plurality of devices in a distributed computing system during operation of a distributed fault-tolerant consensus process, a conflict resolution process being initiated when the vote messages received indicate that a conflict had occurred; transmitting a subsequent vote message for conflict resolution to a second quorum of devices among the plurality of devices, the subsequent vote message comprising a proposed function and a next proposal number that is immediately subsequent to a proposal number corresponding to the vote messages; and receiving subsequent vote messages from other devices among the plurality of devices; and
- a processing unit performing steps comprising: determining the proposed function to be that function that would have been proposed by a leader device among the plurality of devices for resolving the conflict, had the leader device received the vote messages; and determining that the proposed function was selected when the subsequent vote messages are received from the other devices among the plurality of devices and the transmitted subsequent vote message comprises a quorum of subsequent vote messages.

29. The computing device of claim 28, wherein the processing unit performs further steps comprising: determining that the determined function was not selected when the subsequent vote messages received from the other devices and the transmitted subsequent vote message do not comprise the quorum of subsequent vote messages; and implementing a leader-based distributed fault-tolerant consensus algorithm if the determined function was not selected.

30. The computing device of claim 29, wherein the implementing the leader-based distributed fault-tolerant consensus algorithm comprises repeating the determining the function that would have been proposed by the leader device, the transmitting the subsequent vote message and the receiving the subsequent vote messages for at least one additional iteration prior to implementing the leader-based distributed fault-tolerant consensus algorithm.

31. The computing device of claim 28, wherein the proposal number corresponding to the vote messages and the next proposal number indicate the use of a leaderless distributed fault-tolerant consensus algorithm.

32. The computing device of claim 31, wherein the next proposal number is selected to indicate the use of the leaderless distributed fault-tolerant consensus algorithm prior to the commencement of an instance of one of the distributed fault-tolerant consensus algorithms, the instance resulting in the vote messages.

33. The computing device of claim 28, wherein the network interface performs the transmitting the subsequent vote message and the receiving subsequent vote messages in parallel with an instance of one of the distributed fault-tolerant consensus algorithms, the instance resulting in the vote messages.

* * * * *